(12) United States Patent
Sugita et al.

(10) Patent No.: US 8,223,436 B2
(45) Date of Patent: Jul. 17, 2012

(54) REAR ATTACHMENT LENS, IMAGING OPTICAL SYSTEM AND IMAGE PICKUP APPARATUS

(75) Inventors: Shigenobu Sugita, Shimotsuke (JP); Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 12/885,142

(22) Filed: Sep. 17, 2010

(65) Prior Publication Data

US 2011/0080647 A1  Apr. 7, 2011

(30) Foreign Application Priority Data

Oct. 6, 2009  (JP) .................. 2009-232225
Dec. 11, 2009 (JP) .................. 2009-281430

(51) Int. Cl.
*G02B 15/08* (2006.01)
(52) U.S. Cl. ........................................ 359/675
(58) Field of Classification Search ............ 359/672, 359/675
See application file for complete search history.

(56) References Cited

U.S. PATENT DOCUMENTS

| | | | |
|---|---|---|---|
| 4,129,359 A | 12/1978 | Momiyama | |
| 6,124,981 A | 9/2000 | Ogawa | |
| 7,593,163 B2 * | 9/2009 | Yamada et al. | 359/675 |

FOREIGN PATENT DOCUMENTS

| | | | |
|---|---|---|---|
| JP | 63-106715 A | 5/1988 |
| JP | 7168135 A | 7/1995 |
| JP | 2004-226648 A | 8/2004 |
| JP | 2004226648 A | 8/2004 |

OTHER PUBLICATIONS

No Author, "PgF Diagram", Document No. XP002612262, published by Schott, Germany, Jan. 1, 1981.
Schott, "PgF Diagram", in Schott Catalogue—Optisches Glas, Jan. 1, 1981, (1 page).

* cited by examiner

*Primary Examiner* — Joseph P Martinez
(74) *Attorney, Agent, or Firm* — Canon U.S.A., Inc. IP Division

(57) ABSTRACT

A rear attachment lens detachably attached to a main lens system at an image side thereof to lengthen a focal length includes a negative lens disposed such that, when L is a distance between a lens surface closest to an object side and a lens surface closest to an image side in the rear attachment lens, the negative lens is within an area in which a distance from the lens surface closest to the object side to the negative lens is in the range of 0.5 L to 1.0 L. When $\nu dn1$ is an Abbe number of a material of the negative lens with respect to the d-line and $\theta gFn1$ is a partial dispersion ratio of the material of the negative lens with respect to the g-line and the F-line, the following conditions are satisfied:

$10 < \nu dn1 < 23$ $0.020 < \theta gFn1 - 0.6438 + 0.001682 * \nu dn1 < 0.100.$

16 Claims, 34 Drawing Sheets

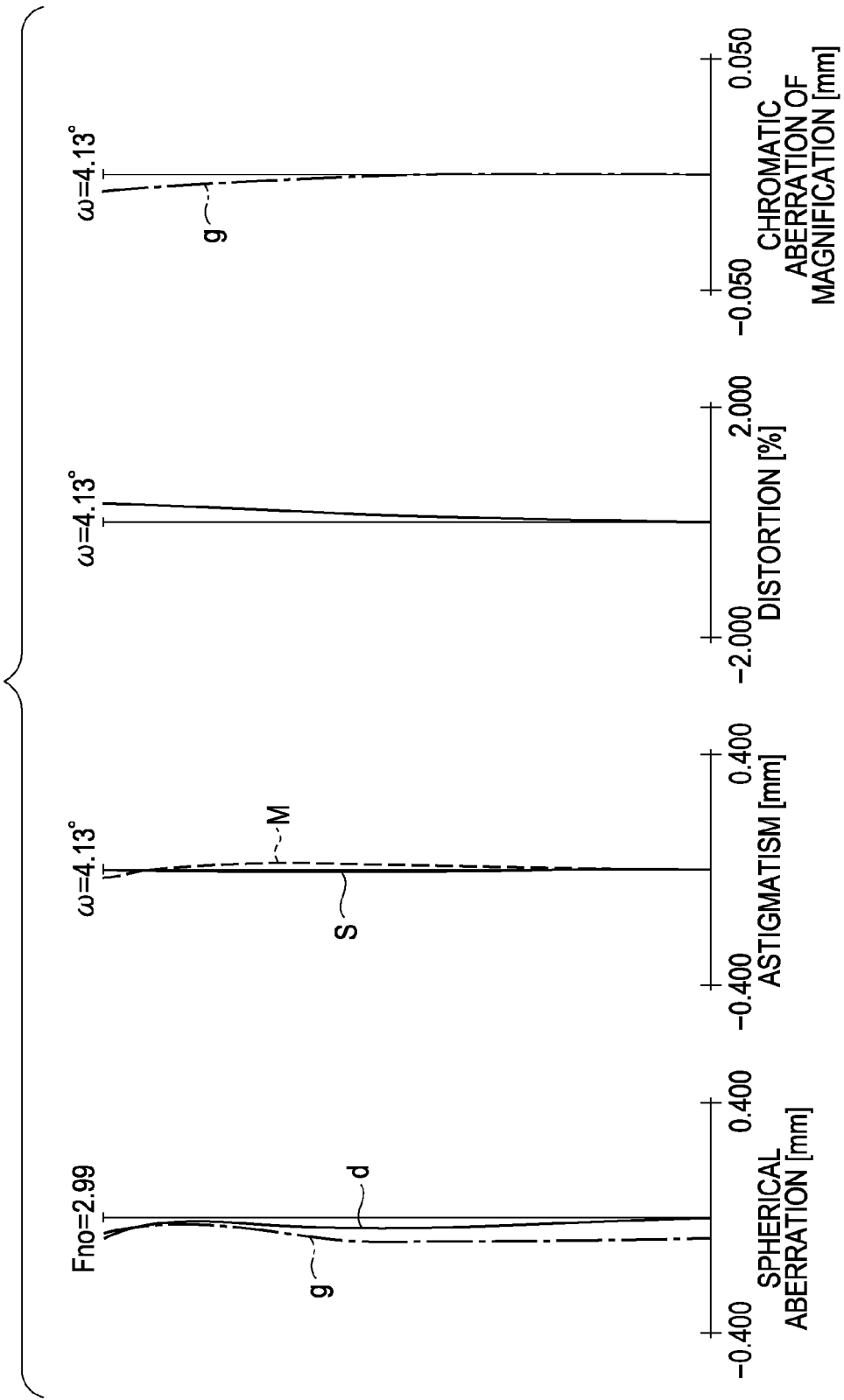

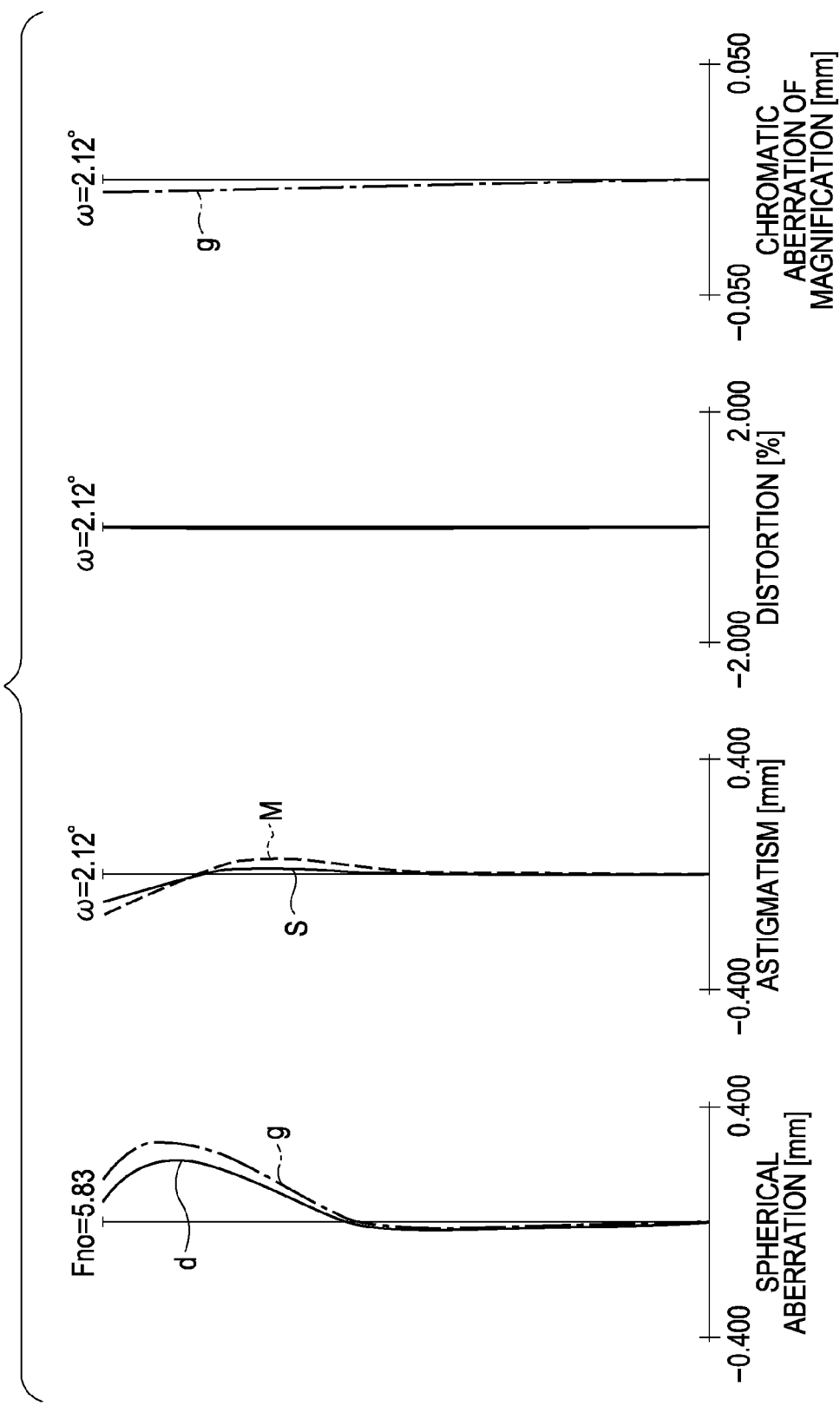

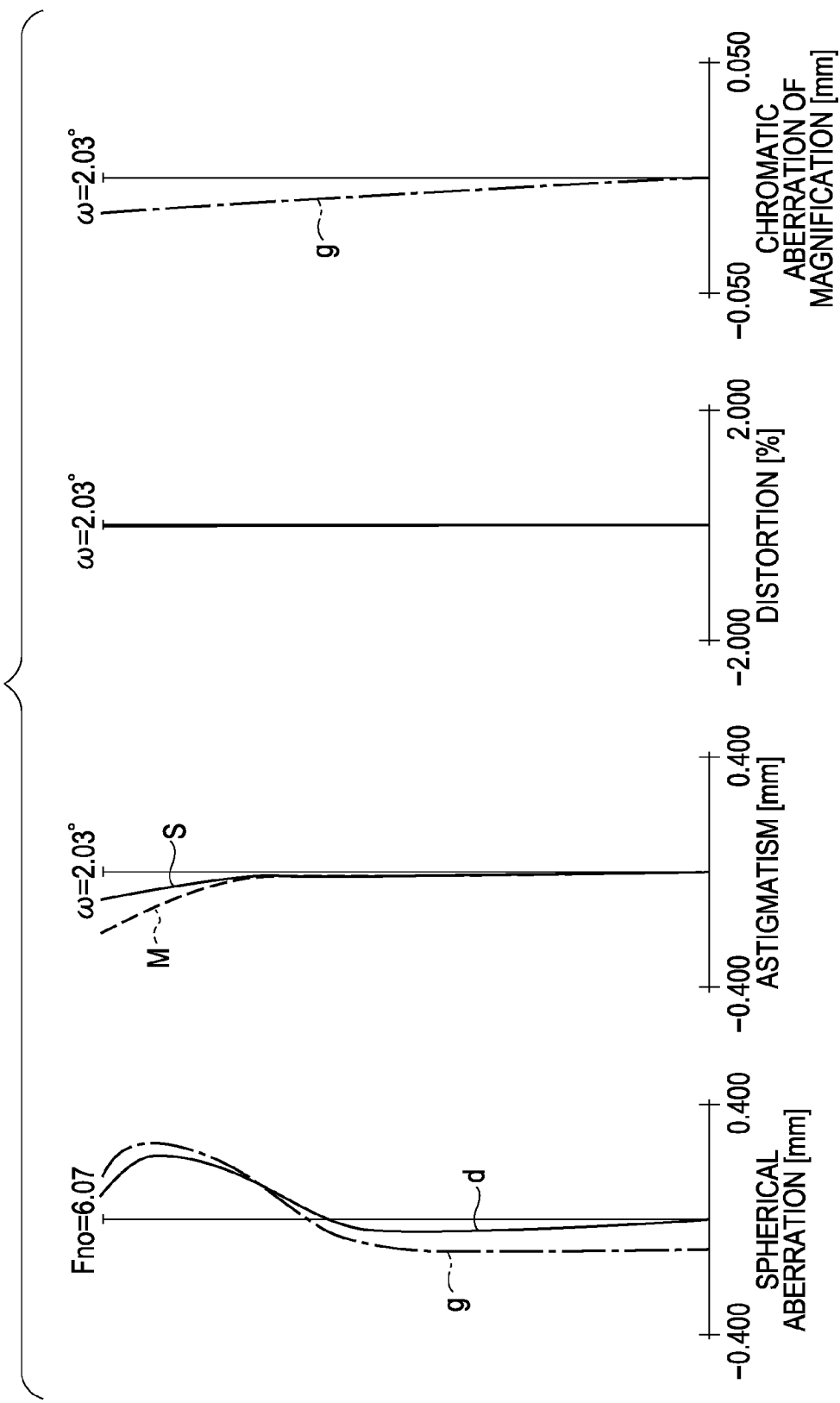

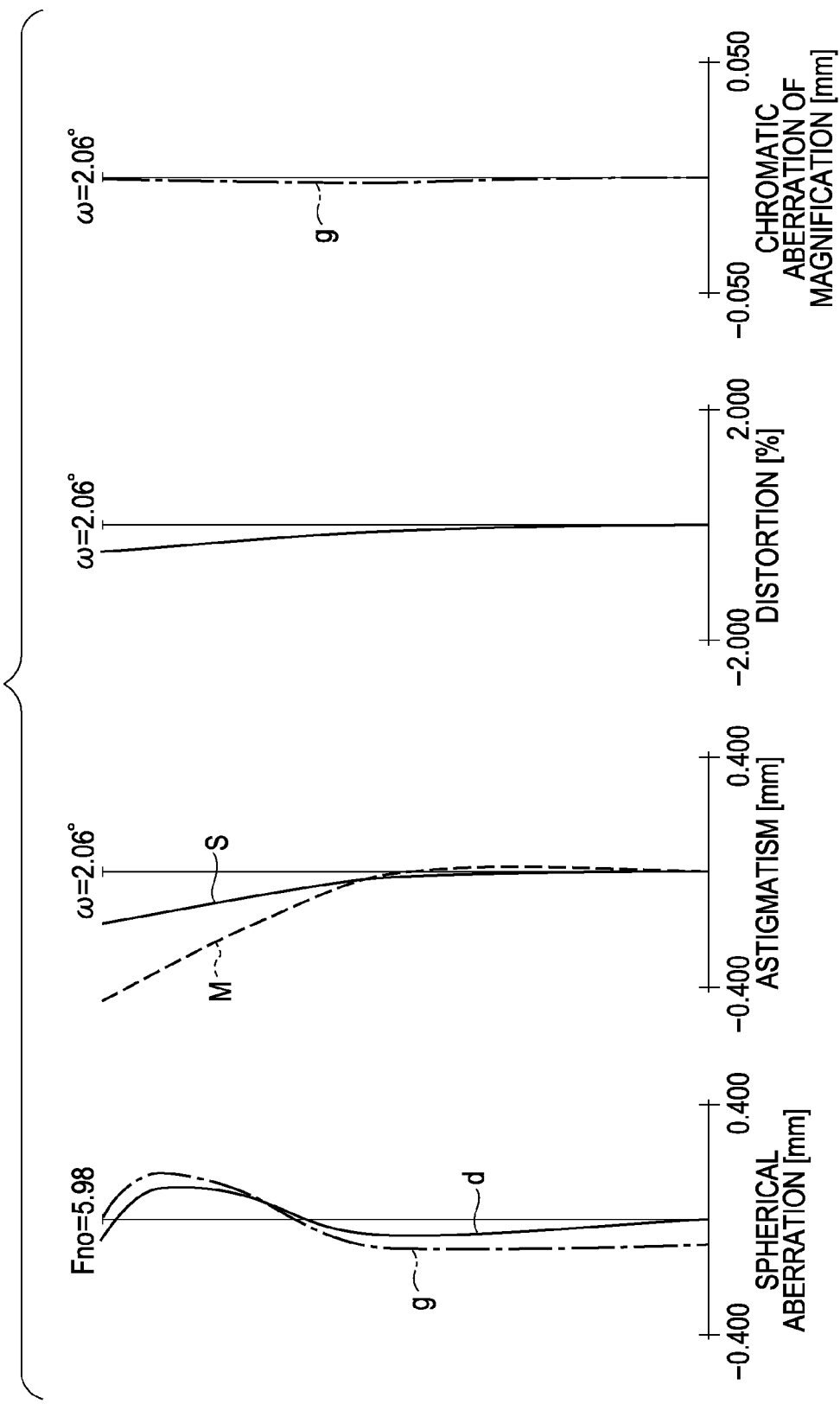

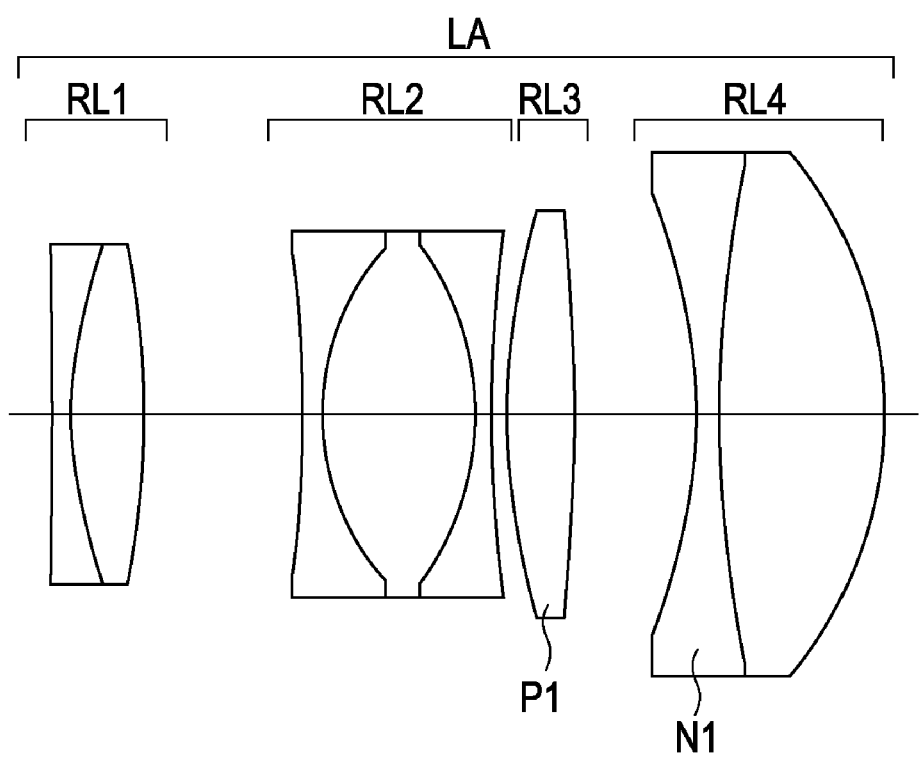

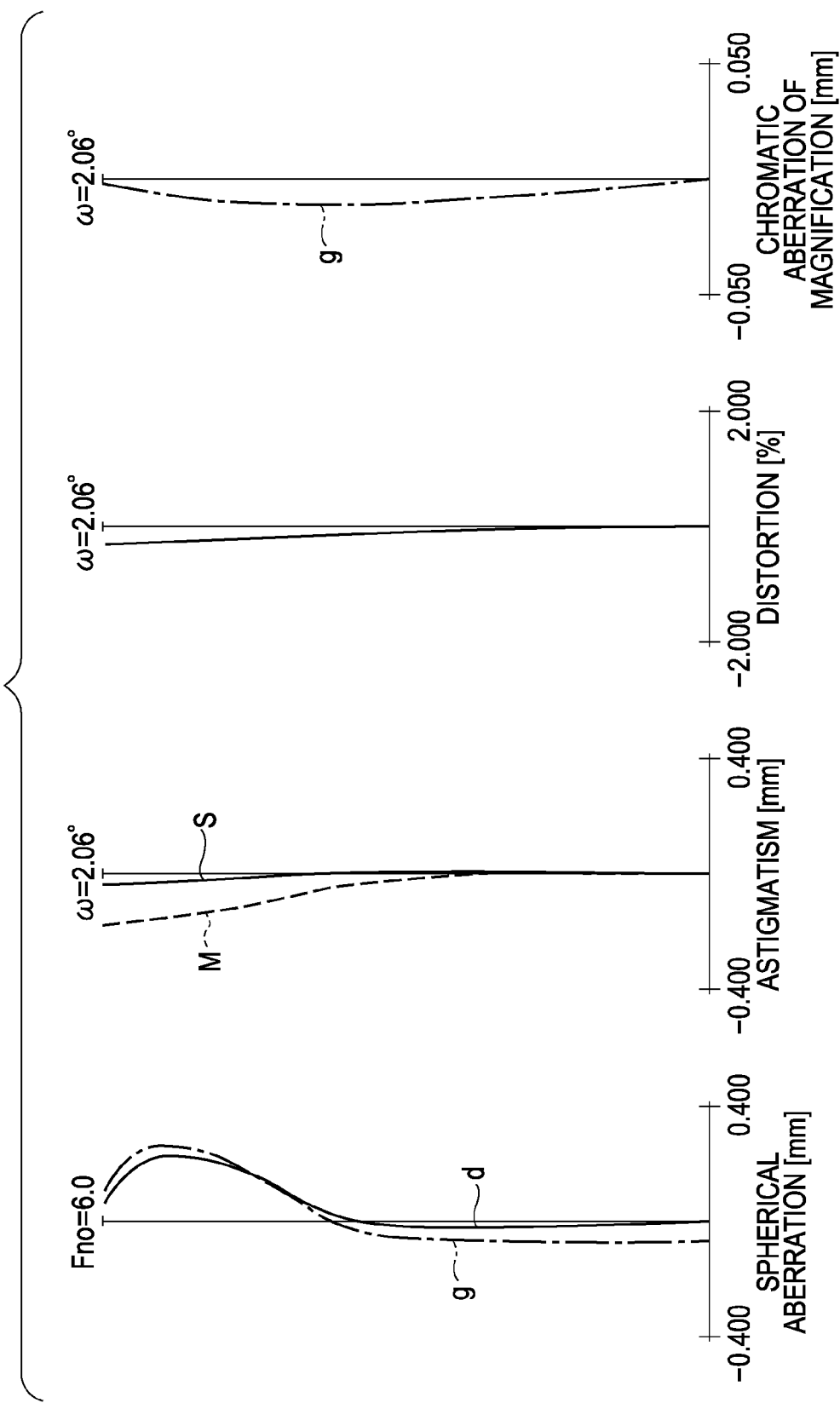

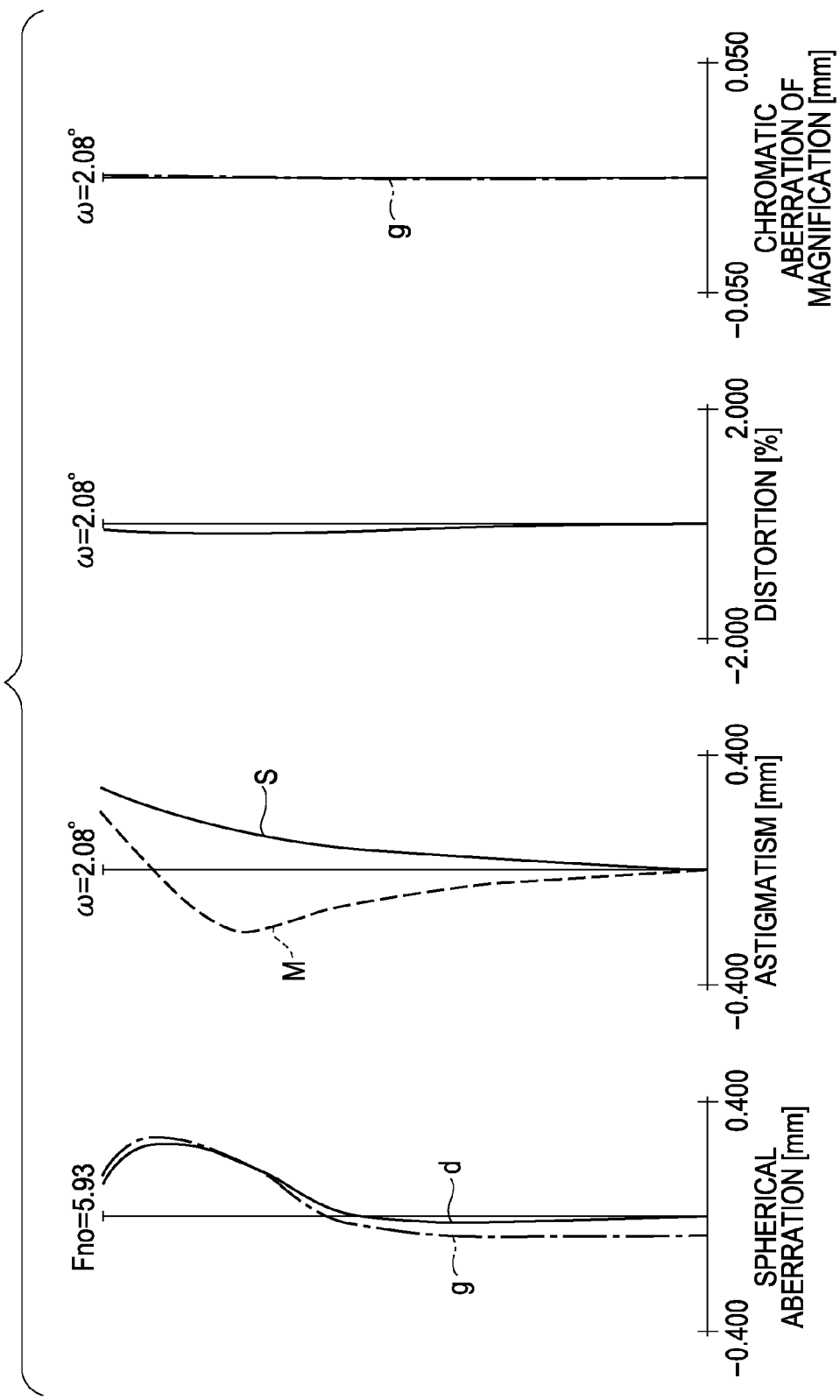

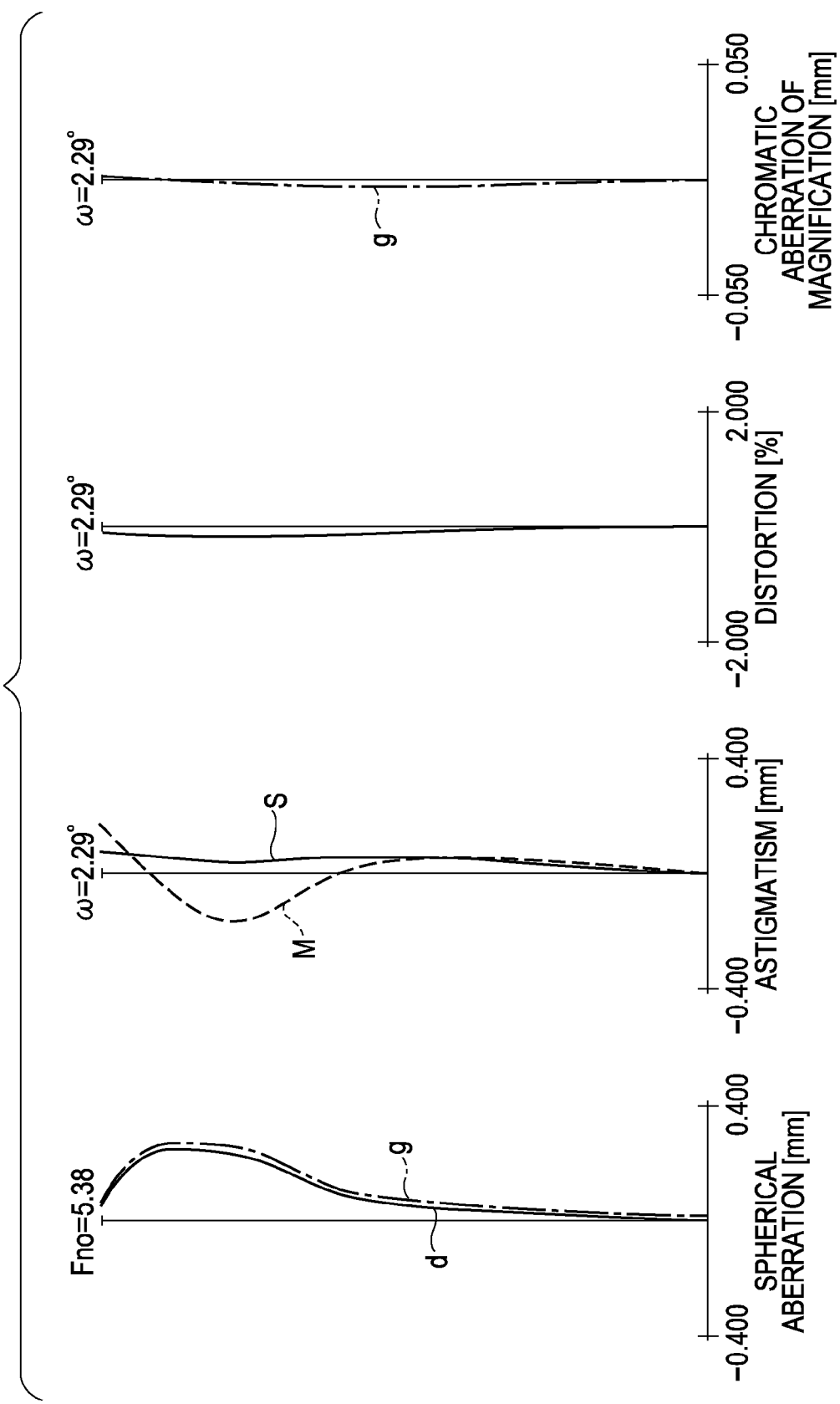

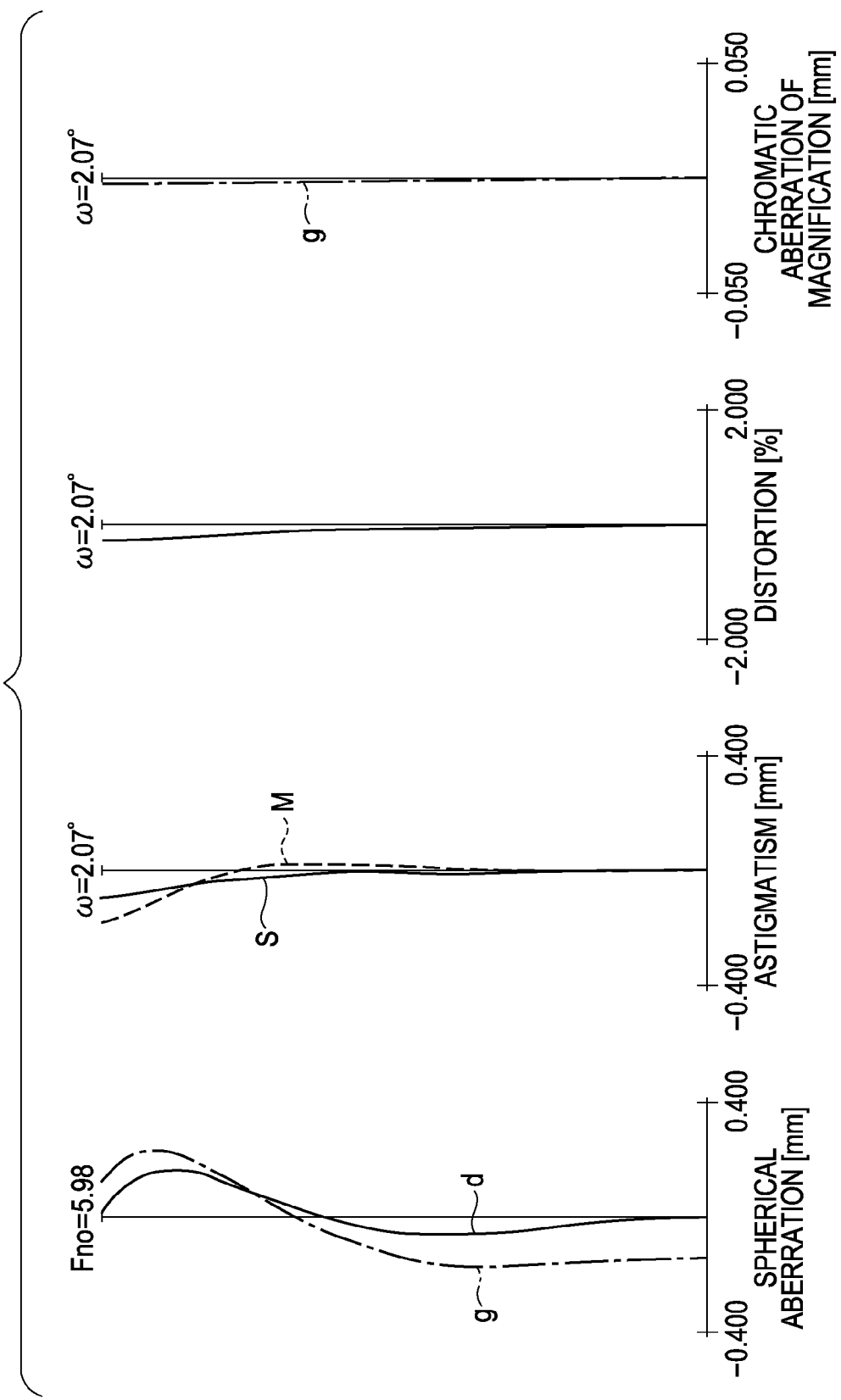

REAR ATTACHMENT LENS, IMAGING OPTICAL SYSTEM AND IMAGE PICKUP APPARATUS

BACKGROUND OF THE INVENTION

1. Field of the Invention

The present invention relates to a rear attachment lens that can be detachably attached to an imaging lens (main lens system) used in, for example, a digital still camera, a video camera, or a broadcasting camera, at an image side of the main lens system to lengthen a focal length of the entire system from an initial focal length of the main lens system.

2. Description of the Related Art

A rear attachment lens that can be detachably attached to a main lens system is known. Specifically, a rear attachment lens is lens extension of sorts that can be removably attached to another lens, which is an imaging lens (imaging optical system), at an image side of the main lens system to lengthen a focal length of the entire system from a focal length of the main lens system itself.

U.S. Pat. No. 4,129,359, Japanese Patent Laid-Open No. 63-106715, U.S. Pat. No. 6,124,981, and Japanese Patent Laid-Open No. 2004-226648 disclose rear attachment lenses that can be attached to a main lens system at an image side thereof to lengthen a focal length of the main lens system.

In a telephoto lens, for which a rear attachment lens is often used, aberrations, in particular, chromatic aberrations, tend to increase as the focal length increases. Therefore, in the case where the rear attachment lens is attached to a main lens system including the telephoto lens, a chromatic aberration of magnification of the main lens system increases. The thus-increased chromatic aberration of magnification serves as the main cause of reduction in image quality.

In addition, the rear attachment lens has a negative refractive power, and the rear attachment lens itself has a large negative Petzval sum. Therefore, when the rear attachment lens is attached to the main lens system, a field curvature increases.

SUMMARY OF THE INVENTION

The present invention provides a rear attachment lens which can be attached to a main lens system at an image side thereof, which does not cause large variations in aberrations, in particular, a field curvature and chromatic aberrations, when the focal length of the entire system is lengthened, and which is capable of maintaining a high optical performance of the entire system.

According to the present invention, a rear attachment lens is detachably attached to a main lens system at an image side of the main lens system to lengthen a focal length from a focal length of the main lens system itself. The rear attachment lens includes a negative lens disposed such that, when L is a distance between a lens surface closest to an object side and a lens surface closest to an image side in the rear attachment lens, the negative lens is within an area in which a distance from the lens surface closest to the object side in the rear attachment lens is in the range of 0.5L to 1.0L. When vdn1 is an Abbe number of a material of the negative lens with respect to the d-line and θgFn1 is a partial dispersion ratio of the material of the negative lens with respect to the g-line and the F-line, the following conditions are satisfied:

$$10 < vdn1 < 23$$

$$0.020 < \theta gFn1 - 0.6438 + 0.001682 * vdn1 < 0.100$$

According to the present invention, a rear attachment lens is detachably attached to a main lens system at an image side of the main lens system to lengthen a focal length from a focal length of the main lens system itself. The rear attachment lens includes a first unit having a positive refractive power and including either two lenses including a positive lens and a negative lens or a set of a single lens and a cemented lens arranged in order from an object side to the image side, the set of the single lens and the cemented lens including a positive lens and a negative lens; a second unit positioned on the image side of the first unit and including either a cemented lens including a positive lens and a negative lens or a set of a single lens and a cemented lens arranged in order from the object side to the image side, the set of the single lens and the cemented lens including a positive lens and a negative lens; a third unit positioned on the image side of the second unit and including a positive lens; a fourth unit positioned on the image side of the third unit and including either two lenses including a positive lens and a negative lens or a set of a cemented lens and a single lens arranged in order from an object side to the image side, the set of the cemented lens and the single lens including a positive lens and a negative lens. When the third unit includes at least one negative lens, the at least one negative lens in the third unit or at least one negative lens included in the fourth unit serves as a first negative lens. When $v_{d\_N1}$ and $\Delta\theta_{gF\_N1}$ are an Abbe number and a partial-dispersion-ratio difference, respectively, of a material of the first negative lens, $f_{\_N1}$ is a focal length of the first negative lens, and f is a focal length of the rear attachment lens, the following condition is satisfied:

$$0.00015 < \Delta\theta_{gF\_N1} * f / (v_{d\_N1} * f_{\_N1}) < 0.00620$$

Further features of the present invention will become apparent from the following description of exemplary embodiments with reference to the attached drawings.

BRIEF DESCRIPTION OF THE DRAWINGS

FIG. 10B shows aberration diagrams of the main lens system.

FIG. 11C shows aberration diagrams of the lens system in which the rear attachment lens according to the fourth embodiment is attached to the main lens system.

FIG. 15B shows aberration diagrams of a lens system in which the rear attachment lens according to the eighth embodiment is attached to the main lens system.

FIG. 16B shows aberration diagrams of a lens system in which the rear attachment lens according to the ninth embodiment is attached to the main lens system.

FIG. 17A is a sectional view of a rear attachment lens according to a tenth embodiment.

FIG. 17B shows aberration diagrams of a lens system in which the rear attachment lens according to the tenth embodiment is attached to the main lens system.

FIG. 18B shows aberration diagrams of a lens system in which the rear attachment lens according to the eleventh embodiment is attached to the main lens system.

FIG. 19B shows aberration diagrams of a lens system in which the rear attachment lens according to the twelfth embodiment is attached to the main lens system.

FIG. 20B shows aberration diagrams of a lens system in which the rear attachment lens according to the thirteenth embodiment is attached to the main lens system.

DESCRIPTION OF THE EMBODIMENTS

Rear attachment lenses according to embodiments of the present invention, imaging optical systems obtained by attaching the rear attachment lenses to a main lens system, and an image pickup apparatus including any one of the imaging optical systems will now be described. The rear attachment lenses according to embodiments of the present invention can be detachably attached to the main lens system at an image side thereof to lengthen a focal length from a focal length of the main lens system itself. The main lens system may be, for example, a telephoto lens or a telephoto-type zoom lens.

Figure 1:
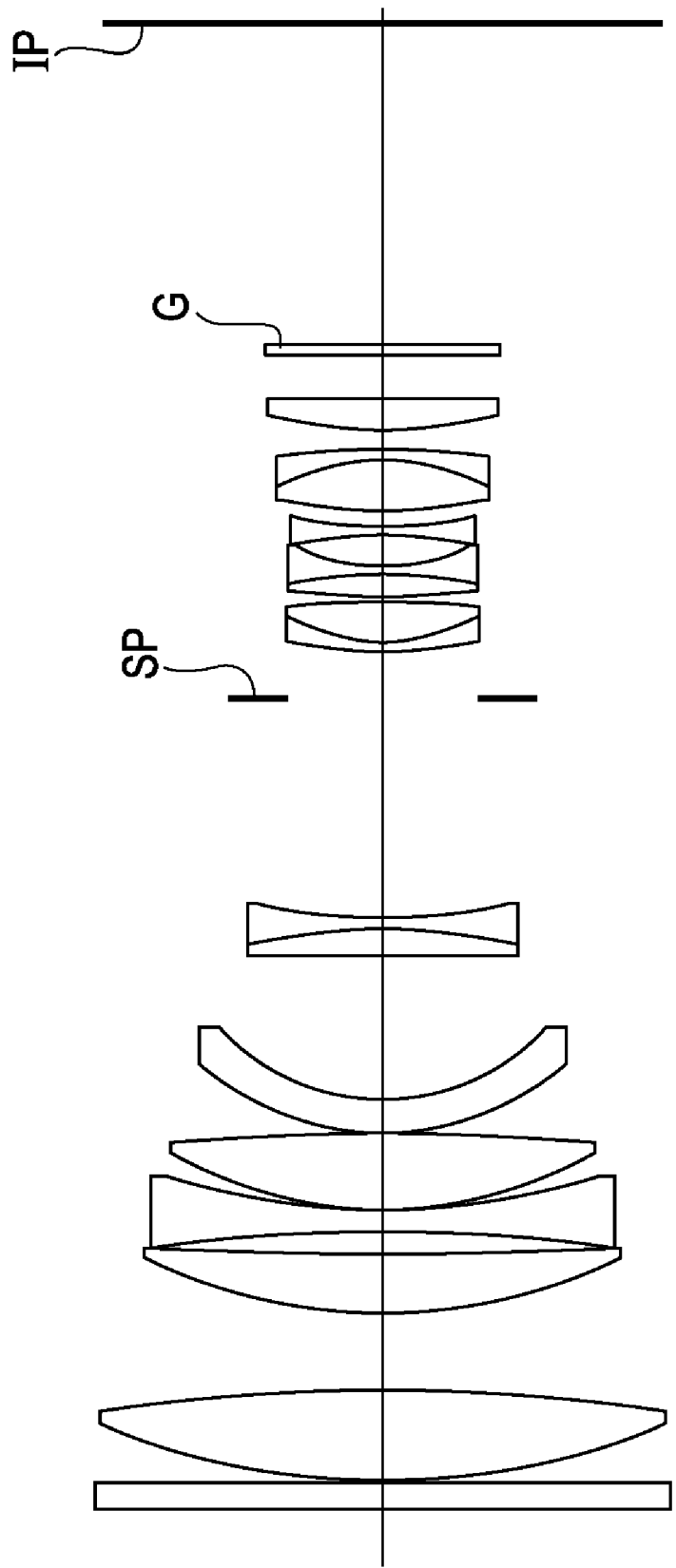
FIG. 1 is a sectional view of a main lens system.
Figure 2:
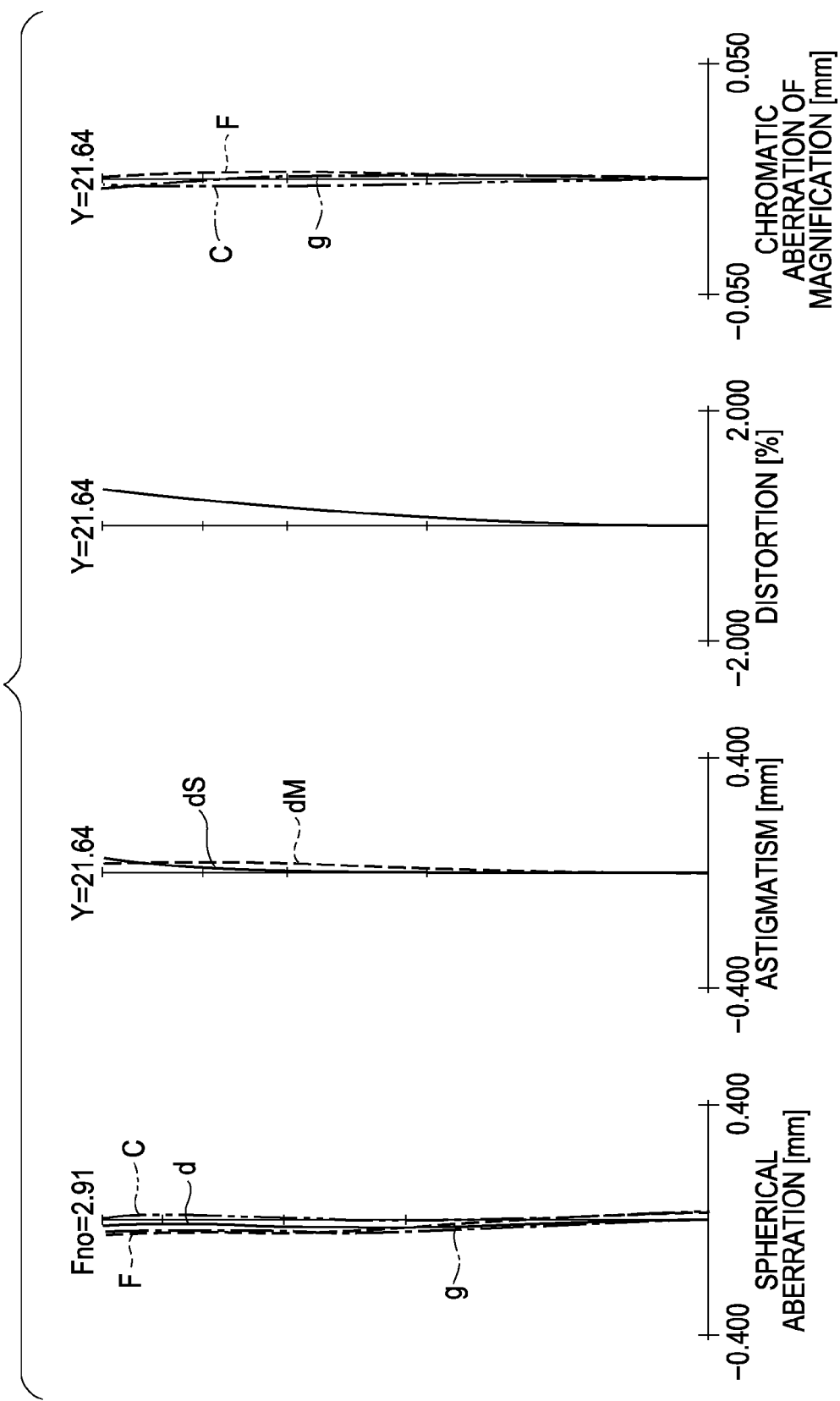
FIG. 2 shows aberration diagrams of the main lens system.
Figure 3:
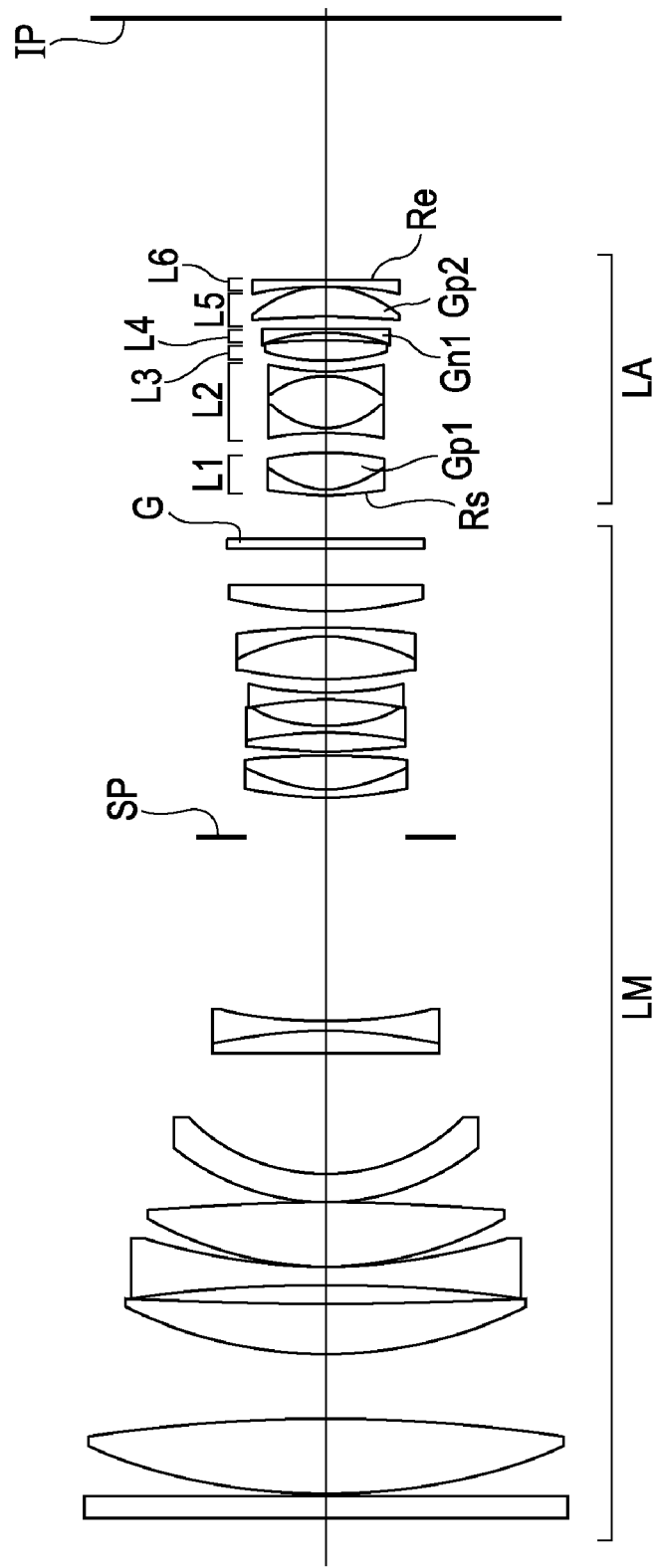
FIG. 3 is a sectional view of a lens system in which a rear attachment lens according to a first embodiment of the present invention is attached to the main lens system.
Figure 4:
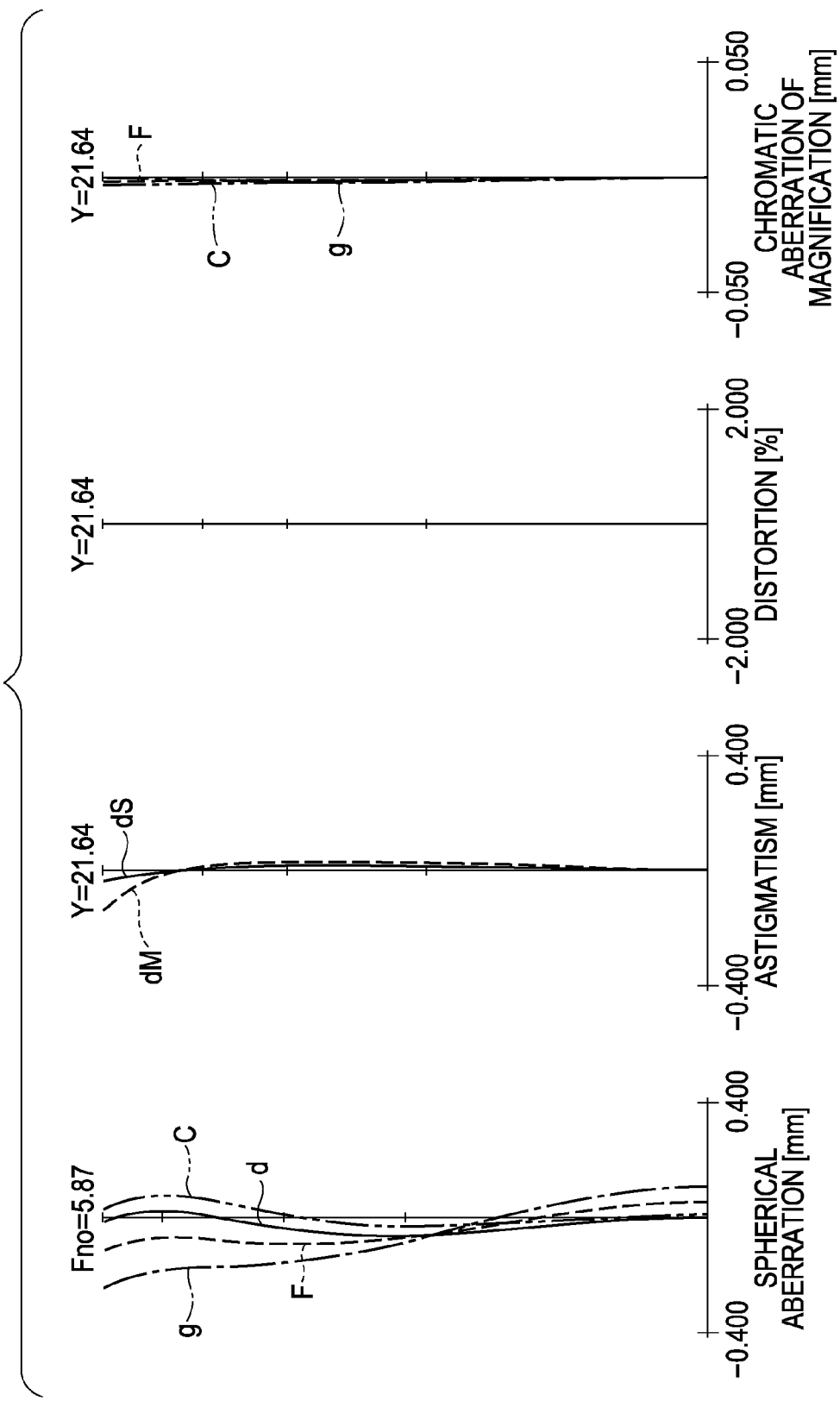
FIG. 4 shows aberration diagrams of the lens system in which the rear attachment lens according to the first embodiment of the present invention is attached to the main lens system.
Figure 5:
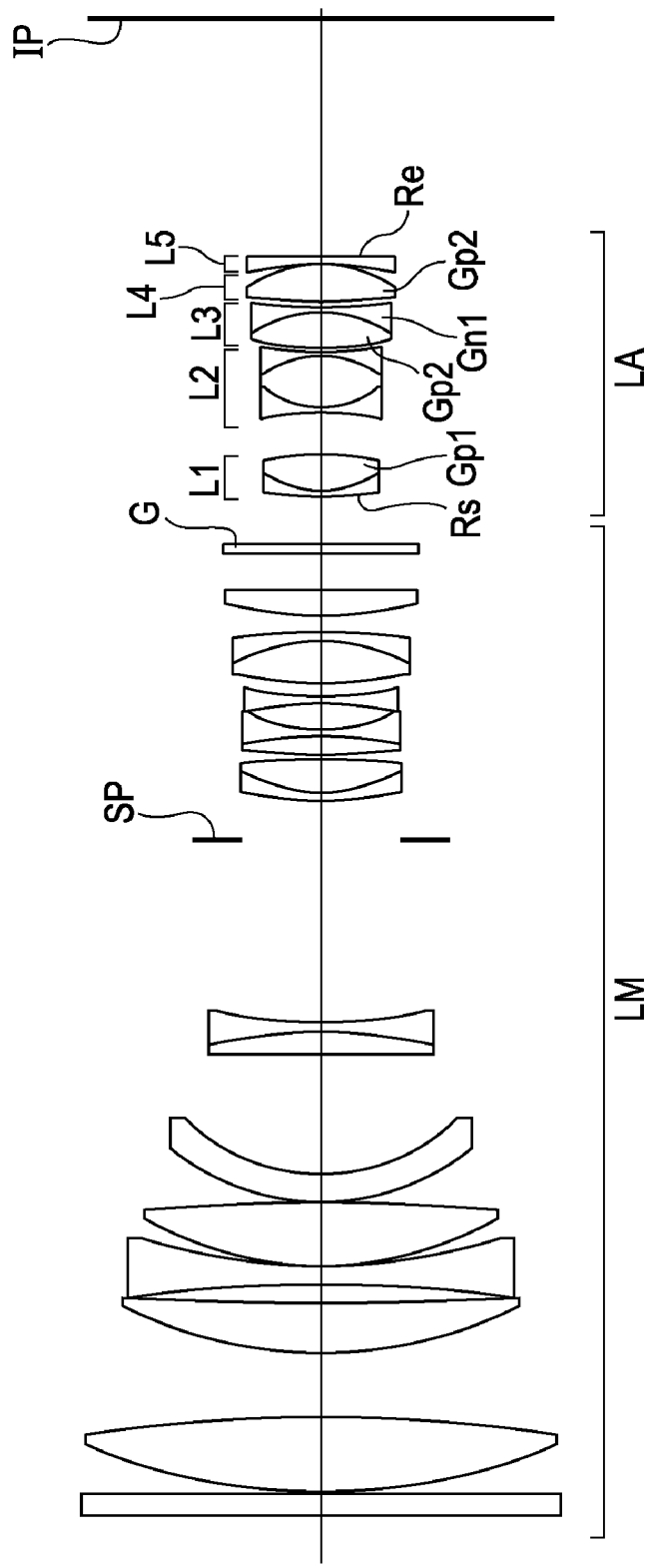
FIG. 5 is a sectional view of a lens system in which a rear attachment lens according to a second embodiment of the present invention is attached to the main lens system.
Figure 6:
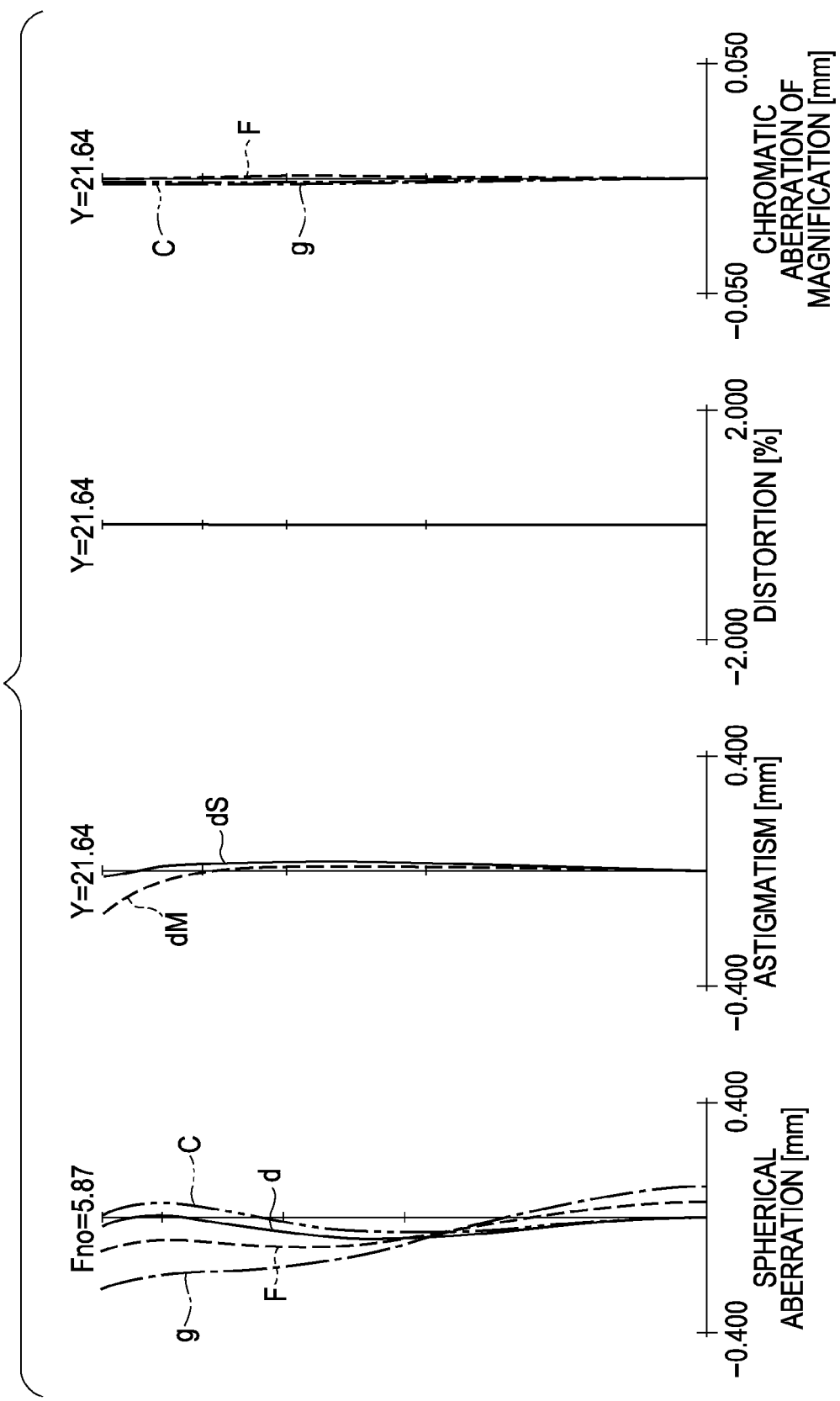
FIG. 6 shows aberration diagrams of the lens system in which the rear attachment lens according to the second embodiment of the present invention is attached to the main lens system.
Figure 7:
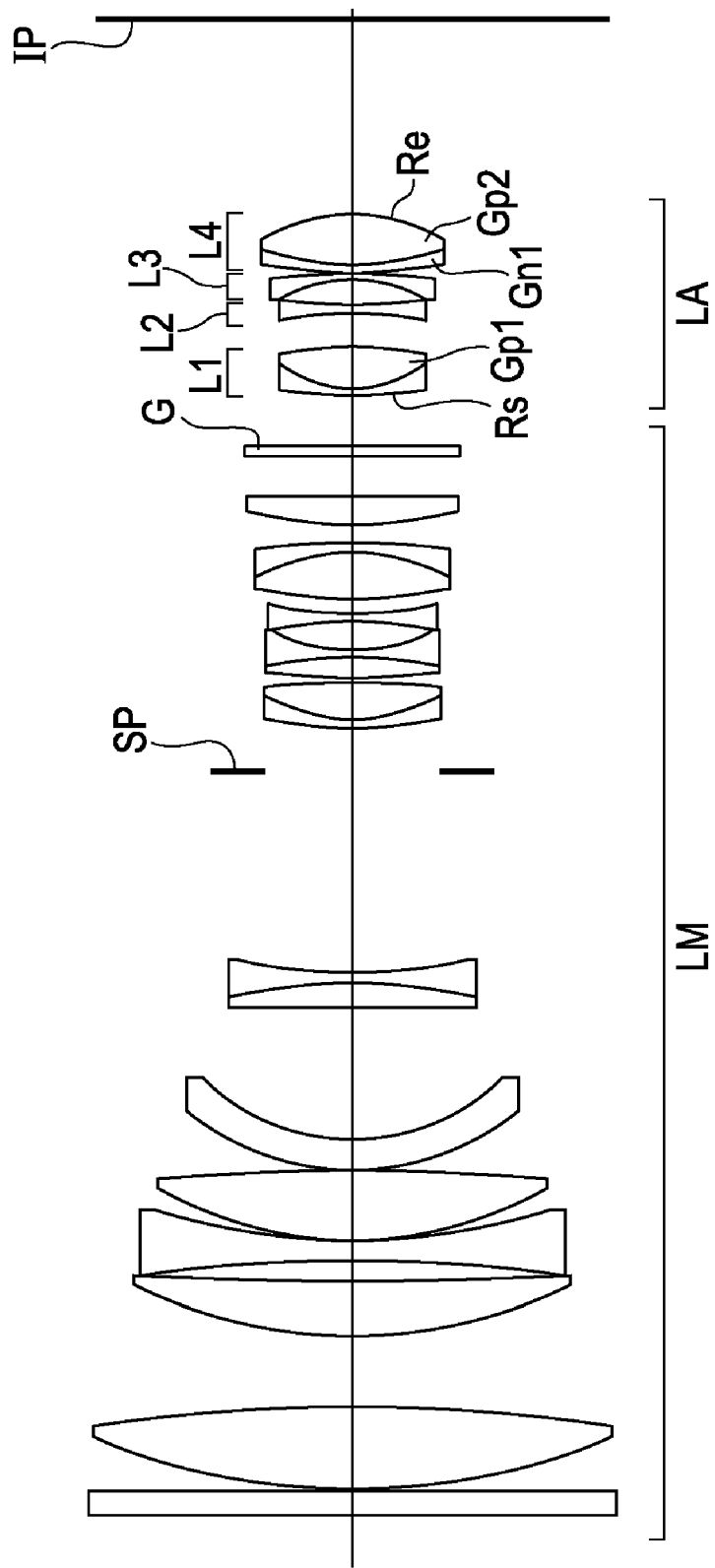
FIG. 7 is a sectional view of a lens system in which a rear attachment lens according to a third embodiment of the present invention is attached to the main lens system.
Figure 8:
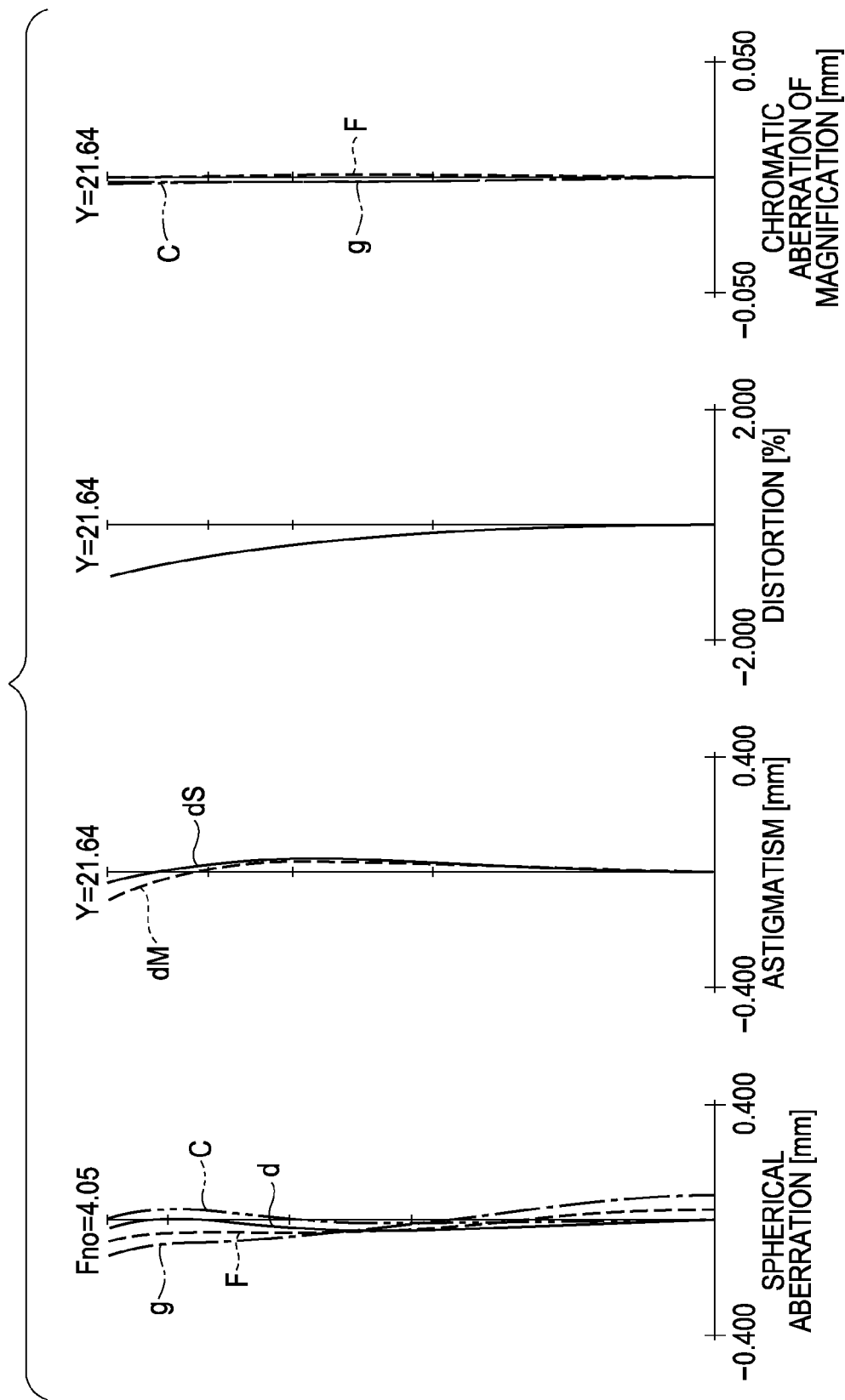
FIG. 8 shows aberration diagrams of the lens system in which the rear attachment lens according to the third embodiment of the present invention is attached to the main lens system.

FIGS. 1 and 2 show a sectional view and aberration diagrams, respectively, of an example of a main lens system (telephoto lens) to which the rear attachment lenses according to the embodiments of the present invention can be attached. FIGS. 3 and 4 show a sectional view and aberration diagrams, respectively, of a lens system in which a rear attachment lens according to a first embodiment of the present invention is attached to the main lens system at an image side thereof. FIGS. 5 and 6 show a sectional view and aberration diagrams, respectively, of a lens system in which a rear attachment lens according to a second embodiment of the present invention is attached to the main lens system at an image side thereof. FIGS. 7 and 8 show a sectional view and aberration diagrams, respectively, of a lens system in which a rear attachment lens according to a third embodiment of the present invention is attached to the main lens system at an image side thereof.

In each sectional view, the left side shows the object side and the right side shows the image side. LA denotes a rear attachment lens, Rs denotes a lens surface closest to the object side in the rear attachment lens, and Re denotes a lens surface closest to the image side (last lens surface) in the rear attachment lens. LM denotes a main lens system (master lens). The main lens system LM is a telephoto lens having a single focal length. SP denotes an aperture stop. G denotes an optical block corresponding to a protective glass or the like. IP denotes an image plane. In the case where the optical system is used as an imaging optical system of a video camera or a digital camera, the image plane IP corresponds to an image pickup plane of a solid-state image pickup element (photoelectric conversion element), such as a CCD sensor or a CMOS sensor, for receiving image light. In the case where the optical system is used as an imaging optical system of a silver-halide film camera, the image plane IP corresponds to a film surface. In the aberration diagrams, d, g, C, and F denote the d-line, the g-line, the C-line, and the F-line, respectively. In addition, dM and dS denote a meridional image plane and a sagittal image plane, respectively. The chromatic aberration of magnification is shown by the g-line. Fno denotes an F-number and Y denotes an image height.

General features of dispersion characteristic of an optical material used in the imaging optical systems according to the embodiments of the present invention will now be discussed. A partial dispersion ratio and an Abbe number of a material of lenses included in the imaging optical systems according to the embodiments of the present invention are as follows. That is, when refractive indices for the g-line (wavelength 435.8 nm), the F-line (486.1 nm), the d-line (587.6 nm), and the C-line (656.3 nm) of the Fraunhofer lines are Ng, NF, Nd, and NC, respectively, the Abbe number νd and the partial dispersion ratio θgF with respect to the g-line and the F-line are obtained as follows:

$$\nu d = (Nd-1)/(NF-NC)$$

$$\theta gF = (Ng-NF)/(NF-NC)$$

In the wavelength characteristics (dispersion characteristics) of the refractive index of the optical material, as the reciprocal of the Abbe number (1/νd) increases, the inclination of the dispersion characteristic curve increases over the entire range between the F-line and the C-line. In addition, as the partial dispersion ratio θgF increases, the inclination of the dispersion characteristic curve in the range between the g-line and the F-line with respect to the inclination thereof in the range between the F-line and the C-line (degree of curvature at the short-wavelength side) increases.

In general, the refractive index of an optical material at a short-wavelength side is higher than that at a long-wavelength side (value of the Abbe number is positive), and the dispersion characteristic curve has a downward convex shape (value of the partial dispersion ratio is positive). The variation in the refractive index relative to the variation in wavelength increases toward the short-wavelength side. With regard to a glass material, which is most commonly used as an optical material, a high-dispersion optical material having a small Abbe number has a large partial dispersion ratio, and the dispersion characteristic curve thereof has a downward convex shape that is relatively acute. In contrast, a low-dispersion optical material having a large Abbe number has a small partial dispersion ratio, and the dispersion characteristic curve thereof has a shape that is close to a straight line.

On the basis of the above description, a principle of correction of chromatic aberrations of the rear attachment lens according to each embodiment of the present invention will now be described. In general, even when the rear attachment lens itself is designed to have no aberration, the rear attachment lens serves to increase the residual aberration of the main lens in proportion to the magnification, and thereby reduces the image quality. For example, in the case where the magnification is 2, the lateral aberrations, such as the coma aberration and the chromatic aberration of magnification, is simply increased by a factor of 2 and the image quality is reduced accordingly. In addition, the spherical aberration, the field curvature, and the longitudinal aberrations, such as the axial chromatic aberration, are also increased by a factor of 2 and the image quality is reduced accordingly. To be specific, the longitudinal aberrations are increased by a factor of the square of the magnification, that is, by a factor of 4. However, since the F-number of the main lens is also increased (changed such that the brightness is reduced) by a factor of 2, the aberrations corresponding to a unit focal depth are increased by a factor of 2. The rear attachment lens that lengthens the focal length of the main lens system has a negative refractive power.

In a known rear attachment lens, to effectively correct the axial chromatic aberration generated by the negative refractive power, a positive lens is formed of a high-dispersion optical material and a negative lens is formed of a low-dispersion optical material. However, the incidence height h– of the off-axis principal ray is large at the position where the rear attachment lens is attached. Therefore, if a positive lens formed of a high-dispersion optical material and a negative lens formed of a low-dispersion optical material are used, a large amount of chromatic aberration of magnification for the C-line is generated in an outer area, and large amounts of chromatic aberration of magnification for the F-line and the g-line are generated in an inner area. Thus, the known rear attachment lens not only increases the residual chromatic aberration of magnification in the main lens system but also has a function of increasing the chromatic aberration of magnification by itself. As a result, the image quality is significantly reduced by the rear attachment lens.

Therefore, according to the embodiments of the present invention, a negative lens formed of a material having a very high dispersion is disposed at the image side, where the incidence height h of the axial ray is small and the incidence height h– of the off-axis principal ray is large. Accordingly, a chromatic aberration of magnification for the C-line is generated in an inner area, and a chromatic aberration of magnification for the F-line and the g-line are generated in an outer area without excessively generating the axial chromatic aberration. As a result, the axial chromatic aberration and the chromatic aberration of magnification can be reliably corrected.

In addition, to reliably correct the axial chromatic aberration that is somewhat increased by the negative lens formed of the material having a very high dispersion, a positive lens formed of a high-dispersion material can be disposed at the object side, where the incidence height h of the axial ray is large and the incidence height h– of the off-axis ray is relatively small.

In addition, a positive lens formed of a high-dispersion material having a relatively small partial dispersion ratio, such as a material mainly containing $Nb_2O_3$ (niobium oxide), can be disposed at the image side where the incidence height h of the axial ray is small and the incidence height h– of the off-axis principal ray is large. Accordingly, the chromatic aberration of magnification for the g-line is reliably corrected. The dispersion of the material that mainly contains $Nb_2O_3$ is somewhat lower than that of a material that mainly contains $TiO_2$ (titanium oxide), which is the most common high-dispersion optical material. However, the material that mainly contains $Nb_2O_3$ has a relatively small partial dispersion ratio.

The structure for satisfying the above-described conditions will now be described. In the rear attachment lens according to each embodiment of the present invention, a negative lens Gn1 (negative lens unit) formed of a high-dispersion material having a large partial dispersion ratio is disposed at the image side where the incidence height h of the axial ray is small and the incidence height h– of the off-axis principal ray is large. Accordingly, the axial chromatic aberration is not increased and the chromatic aberration of magnification is reliably corrected.

More specifically, when L is a distance between a lens surface closest to the object side and a lens surface closest to the image side (the overall optical length) in the rear attachment lens, a negative lens Gn1 is disposed within an area in which a distance from the negative lens Gn1 to the lens surface closest to the object side in the rear attachment lens is in the range of 0.5L to 1.0L. When vdn1 is the Abbe number of the negative lens Gn1 with respect to the d-line and θgFn1 is the partial dispersion ratio of the negative lens Gn1 with respect to the g-line and the F-line, the following expressions are satisfied:

$$10 < vdn1 < 23 \qquad (1)$$

$$0.020 < \theta gFn1 - 0.6438 + 0.001682 * vdn1 < 0.100 \qquad (2)$$

Here, the state in which the negative lens is disposed within the area in which the distance is in the range of 0.5L to 1.0L means the state in which the entire body of the negative lens is disposed within the range of 0.5L to 1.0L.

If the negative lens Gn1 is disposed at a position where the distance from the negative lens Gn1 to the lens surface closest to the object side in the rear attachment lens is less than 0.5L, the incidence height h of the axial ray is large and the incidence height h– of the off-axis principal ray is small. Therefore, the effect of correcting the chromatic aberration of magnification is reduced and the axial chromatic aberration is increased.

If the value of Conditional Expression (1) is greater than the upper limit thereof, it becomes difficult to reliably correct the chromatic aberration of magnification for the C-line and the F-line. If the value of Conditional Expression (1) is smaller than the lower limit thereof, although the chromatic aberration of magnification for the C-line and the F-line can be reliably corrected, the axial chromatic aberration is increased.

If the value of Conditional Expression (2) is greater than the upper limit thereof, although the chromatic aberration of magnification for the g-line can be reliably corrected, the axial chromatic aberration is increased. If the value of Conditional Expression (2) is smaller than the lower limit thereof, it becomes difficult to reliably correct the chromatic aberration of magnification for the g-line. The numerical ranges of Conditional Expressions (1) and (2) can be set as follows:

$$15 < vdn1 < 23 \quad (1a)$$

$$0.023 < \theta gFn1 - 0.6438 + 0.001682 * vdn1 < 0.050 \quad (2a)$$

According to the embodiments of the present invention, rear attachment lenses capable of reliably correcting the axial chromatic aberration and the chromatic aberration of magnification are provided by the above-described method.

According to the embodiments of the present invention, at least one of the conditions described below can be satisfied to more effectively correct the chromatic aberrations.

In the rear attachment lenses according to the embodiments of the present invention, to correct the axial chromatic aberration increased by the negative lens Gn1, a positive lens Gp1 (first positive lens unit) formed of a high-dispersion material having a relatively large partial dispersion ratio is disposed at the object side, where the incidence height h of the axial ray is large and the incidence height h− of the off-axis principal ray is relatively small.

More specifically, the positive lens Gp1 is disposed within an area in which a distance from the positive lens Gp1 to the lens surface closest to the object side in the rear attachment lens is in the range of 0 to 0.5L. When Ndp1 and vdp1 are the refractive index and the Abbe number, respectively, of the material of the positive lens Gp1 with respect to the d-line and θgFp1 is the partial dispersion ratio of the material of the positive lens Gp1 with respect to the g-line and the F-line, the following expressions can be satisfied:

$$1.90 < Ndp1 + 0.0125 vdp1 < 2.24 \quad (3)$$

$$0.001 < \theta gFp1 - 0.6438 + 0.001682 * vdp1 < 0.020 \quad (4)$$

In the case where the positive lens Gp1 is disposed at a position where the distance from the lens surface closest to the object side in the rear attachment lens is more than 0.5L, the incidence height h of the axial ray is small and the incidence height h− of the off-axis principal ray is large. Therefore, the effect of correcting the axial chromatic aberration is reduced and the chromatic aberration of magnification is increased.

If the value of Conditional Expression (3) is greater than the upper limit thereof, in the case where the Abbe number is large, it becomes difficult to reliably correct the axial chromatic aberration for the C-line and the F-line generated by the negative lens Gn1. In addition, in the case where the refractive index of the positive lens Gp1 is large, it becomes difficult to reliably correct the spherical aberration. If the value of Conditional Expression (3) is smaller than the lower limit thereof, it becomes difficult to obtain a material that can be easily processed, and only materials, such as resin materials, which are difficult to process can be used. Therefore, from the viewpoint of productivity, it becomes difficult to stably produce rear attachment lenses having the desired optical performance.

If the value of Conditional Expression (4) is greater than the upper limit thereof, the chromatic aberration of magnification for the g-line is increased. If the value of Conditional Expression (4) is smaller than the lower limit thereof, the effect of correcting the axial chromatic aberration for the g-line is reduced. The numerical ranges of Conditional Expressions (3) and (4) can be set as follows:

$$2.00 < Ndp1 + 0.0125 vdp1 < 2.15 \quad (3a)$$

$$0.001 < \theta gFp1 - 0.6438 + 0.001682 * vdp1 < 0.015 \quad (4a)$$

In addition, in the rear attachment lenses according to the embodiments of the present invention, a positive lens Gp2 (second positive lens unit) formed of a high-dispersion material having a relatively small partial dispersion ratio is disposed at the image side where the incidence height h of the axial ray is small and the incidence height h− of the off-axis principal ray is large. Accordingly, the axial chromatic aberration is not increased and the chromatic aberration of magnification for the g-line is reliably corrected.

More specifically, the positive lens Gp2 is disposed within an area in which a distance from the positive lens Gp2 to the lens surface closest to the object side in the rear attachment lens is in the range of 0.5L to 1.0L. When Ndp2 and vdp2 are the refractive index and the Abbe number, respectively, of the material of the positive lens Gp2 with respect to the d-line and θgFp2 is the partial dispersion ratio of the material of the positive lens Gp2 with respect to the g-line and the F-line, the following expressions are satisfied:

$$1.90 < Ndp2 + 0.0125 vdp2 < 2.24 \quad (5)$$

$$-0.010 < \theta gFp2 - 0.6438 + 0.001682 * vdp2 < 0.003 \quad (6)$$

If the positive lens Gp2 is disposed at a position where the distance from the lens surface closest to the object side in the rear attachment lens is less than 0.5L, the incidence height h of the axial ray is large and the incidence height h− of the off-axis principal ray is small. Therefore, the effect of correcting the chromatic aberration of magnification is reduced and the axial chromatic aberration is increased.

If the value of Conditional Expression (5) is greater than the upper limit thereof, in the case where the Abbe number is large, it becomes difficult to reliably correct the chromatic aberration of magnification for the C-line and the F-line. In addition, in the case where the refractive index of the positive lens Gp2 is large, it becomes difficult to reliably correct the field curvature. If the value of Conditional Expression (5) is smaller than the lower limit thereof, it becomes difficult to obtain a material that can be easily processed, and only materials, such as resin materials, which are difficult to process can be used. Therefore, from the viewpoint of productivity, it becomes difficult to stably produce rear attachment lenses having the desired optical performance.

If the value of Conditional Expression (6) is greater than the upper limit thereof, it becomes difficult to reliably correct the chromatic aberration of magnification for the g-line. If the value of Conditional Expression (6) is smaller than the lower limit thereof, although the chromatic aberration of magnification for the g-line can be reliably corrected, the axial chromatic aberration is increased. The numerical ranges of Conditional Expressions (5) and (6) can be set as follows:

$$2.00 < Ndp2 + 0.0125 vdp2 < 2.23 \quad (5a)$$

$$-0.009 < \theta gFp2 - 0.6438 + 0.001682 * vdp2 < 0.001 \quad (6a)$$

The positive lens Gp2 is formed of a material that mainly contains $Nb_2O_3$. As described above, the reason why the material that mainly contains $Nb_2O_3$ is used is because the partial dispersion ratio thereof is lower than that of the common material that mainly contains $TiO_2$. However, in addition to the effect of correcting the chromatic aberrations, the following effects can be obtained.

In the imaging optical systems, to ensure color reproducibility, it is generally necessary to achieve a good color balance in light that passes through the optical systems. However, a currently available commercial material for the negative lens Gn1 that satisfies Conditional Expressions (1) and (2) mainly contains $NpO_2$ (neptunium dioxide), and has a low transmittance at the blue side.

According to each embodiment of the present invention, to reduce the color variation in the transmitted light even when $NpO_2$ is used, the negative lens Gn1, whose center thickness can be relatively easily reduced and which has a relatively small outer diameter, is disposed in the optical system. Accordingly, the color shift of the transmitted light toward the yellow side is reduced. However, when the material that mainly contains $NpO_2$ is used, the color shift of the transmitted light toward the yellow side still occurs. Therefore, according to the embodiments of the present invention, the positive lens formed of a high-dispersion material is used to shift the transmitted light in the entire optical system toward the white.

In the rear attachment lens according to the related art, a positive lens formed of a high-dispersion material has a large thickness and is generally formed of a material that mainly contains $TiO_2$, which has a relatively low transmittance at the blue side. In contrast, in the embodiments of the present invention, a material that mainly contains $Nb_2O_3$, which has a higher transmittance at the blue side compared to that of the material that mainly contains $TiO_2$, is used. Therefore, the reduction in the transmittance at the blue side caused when $NpO_2$ is used is compensated for, and the color variation in the entire optical system is reduced.

Next, the main lens system and first to third numerical examples corresponding to the first to third embodiments will be described. In the first to third numerical examples, only the data regarding the rear attachment portion is shown. The air distance for the first surface shows the distance between the lens surface closest to the image side in the main lens system and the lens surface Rs closest to the object side in the rear attachment lens. The main lens system used in the first to third numerical examples is a telephoto lens having a focal length of 300 mm, and the aberrations of the telephoto lens are sufficiently corrected. Therefore, if the aberrations are reliably corrected in the system in which each rear attachment lens is attached to the main lens system, even when the rear attachment lens is attached to other lens systems, favorable performance can be provided with respect to the initial performance.

In each numerical example, i denotes the number of each surface counted from the object side; ri denotes the radius of curvature of the $i^{th}$ optical surface; di denotes the distance between the $i^{th}$ surface and the $(i+1)^{th}$ surface along the optical axis of rear attachment lens; and ndi and vdi are the refractive index and the Abbe number, respectively, of the medium provided between the $i^{th}$ surface and the $(i+1)^{th}$ surface for the d-line. Red shows the magnification of the rear attachment lens. In addition, f shows the focal length, Fno shows the F-number, and ω shows a half field angle. In the numerical examples of the rear attachment lenses, the values of f, Fno, and ω are those in the state in which the rear attachment lenses are attached to the main lens system. Table 1 provided below shows the relationship between the above-described conditional expressions and the corresponding values in each numerical example.

NUMERICAL EXAMPLES

Numerical Example of Main Lens System

| i | ri | di | ndi | vdi | θgF | X |
|---|---|---|---|---|---|---|
| 1 | ∞ | 5.00 | 1.51633 | 64.1 | 0.5352 | −0.0007 |
| 2 | ∞ | 1.00 | | | | |
| 3 | 130.154 | 16.57 | 1.49700 | 81.5 | 0.5375 | 0.0309 |
| 4 | −352.589 | 14.11 | | | | |
| 5 | 96.004 | 11.02 | 1.49700 | 81.5 | 0.5375 | 0.0309 |
| 6 | 793.095 | 4.07 | | | | |
| 7 | −311.697 | 4.00 | 1.78590 | 44.2 | 0.5631 | −0.0064 |
| 8 | 127.604 | 0.15 | | | | |
| 9 | 79.467 | 13.88 | 1.43387 | 95.1 | 0.5373 | 0.0534 |
| 10 | −483.755 | 0.17 | | | | |
| 11 | 51.083 | 5.90 | 1.48749 | 70.2 | 0.5300 | 0.0043 |
| 12 | 40.134 | 26.71 | | | | |
| 13 | 1686.885 | 4.60 | 1.80518 | 25.4 | 0.6161 | 0.0150 |
| 14 | −107.660 | 2.20 | 1.83481 | 42.7 | 0.5636 | −0.0083 |
| 15 | 94.265 | 40.40 | | | | |
| 16 | (Stop) | 8.51 | | | | |
| 17 | 79.490 | 1.80 | 1.84666 | 23.8 | 0.6205 | 0.0167 |
| 18 | 35.239 | 7.20 | 1.72000 | 50.2 | 0.5535 | −0.0058 |
| 19 | −238.114 | 0.95 | | | | |
| 20 | 129.720 | 4.25 | 1.84666 | 23.8 | 0.6205 | 0.0167 |
| 21 | −97.425 | 1.65 | 1.60311 | 60.6 | 0.5414 | −0.0004 |
| 22 | 36.658 | 5.52 | | | | |
| 23 | −76.051 | 1.60 | 1.77250 | 49.6 | 0.5521 | −0.0083 |
| 24 | 66.247 | 2.82 | | | | |
| 25 | 78.646 | 9.30 | 1.72000 | 50.2 | 0.5535 | −0.0058 |
| 26 | −39.586 | 1.80 | 1.83400 | 37.2 | 0.5775 | −0.0038 |
| 27 | −155.699 | 4.00 | | | | |
| 28 | 81.751 | 5.50 | 1.69680 | 55.5 | 0.5433 | −0.0071 |
| 29 | ∞ | 8.00 | | | | |
| 30 | ∞ | 2 | 1.51633 | 64.14 | 0.5352 | −0.0007 |

$X=\theta gF-(0.6438-0.001682*vd)$

Data of Main Lens System
 f 293.58
 Fno 2.91
 Field Angle ω 4.22
 Image Height Y 21.64
 Overall Lens Length 274.02
 Back Focus 59.35

First Numerical Example

| i | ri | di | ndi | vdi | θgF | X |
|---|---|---|---|---|---|---|
| 1 | ∞ | 10.35 | | | | |
| 2 | 85.911 | 1.20 | 1.83481 | 42.7 | 0.5636 | −0.0083 |
| 3 | 19.084 | 7.80 | 1.59551 | 39.2 | 0.5804 | 0.0026 |
| 4 | −62.129 | 4.42 | | | | |
| 5 | −94.475 | 1.20 | 1.77250 | 49.6 | 0.5521 | −0.0083 |
| 6 | 16.798 | 11.20 | 1.65412 | 39.7 | 0.5737 | −0.0033 |
| 7 | −21.079 | 1.20 | 1.77250 | 49.6 | 0.5521 | −0.0083 |
| 8 | 56.504 | 2.18 | | | | |
| 9 | 48.089 | 4.36 | 1.69895 | 30.1 | 0.6029 | 0.0098 |
| 10 | −123.608 | 1.70 | | | | |
| 11 | −39.122 | 1.20 | 1.92286 | 18.9 | 0.6495 | 0.0375 |
| 12 | −1369.218 | 2.29 | | | | |
| 13 | −187.967 | 6.57 | 1.65412 | 39.7 | 0.5737 | −0.0033 |
| 14 | −24.270 | 0.15 | | | | |

-continued

| i | ri | di | ndi | vdi | θgF | X |
|---|---|---|---|---|---|---|
| 15 | −85.052 | 1.50 | 1.77250 | 49.6 | 0.5521 | −0.0083 |
| 16 | −1401.904 | | | | | |

$X=\theta gF-(0.6438-0.001682*vd)$

Data of First Numerical Example (When Attached to Main Lens)
Red 2.00
f 586.01
Fno 5.87
Field Angle ω2.11
Image Height Y 21.64
Overall Lens Length 329.31
Back Focus 57.31
Overall Optical Length L 46.97

Second Numerical Example

| i | ri | di | ndi | vdi | θgF | X |
|---|---|---|---|---|---|---|
| 1 | ∞ | 10.35 | | | | |
| 2 | 136.414 | 1.20 | 1.83481 | 42.7 | 0.5636 | −0.0083 |
| 3 | 22.175 | 7.36 | 1.59551 | 39.2 | 0.5804 | 0.0026 |
| 4 | −68.331 | 9.43 | | | | |
| 5 | −58.764 | 1.20 | 1.77250 | 49.6 | 0.5521 | −0.0083 |
| 6 | 18.051 | 11.19 | 1.62588 | 35.7 | 0.5893 | 0.0055 |
| 7 | −20.915 | 1.20 | 1.77250 | 49.6 | 0.5521 | −0.0083 |
| 8 | 71.344 | 0.58 | | | | |
| 9 | 51.044 | 7.75 | 1.74950 | 35.3 | 0.5818 | −0.0026 |
| 10 | −27.171 | 1.20 | 1.80810 | 22.8 | 0.6307 | 0.0251 |
| 11 | 90.127 | 1.42 | | | | |
| 12 | 150.040 | 8.06 | 1.65412 | 39.7 | 0.5737 | −0.0033 |
| 13 | −27.823 | 0.15 | | | | |
| 14 | −71.798 | 1.50 | 1.77250 | 49.6 | 0.5521 | −0.0083 |
| 15 | 1016.662 | | | | | |

$X=\theta gF-(0.6438-0.001682*vd)$

Data of Second Numerical Example (When Attached to Main Lens)
Red 2.00
f 586.02
Fno 5.87
Field Angle ω 2.11
Image Height Y 21.64
Overall Lens Length 330.02
Back Focus 52.75
Overall Optical Length L 52.24

Third Numerical Example

| i | ri | di | ndi | vdi | θgF | X |
|---|---|---|---|---|---|---|
| 1 | | 10.35 | | | | |
| 2 | 92.808 | 1.50 | 1.80400 | 46.6 | 0.5572 | −0.0083 |
| 3 | 22.273 | 8.08 | 1.59551 | 39.2 | 0.5804 | 0.0026 |
| 4 | −80.529 | 6.85 | | | | |
| 5 | −86.414 | 1.50 | 1.77250 | 49.6 | 0.5521 | −0.0083 |
| 6 | 80.626 | 4.95 | | | | |
| 7 | −30.609 | 1.50 | 1.83481 | 42.7 | 0.5636 | −0.0083 |
| 8 | −122.847 | 0.15 | | | | |
| 9 | 92.075 | 1.60 | 1.92286 | 18.9 | 0.6495 | 0.0375 |
| 10 | 53.083 | 9.97 | 1.65412 | 39.7 | 0.5737 | −0.0033 |
| 11 | −36.550 | | | | | |

$X=\theta gF-(0.6438-0.001682*vd)$

Data of Third Numerical Example (When Attached to Main Lens)
Red 1.39
f 408.00
Fno 4.05
Field Angle ω 3.04
Image Height Y 21.64
Overall Lens Length 300.55
Back Focus 39.43
Overall Optical Length L 36.1

TABLE 1

| Conditional Expression | 1st Example | 2nd Example | 3rd Example |
|---|---|---|---|
| (1) | 18.9 (L4) | 22.8 (L3 Negative) | 18.9 (L4 Negative) |
| (2) | 0.0375 (L4) | 0.0251 (L3 Negative) | 0.0375 (L4 Negative) |
| Position of negative lens Gn1 that satisfies Conditional Expressions (1) and (2) | 0.751L | 0.764L | 0.679L |
| (3) | 2.0860 (L1 Positive) | 2.0860 (L1 Positive) | 2.0860 (L1 Positive) |
| (4) | 0.0026 (L1 Positive) | 0.0026 (L1 Positive) | 0.0026 (L1 Positive) |
| Position of positive lens Gp1 that satisfies Conditional Expressions (3) and (4) | 0.026L | 0.023L | 0.042L |
| (5) | 2.1504 (L5) | 2.1911 (L3 Positive) 2.1504 (L4) | 2.1504 (L4 Positive) |
| (6) | −0.0033 (L5) | −0.0026 (L3 Positive) −0.0033 (L4) | −0.0033 (L4 Positive) |
| Position of positive lens Gp2 that satisfies Conditional Expressions (5) and (6) | 0.825L | 0.616L (L3 Positive) 0.814L (L4) | 0.724L |

The structures of the rear attachment lenses according to the numerical examples of the present invention will now be described. A rear attachment lens LA according to the first numerical example includes a cemented lens L1 including a negative lens and a positive lens Gp1 and a cemented lens L2 including a negative lens, a positive lens, and a negative lens in order from the object side to the image side. In addition, the rear attachment lens LA also includes a positive lens L3, a negative lens (Gn1) L4, a positive lens (Gp2) L5, and a negative lens L6.

A rear attachment lens LA according to the second numerical example includes a cemented lens L1 including a negative lens and a positive lens Gp1 and a cemented lens L2 including a negative lens, a positive lens, and a negative lens in order from the object side to the image side. In addition, the rear attachment lens LA also includes a cemented lens L3 including a positive lens Gp2 and a negative lens Gn1, a positive lens (Gp2) L4, and a negative lens L5.

A rear attachment lens LA according to the third numerical example includes a cemented lens L1 including a negative lens and a positive lens Gp1, a negative lens L2, a negative lens L3, and a cemented lens L4 including a negative lens Gn1 and a positive lens Gp2 in order from the object side to the image side.

Each of the negative lens (Gn1) L4 according to the first numerical example, the negative lens Gn1 included in the cemented lens L3 according to the second numerical example, and the negative lens Gn1 included in the cemented lens L4 according to the third numerical example satisfies Conditional Expressions (1) and (2), and is disposed at a position where the incidence height h of the axial ray is small and the incidence height h− of the off-axis principal ray is large. Accordingly, the axial chromatic aberration is not increased and the chromatic aberration of magnification for the C-line, the F-line, and the g-line is reliably corrected.

Each of the positive lens Gp1 included in the cemented lens L1 according to the first numerical example, the positive lens Gp1 included in the cemented lens L1 according to the second numerical example, and the positive lens Gp1 included in the cemented lens L1 according to the third numerical example satisfies Conditional Expressions (3) and (4), and is disposed at a position where the incidence height h of the axial ray is large and the incidence height h− of the off-axis principal ray is small. Accordingly, the axial chromatic aberration, which is somewhat increased by the negative lens that satisfies Conditional Expressions (1) and (2), is corrected without increasing the chromatic aberration of magnification.

Each of the positive lens (Gp2) L5 according to the first numerical example, the positive lens Gp2 included in the cemented lens L3 according to the second numerical example, the positive lens (Gp2) L4 according to the second numerical example, and the positive lens Gp2 included in the cemented lens L4 according to the third numerical example satisfies Conditional Expressions (5) and (6), and is disposed at a position where the incidence height h of the axial ray is small and the incidence height h− of the off-axis principal ray is large. Accordingly, the axial chromatic aberration is not increased and the chromatic aberration of magnification for the g-line is reliably corrected. The negative lenses that satisfy Conditional Expressions (1) and (2) in the numerical examples are formed of a material that mainly contains $NpO_2$.

The positive lenses that satisfy Conditional Expressions (5) and (6) in the numerical examples are formed of a material that mainly contains $Nb_2O_3$. In general, the material that mainly contains $NpO_2$ has a relatively low transmittance at the blue side, and the transmittance is slightly reduced at the blue side in the entire optical system even when the center thickness of the negative lens is small.

Therefore, according to the embodiments of the present invention, attention is focused on a positive lens made of a high-dispersion material, which has a large center thickness and which generally has a relatively low transmittance at the blue side, to compensate for the reduction in the transmittance at the blue side. More specifically, a material that mainly contains $Nb_2O_3$, which has a relatively high transmittance at the blue side, is used in place of a material that mainly contains $TiO_2$, which is often used to form a positive lens made of a high-dispersion material. As a result, color variation in the transmitted light in the entire optical system is reduced.

Figure 9:
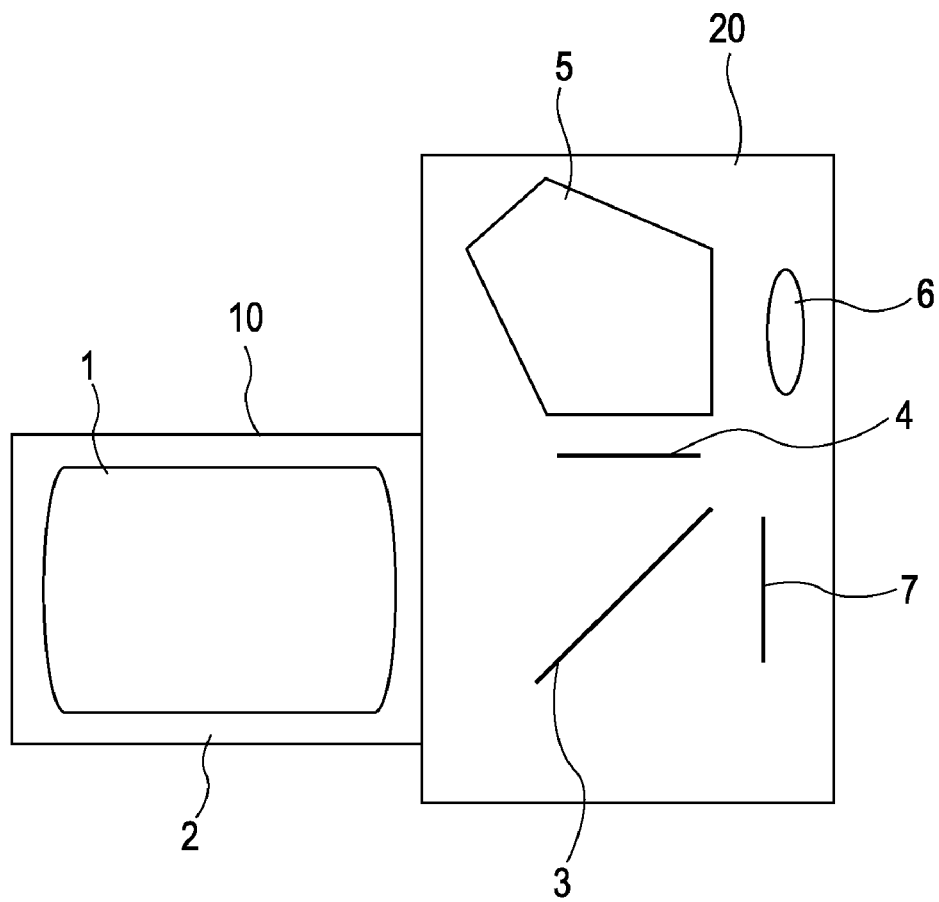
FIG. 9 is a schematic diagram illustrating the main part of an image pickup apparatus according to an embodiment of a present invention.

Next, a single-lens reflex camera (image pickup apparatus) including an imaging optical system in which the rear attachment lens according to any one of the embodiments of the present invention is attached to the main lens system at the image side thereof will be described with reference to FIG. 9. In FIG. 9, an imaging lens 10 includes an imaging optical system 1 according to any one of the first to third embodiments. The imaging optical system 1 is held by a barrel 2, which functions as a holding member. A camera body 20 includes a quick return mirror 3 which reflects light rays from the imaging lens 10 upward and a focusing screen 4 disposed at an image-forming position of the imaging lens 10. The camera body 20 also includes a penta-roof prism 5 which converts an inverse image formed on the focusing screen 4 into an erect image and an ocular lens 6 with which the erect image can be magnified. A solid-state image pickup element (photoelectric conversion element), such as a CCD sensor and a CMOS sensor, or a silver-halide film that serves as a light-receiving unit (recording unit) is disposed on a photosensitive surface 7. In a shooting operation, the quick return mirror 3 is moved away from an optical path and an image is formed on the photosensitive surface 7 by the imaging lens 10.

Rear attachment lenses according to other embodiments of the present invention, imaging optical systems obtained by attaching the rear attachment lenses to a main lens system, and an image pickup apparatus including any one of the imaging optical systems will now be described.

Each of the rear attachment lenses according to the embodiments of the present invention includes a first unit having a positive refractive power and including a positive lens and a negative lens; a second unit positioned on the image side of the first unit and including a positive lens and a negative lens; a third unit positioned on the image side of the second unit and including a positive lens; and a fourth unit positioned on the image side of the third unit and including a positive lens and a negative lens. The first unit includes two lenses, or a single lens and a cemented lens in order from the object side to the image side. The second unit includes a cemented lens in which two or more lenses are cemented together, or a single lens and a cemented lens in order from the object side to the image side. The fourth unit includes two lenses, or a cemented lens and a single lens in order from the object side to the image side.

Figure 10A:
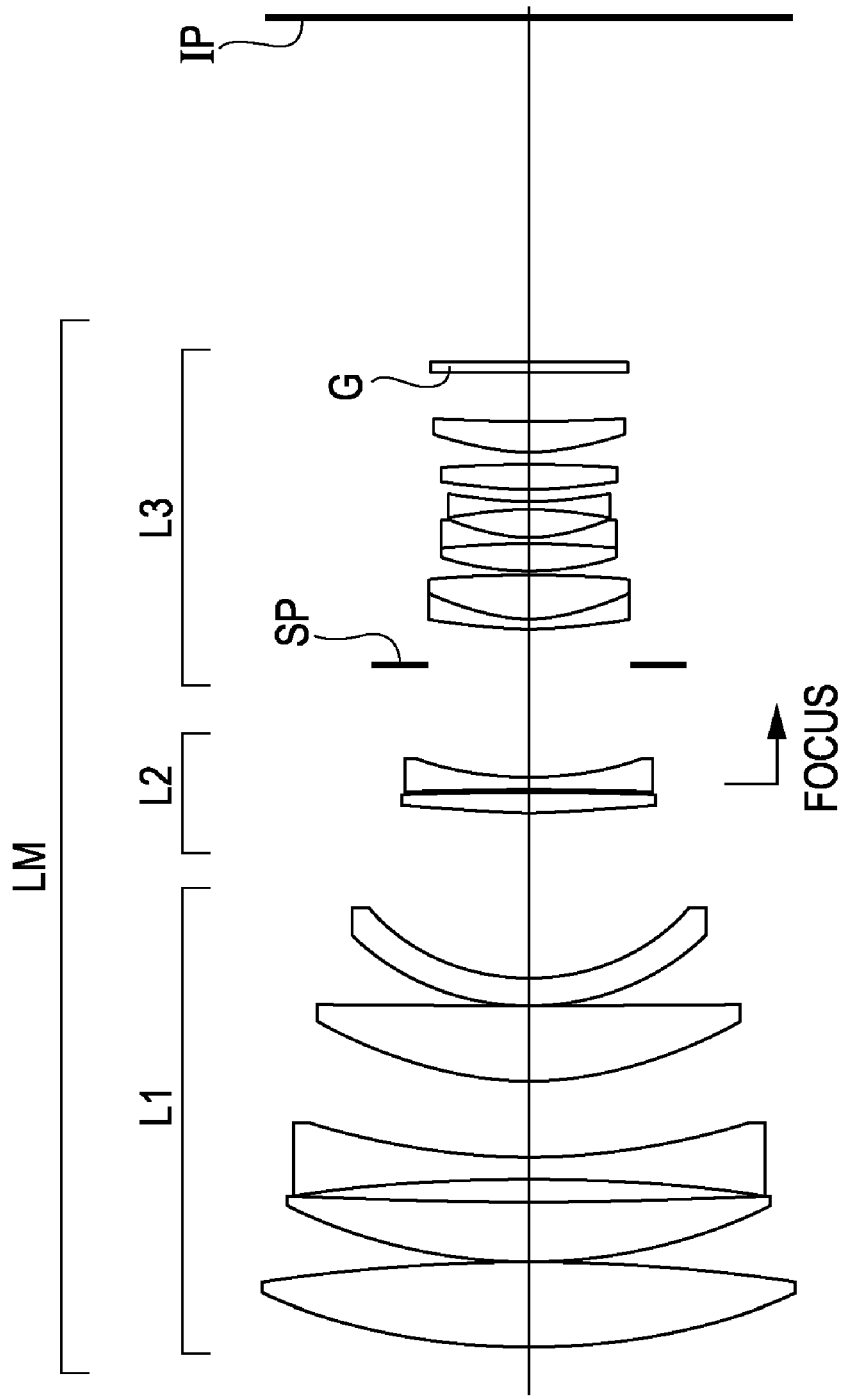
FIG. 10A is a sectional view of a main lens system.
Figure 11A:
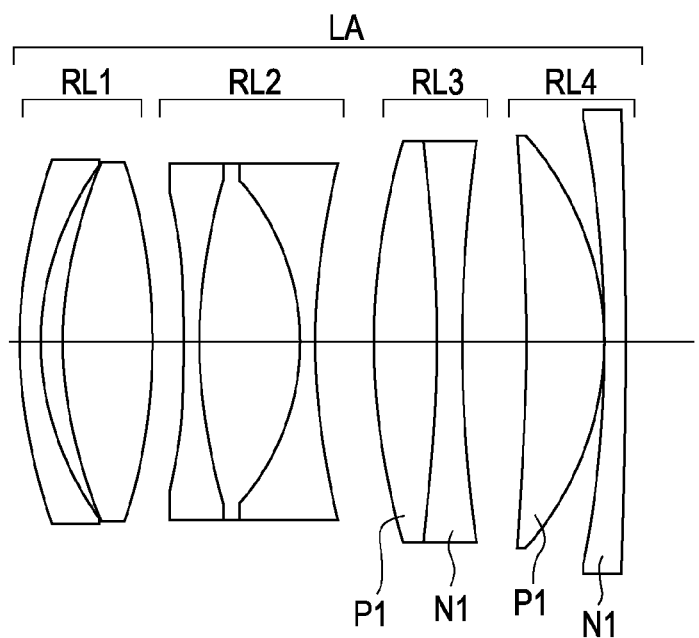
FIG. 11A is a sectional view of a rear attachment lens according to a fourth embodiment.
Figure 11B:
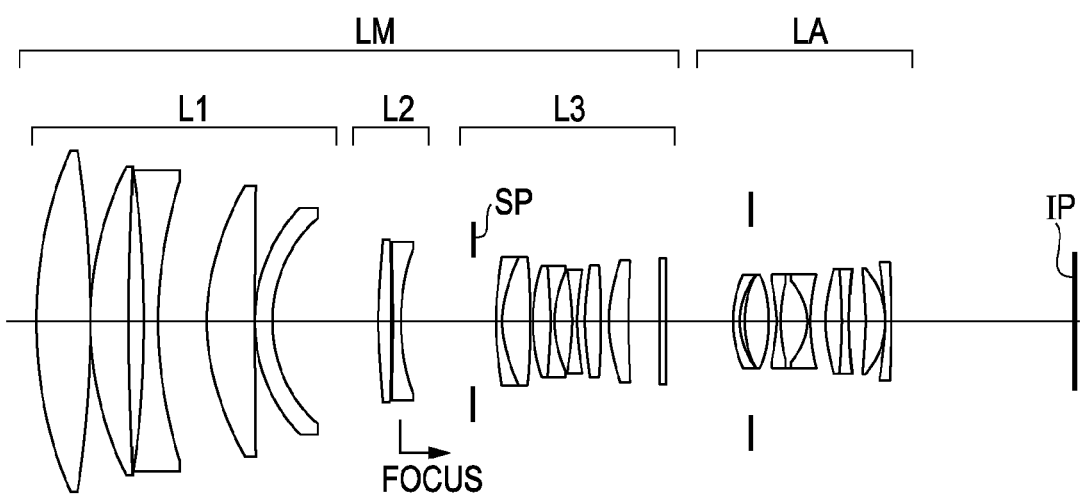
FIG. 11B is a sectional view of a lens system in which the rear attachment lens according to the fourth embodiment is attached to the main lens system.
Figure 12A:
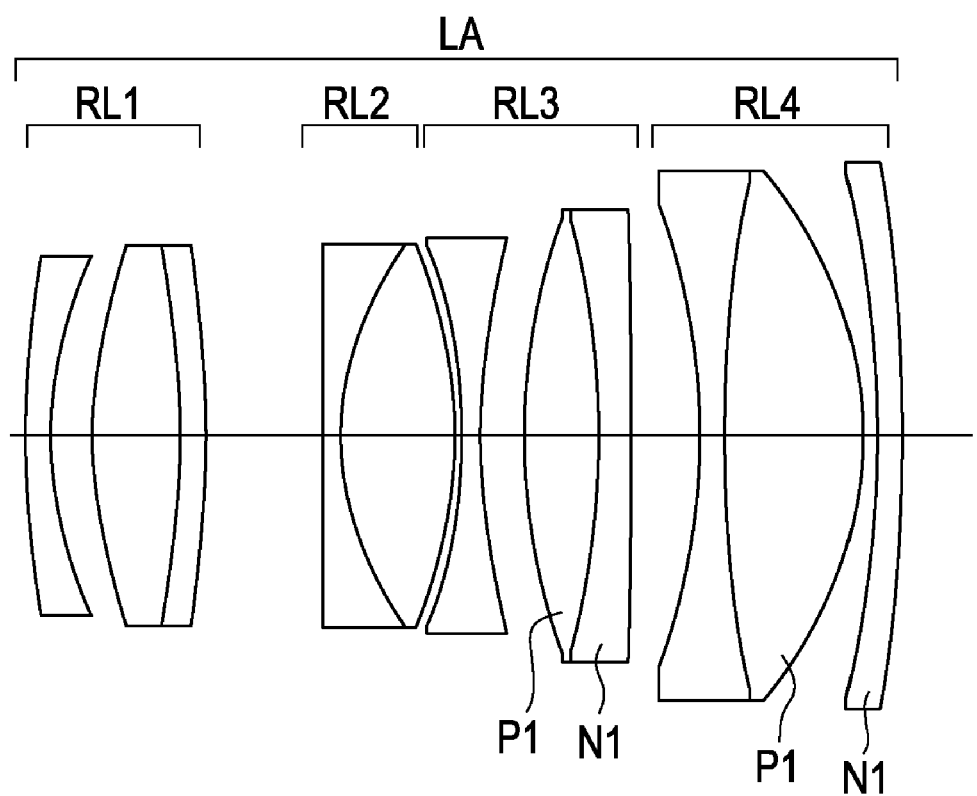
FIG. 12A is a sectional view of a rear attachment lens according to a fifth embodiment.
Figure 12B:
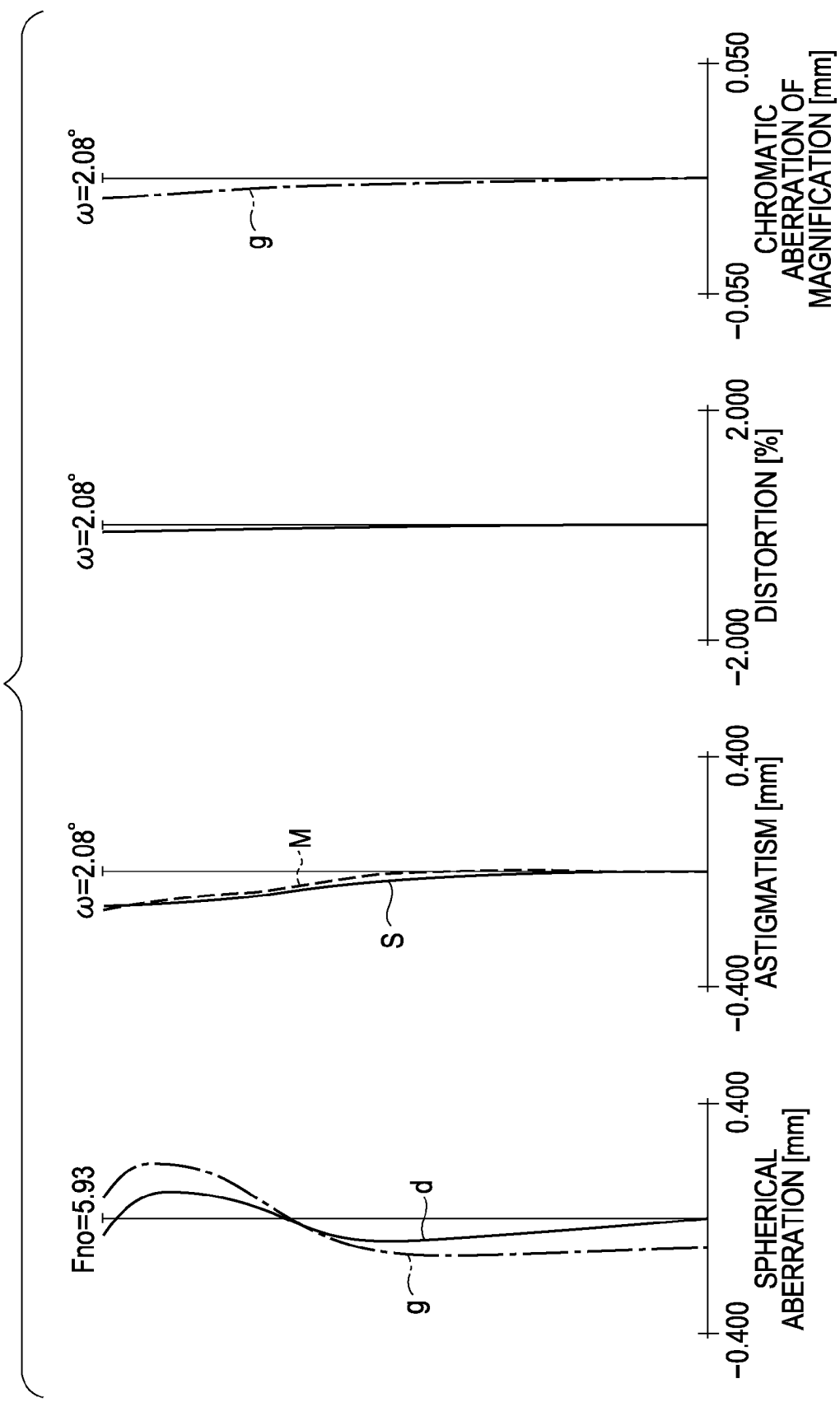
FIG. 12B shows aberration diagrams of a lens system in which the rear attachment lens according to the fifth embodiment is attached to the main lens system.
Figure 13A:
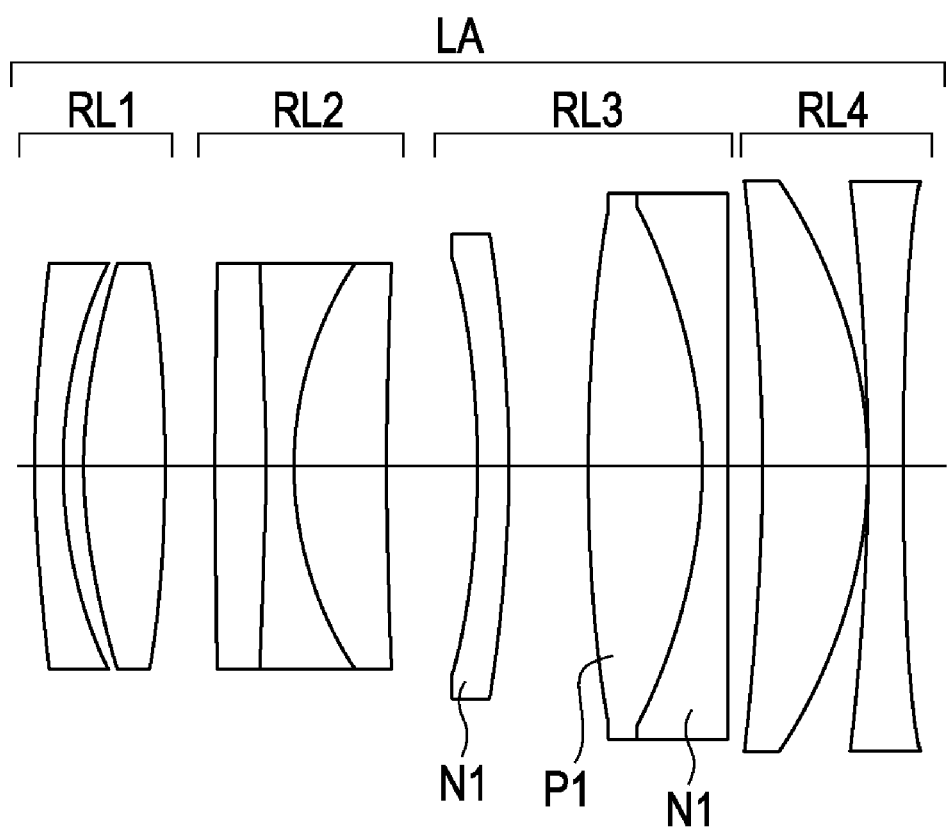
FIG. 13A is a sectional view of a rear attachment lens according to a sixth embodiment.
Figure 13B:
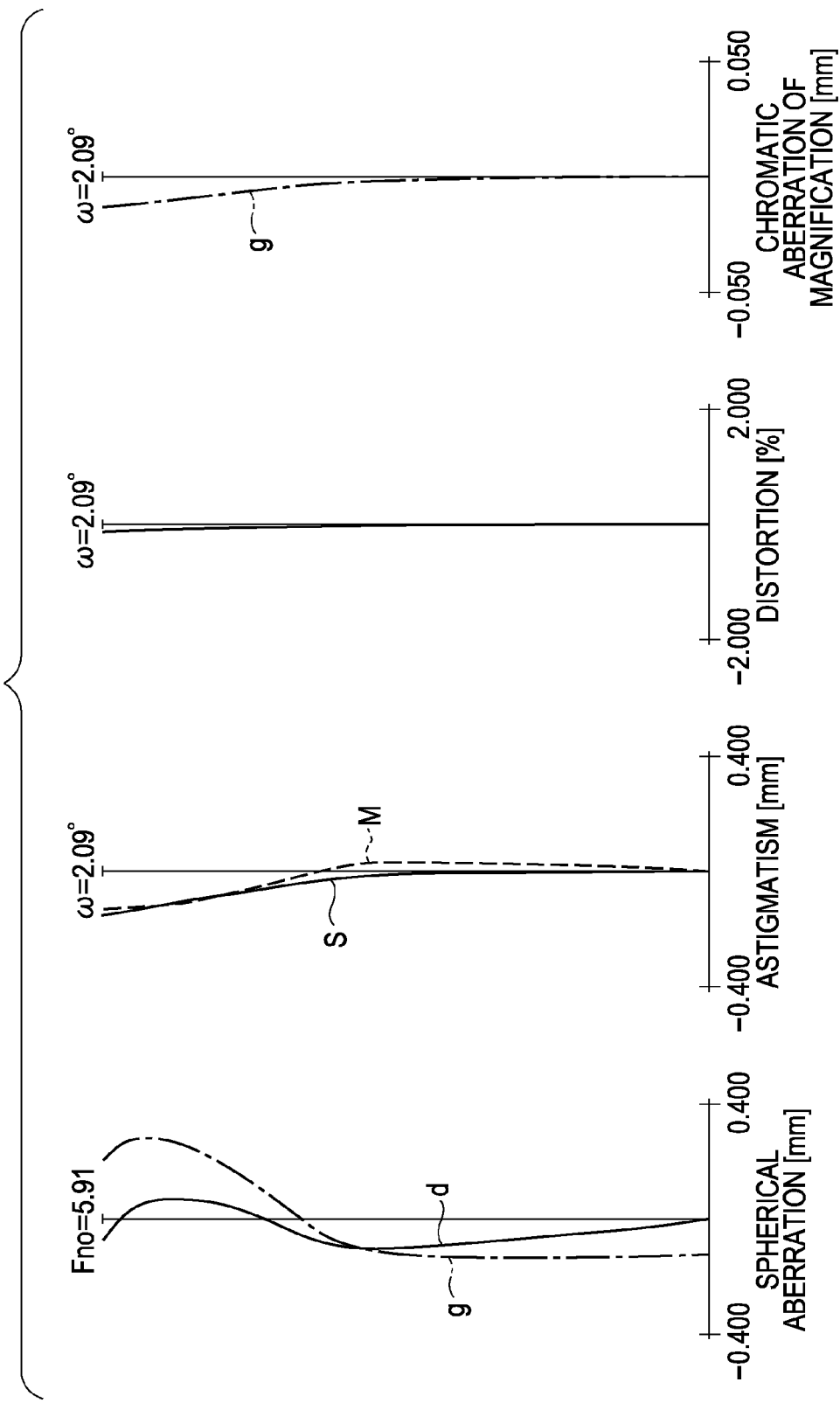
FIG. 13B shows aberration diagrams of a lens system in which the rear attachment lens according to the sixth embodiment is attached to the main lens system.
Figure 14A:
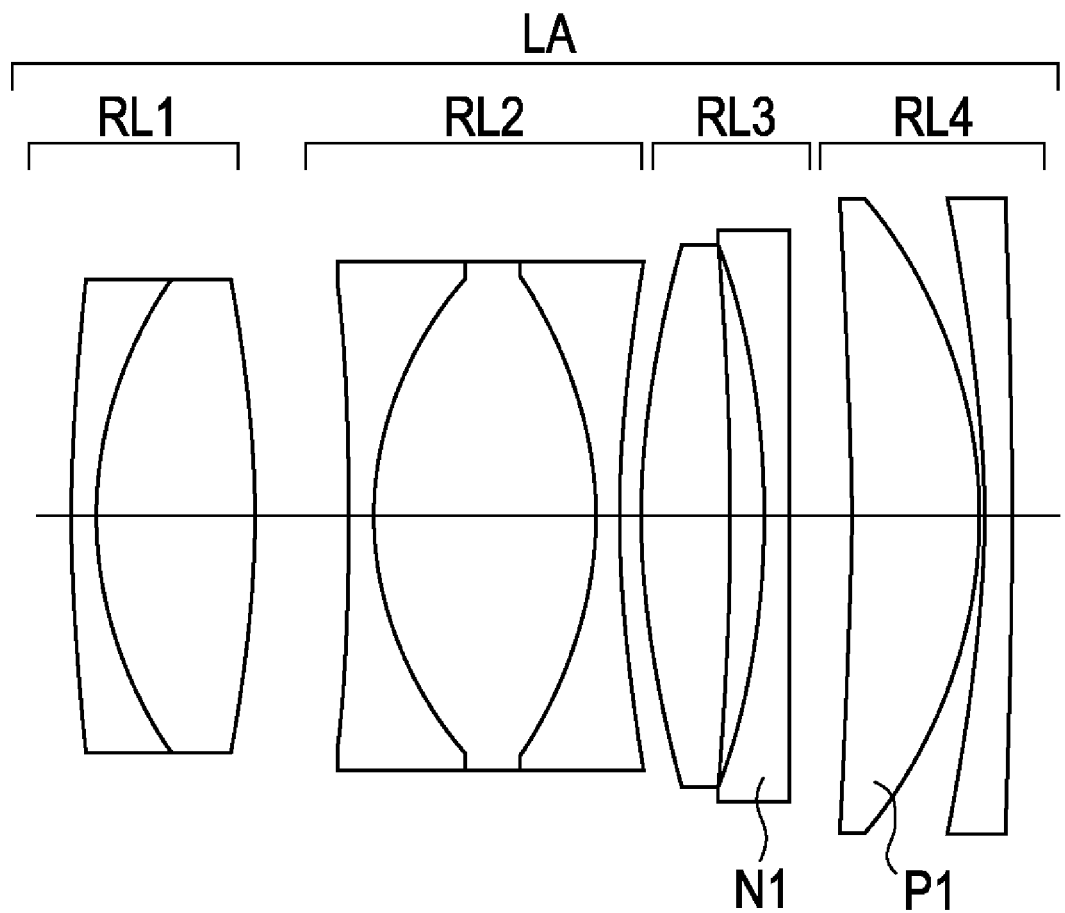
FIG. 14A is a sectional view of a rear attachment lens according to a seventh embodiment.
Figure 14B:
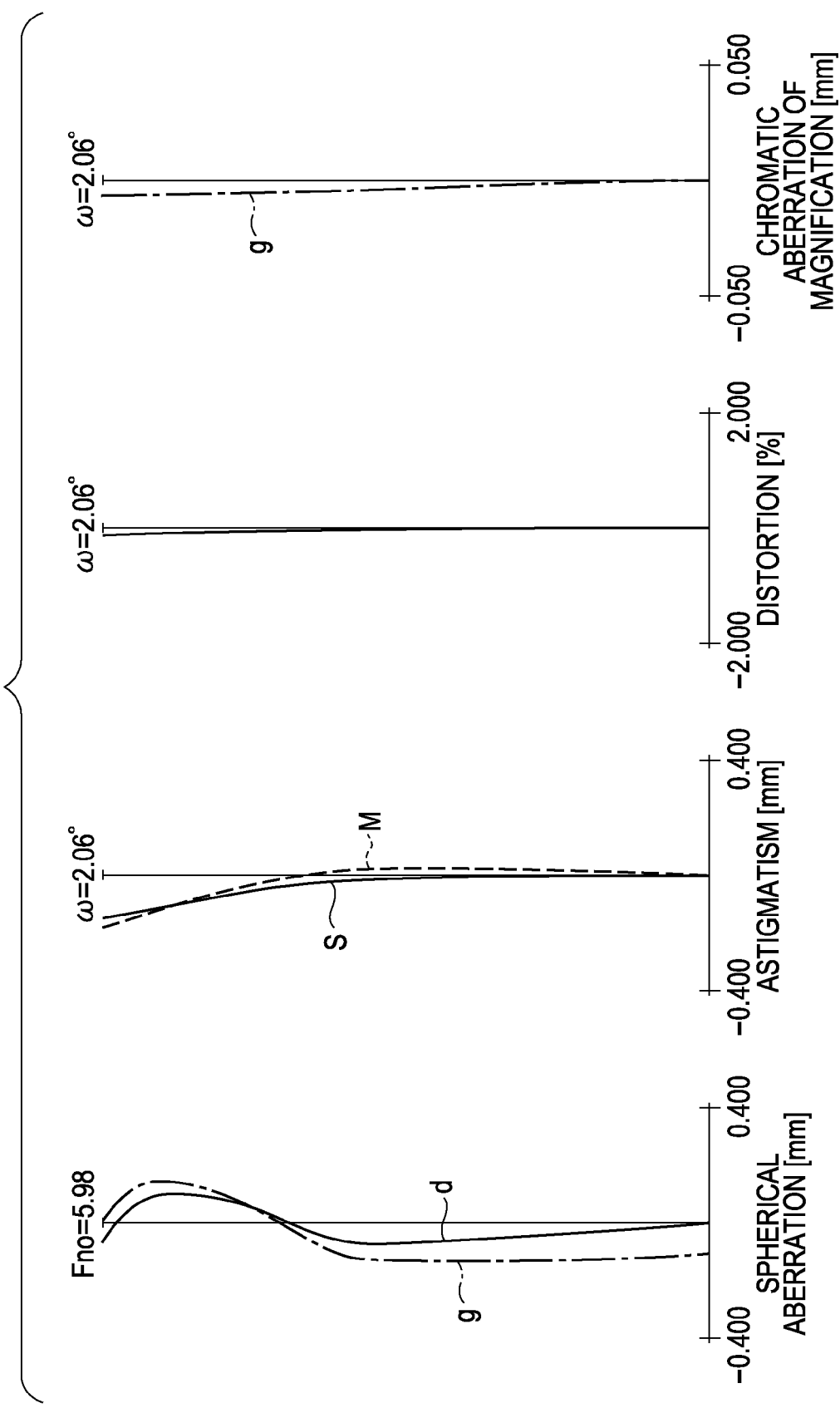
FIG. 14B shows aberration diagrams of a lens system in which the rear attachment lens according to the seventh embodiment is attached to the main lens system.
Figure 15A:
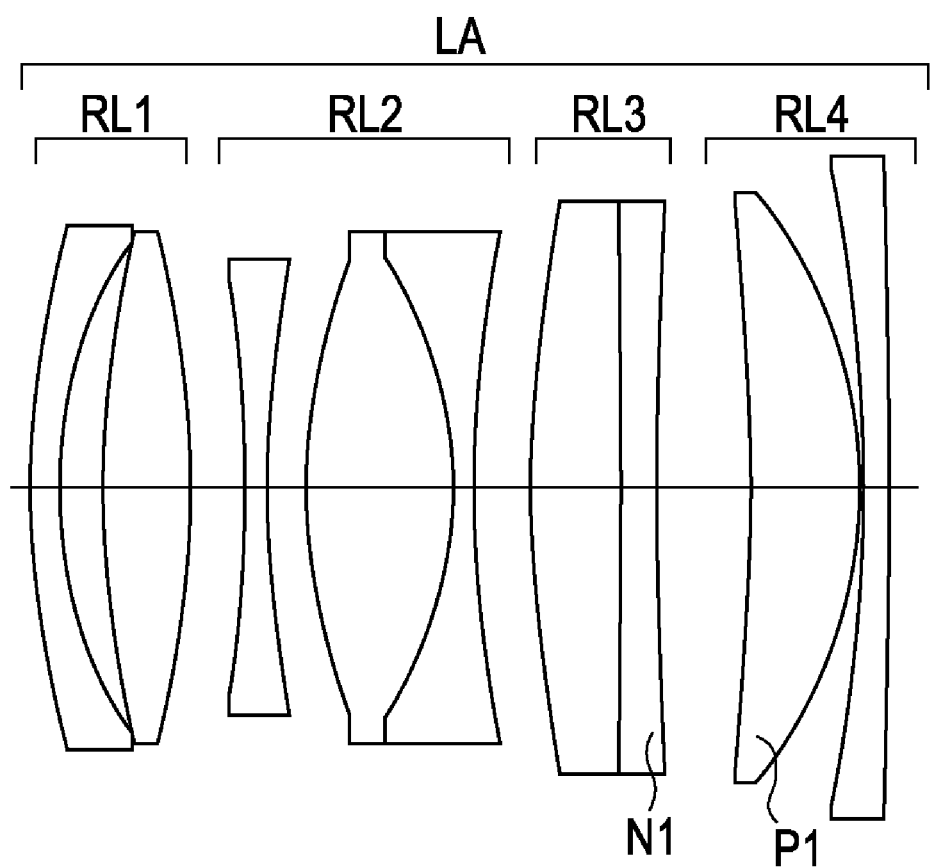
FIG. 15A is a sectional view of a rear attachment lens according to an eighth embodiment.
Figure 16A:
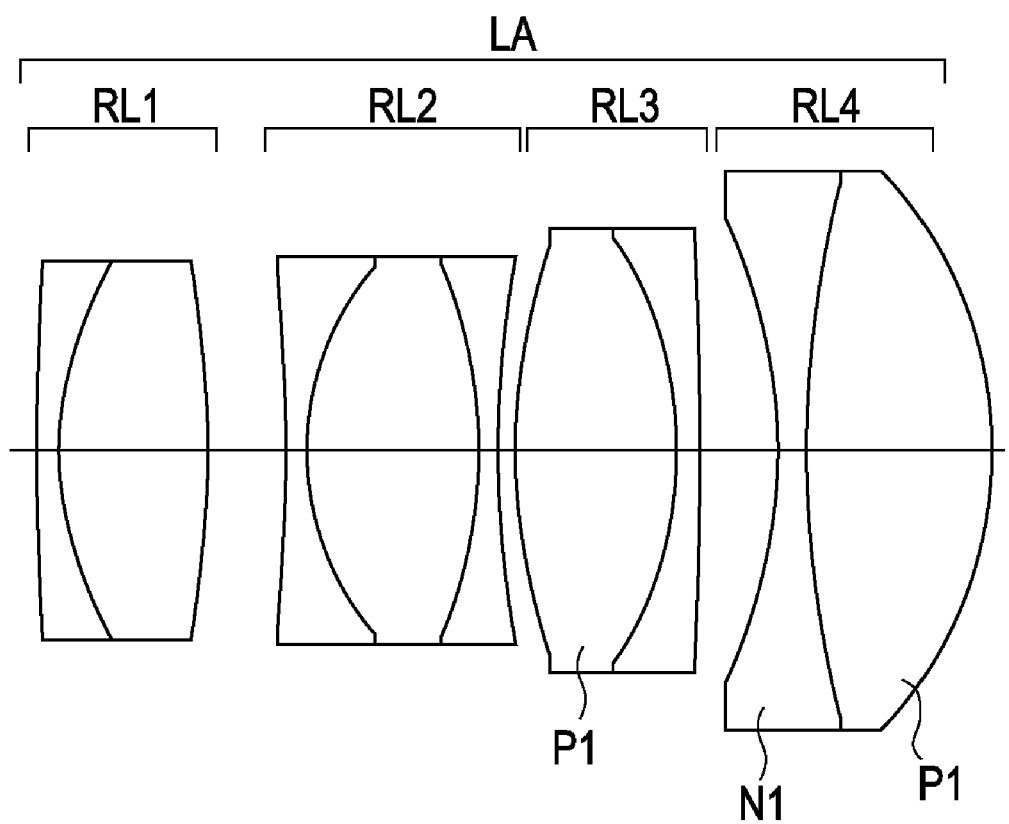
FIG. 16A is a sectional view of a rear attachment lens according to a ninth embodiment.
Figure 18A:
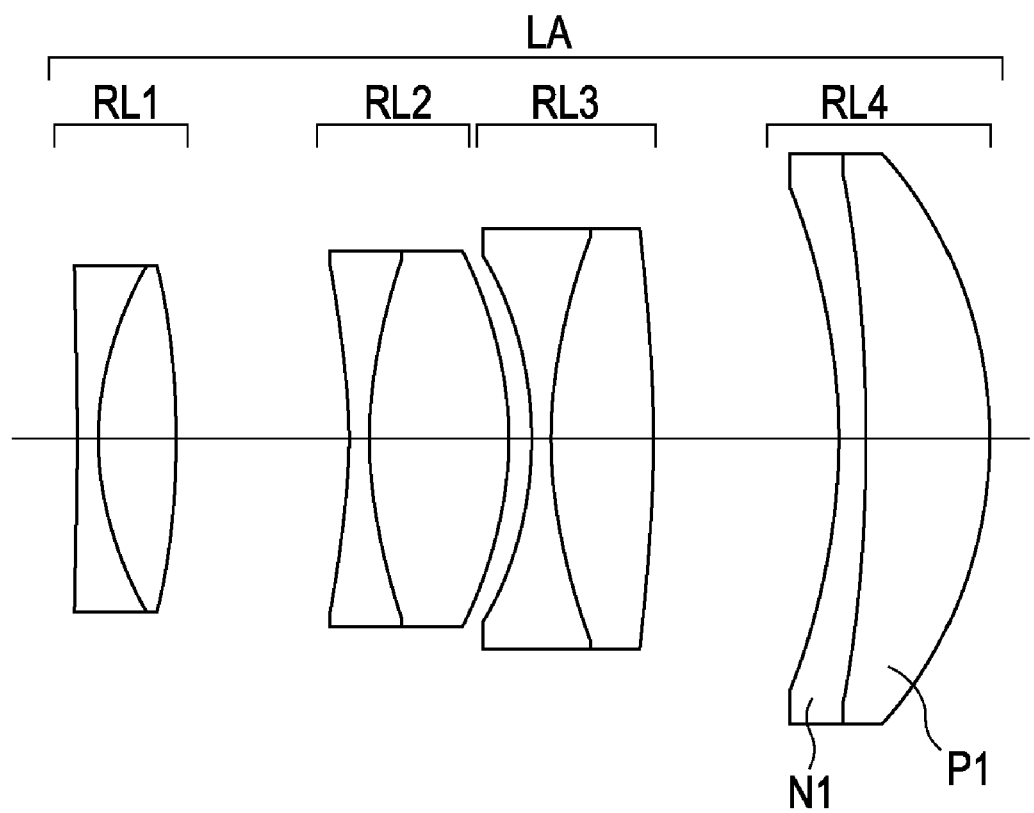
FIG. 18A is a sectional view of a rear attachment lens according to an eleventh embodiment.
Figure 19A:
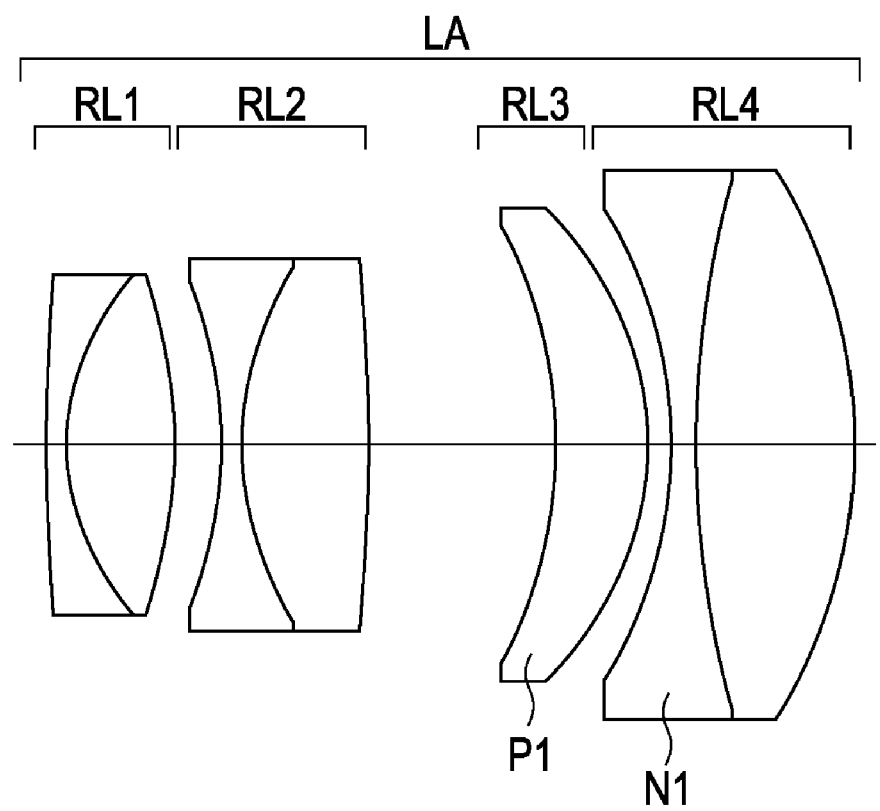
FIG. 19A is a sectional view of a rear attachment lens according to a twelfth embodiment.
Figure 20A:
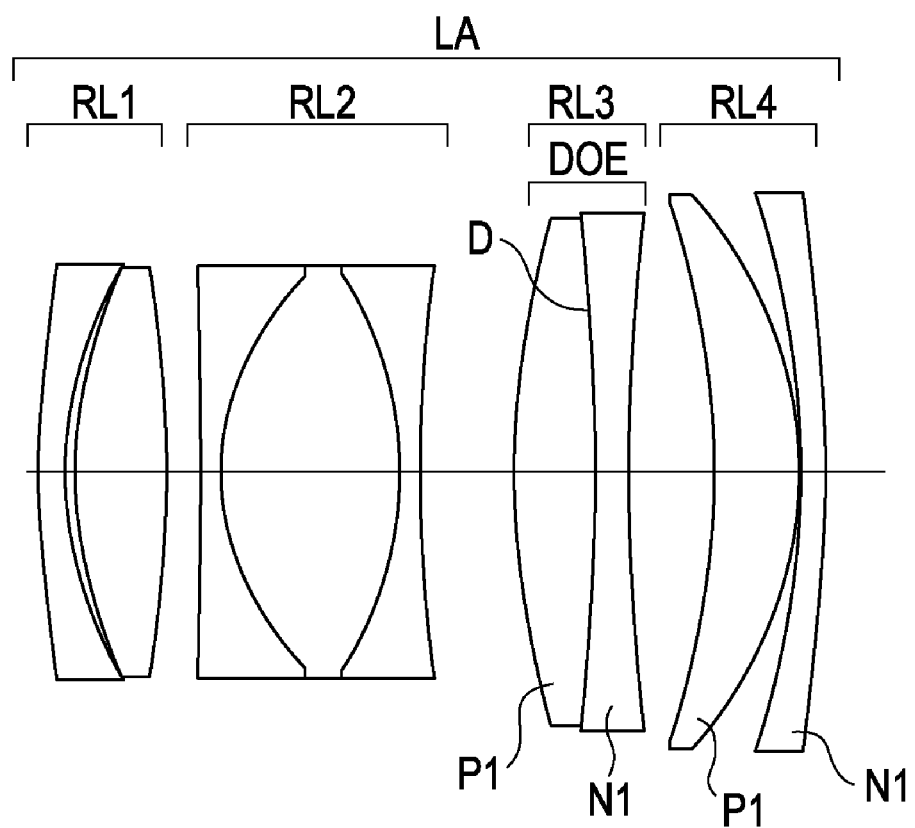
FIG. 20A is a sectional view of a rear attachment lens according to a thirteenth embodiment.

FIGS. 10A and 10B show a sectional view and aberration diagrams, respectively, of an example of a main lens system (telephoto lens) to which the rear attachment lenses according to the embodiments of the present invention can be attached. FIG. 11A is a sectional view of a rear attachment lens according to a fourth embodiment of the present invention. FIGS. 11B and 11C show a sectional view and aberration diagrams, respectively, of a lens system in which the rear attachment lens according to the fourth embodiment is attached to the main lens system illustrated in FIG. 10A at an image side thereof. FIG. 12A is a sectional view of a rear attachment lens according to a fifth embodiment of the present invention, and FIG. 12B show aberration diagrams of a lens system in which the rear attachment lens according to the fifth embodiment is attached to the main lens system illustrated in FIG. 10A at an image side thereof. FIG. 13A is a sectional view of a rear attachment lens according to a sixth embodiment of the present invention, and FIG. 13B show aberration diagrams of a lens system in which the rear attachment lens according to the sixth embodiment is attached to the main lens system illustrated in FIG. 10A at an image side thereof. FIG. 14A is a sectional view of a rear attachment lens according to a seventh embodiment of the present invention, and FIG. 14B show aberration diagrams of a lens system in which the rear attachment lens according to the seventh embodiment is attached to the main lens system illustrated in FIG. 10A at an image side thereof. FIG. 15A is a sectional view of a rear attachment lens according to a eighth embodiment of the present invention, and FIG. 15B show aberration diagrams of a lens system in which the rear attachment lens according to the eighth embodiment is attached to the main lens system illustrated in FIG. 10A at an image side thereof. FIG. 16A is a sectional view of a rear attachment lens according to a ninth embodiment of the present invention, and FIG. 16B show aberration diagrams of a lens system in which the rear attachment lens according to the ninth embodiment is attached to the main lens system illustrated in FIG. 10A at an image side thereof. FIG. 17A is a sectional view of a rear attachment lens according to a tenth embodiment of the present invention, and FIG. 17B show aberration diagrams of a lens system in which the rear attachment lens according to the tenth embodiment is attached to the main lens system illustrated in FIG. 10A at an image side thereof. FIG. 18A is a sectional view of a rear attachment lens according to a eleventh embodiment of the present invention, and FIG. 18B show aberration diagrams of a lens system in which the rear attachment lens according to the eleventh embodiment is attached to the main lens system illustrated in FIG. 10A at an image side thereof. FIG. 19A is a sectional view of a rear attachment lens according to a twelfth embodiment of the present invention, and FIG. 19B show aberration diagrams of a lens system in which the rear attachment lens according to the twelfth embodiment is attached to the main lens system LM illustrated in FIG. 10A at an image side thereof. FIG. 20A is a sectional view of a rear attachment lens according to a thirteenth embodiment of the present invention, and FIG. 20B show aberration diagrams of a lens system in which the rear attachment lens according to the thirteenth embodiment is attached to the main lens system illustrated in FIG. 10A at an image side thereof.

In each sectional view, the left side shows the object side and the right side shows the image side. LA denotes a rear attachment lens, and LM denotes a main lens system (master lens). The main lens system LM is a telephoto lens having a single focal length. The main lens system LM illustrated in FIGS. 10A and 11B includes, in order from the object side to the image side, a first unit (first lens unit) L1 having a positive refractive power and including a plurality of lenses; a second unit (second lens unit) L2 having a negative refractive power and including a positive lens and a negative lens; and a third unit (third lens unit) L3 having a positive refractive power and including a plurality of lenses. Focusing from an object at infinity to a close object is performed by moving the second unit L2 toward the image side along the optical axis. SP denotes an aperture stop. G denotes an optical block corresponding to a protective glass or the like. IP denotes an image plane. In the case where the optical system is used as an imaging optical system of a video camera or a digital camera, the image plane IP corresponds to an image pickup plane of a solid-state image pickup element (photoelectric conversion element), such as a CCD sensor or a CMOS sensor, for receiving image light. In the case where the optical system is used as an imaging optical system of a silver-halide film camera, the image plane IP corresponds to a film surface.

In the rear attachment lenses LA illustrated in FIGS. 11A to 20A, RL1 denotes a first unit (first lens unit) having a positive refractive power, RL2 denotes a second unit (second lens unit), RL3 denotes a third unit (third lens unit), and RL4 denotes a fourth unit (fourth lens unit). N1 denotes a negative lens, and P1 denotes a positive lens. DOE denotes a diffractive optical element. D denotes a diffractive optical portion (diffractive optical surface) of the diffractive optical element DOE. The diffractive optical portion D is positioned between surfaces of two lenses that are cemented together (cemented lens surfaces). In diffracted light beams generated by the diffractive optical portion D, the order of diffraction m of the diffracted light used in the embodiments is 1, and the design wavelength $\lambda_0$ is the wavelength of the d-line (587.56 nm).

In the aberration diagrams, d and g denote the d-line and the g-line, respectively. M and S denote a meridional image plane and a sagittal image plane, respectively, and the chromatic aberration of magnification is shown by the g-line. In addition, Fno denotes the F-number and $\omega$ denotes a half field angle. In all of the aberration diagrams, the spherical aberration and the astigmatism are shown by the scales of ±0.4 mm. In addition, the distortion is shown by the scale of ±2%, and the chromatic aberration of magnification is shown by the scale of ±0.05 mm.

The characteristics of the rear attachment lens of each embodiment will now be described. In general, rear attachment lenses have been demanded to reliably correct the chromatic aberration of magnification and the field curvature. According to the related art, the balance between the aberrations including the chromatic aberrations and the field curvature is maintained by appropriately setting the power of each lens in the front and rear lens units and the Abbe number of the material of each lens.

More specifically, the following method has been used. That is, at least a positive lens and a negative lens are disposed in each of the lens unit closest to the object side and the lens unit closest to the image side in the rear attachment lens. Accordingly, the combination of the positive lens and the negative lens in the lens unit closest to the object side in the rear attachment lens serves to correct the coma aberration generated in the off-axis ray while correcting the axial chromatic aberration.

In addition, the combination of the positive lens and the negative lens in the lens unit closest to the image side serves to correct the aberrations such as the field curvature while correcting the chromatic aberration of magnification. In addition, the axial chromatic aberration is corrected without affecting other aberrations by placing a cemented lens including two or three lenses at a position close to the object side.

According to the related art, with the above-described structure, generation of the spherical aberration and the coma aberration is suppressed by the lens unit at the object side and a balance between the field curvature and the chromatic aberration of magnification is maintained by the lens unit at the image side. However, it has been found that the correction of the chromatic aberration of magnification and the field curvature with the above-described lens structure is not sufficient to comply with the increasing demands for digital cameras with higher image qualities.

Accordingly, the rear attachment lens according to each embodiment includes four units. The third unit includes at least one positive lens, and the third or fourth unit includes a negative lens suitable for correcting chromatic aberrations, so that the chromatic aberration of magnification can be corrected. As described above, the rear attachment lens has a negative refractive power, and the rear attachment lens itself has a large negative Petzval sum. Therefore, when the rear attachment lens is attached to the main lens system, the rear attachment lens often serves to increase the field curvature. Therefore, a positive lens is placed in each of the third and fourth units so that the Petzval sum is prevented from being largely increased in the negative direction and the field curvature can be advantageously corrected. In addition, a lens having a large chromatic-aberration correcting performance and formed of a material having a large partial-dispersion-ratio difference $\Delta\theta gF$ in the positive direction is disposed in the third or fourth unit so that the chromatic aberration of magnification can be reliably corrected. In the related art, both the field curvature and the chromatic aberration of magnification are corrected by the lens unit closest to the image side. In contrast, in each embodiment of the present invention, the aberrations are corrected by the third and fourth units. As a result, the image forming performance is improved.

The characteristics of the rear attachment lens of each embodiment will now be described. The rear attachment lens LA according to each embodiment has a negative focal length. The rear attachment lens LA according to each embodiment includes a first unit RL1 having a positive refractive power and including a positive lens and a negative lens; a second unit RL2 positioned on the image side of the first unit RL1 and including a positive lens and a negative lens; a third unit RL3 positioned on the image side of the second unit RL2 and including a positive lens; and a fourth unit RL4 positioned on the image side of the third unit RL3 and including a positive lens and a negative lens.

The first unit RL1 includes two lenses, or a single lens and a cemented lens in order from the object side to the image side. The second unit RL2 includes a cemented lens, or a single lens and a cemented lens in order from the object side to the image side. The fourth unit RL4 includes two lenses, or a cemented lens and a single lens in order from the object side to the image side.

In the case where the third unit includes at least one negative lens, the at least one negative lens in the third unit or an at least one negative lens included in the fourth unit serves as a negative lens N1. When $\nu_{d\_N1}$ and $\Delta\theta_{gF\_N1}$ are the Abbe number and the partial-dispersion-ratio difference, respectively, of the material of the negative lens N1, $f\_N1$ is the focal length of the negative lens N1, and f is the focal length of the rear attachment lens, the following expression is satisfied:

$$0.00015 < \Delta\theta_{gF\_N1} \times f/(\nu_{d\_N1} \times f\_{N1}) < 0.00620 \quad (7)$$

The Abbe number and the refractive index of the material of each lens are those with respect to the d-line. When $N_{d\_N1}$, $N_{g\_N1}$, $N_{C\_N1}$, and $N_{F\_N1}$ are the refractive indices of the material of the negative lens N1 for the d-line, the g-line, the C-line, and the F-line, respectively, the Abbe number $\nu_{d\_N1}$, the partial dispersion ratio $\theta_{gF\_N1}$, and the partial-dispersion-ratio difference (anomalous partial dispersion ratio) $\Delta\theta_{gF\_N1}$ of the material of the negative lens N1 are calculated as follows:

$$\nu_{d\_N1} = (N_{d\_N1} - 1)/(N_{F\_N1} - N_{C\_N1})$$

$$\theta_{gF\_N1} - (N_{g\_N1} - N_{F\_N1})/(N_{F\_N1} - N_{C\_N1})$$

$$\Delta\theta_{gF\_N1} = \theta_{gF\_N1} - (-1.61783 \times 10^{-3} \times \nu_{d\_N1} + 0.64146)$$

The technical meaning of each conditional expression will now be described. Conditional Expression (7) relates to the chromatic-aberration correcting performance of the negative lens N1 in the above-described rear attachment lens. If the value of Conditional Expression (7) is greater than the upper limit thereof, the chromatic-aberration correcting performance of the negative lens N1 is too high and the chromatic aberration of magnification is excessively corrected. If the value of Conditional Expression (7) is smaller than the lower limit thereof, the chromatic-aberration correcting performance of the negative lens N1 is too low. In such a case, a large power is required to correct the chromatic aberration of magnification, and it becomes difficult to maintain a good balance between the chromatic aberration of magnification and other aberrations. The numerical range of Conditional Expression (7) can also be set as follows:

$$0.00020 < \Delta\theta_{gF\_N1} \times f/(\nu_{d\_N1} \times f\_{N1}) < 0.00620 \quad (7a)$$

In each embodiment, the constituent features are specified as described above. Accordingly, in the case where the rear attachment lens LA is attached to the main lens system LM, the aberrations including the field curvature and the chromatic aberrations can be reliably corrected over the entire image plane. Therefore, a high-quality image can be easily formed. In particular, since the third or fourth unit includes at least one negative lens N1, a satisfactory optical performance can be maintained, and the field curvature and the chromatic aberration of magnification, which easily occur at positions close to the periphery of the image plane, can be effectively corrected.

The present invention can be carried out by the above-described structure. However, the optical performance can be easily improved by satisfying at least one of the following conditions.

In the rear attachment lens LA, the at least one positive lens included in the third unit or the at least one positive lens included in the fourth unit serves as a positive lens P1. When, $\Delta\theta_{gF\_P1}$ and $\nu_{d\_P1}$ are the partial-dispersion-ratio difference and the Abbe number, respectively, of the material of the positive lens P1, $f\_P1$ is the focal length of the positive lens P1, f1, f2, f3, and f4 are the focal lengths of the first unit, the second unit, the third unit, and the fourth unit, respectively, in the rear attachment lens LA, and $N_N$ is the refractive index of the material of a negative lens included in the rear attachment lens LA, at least one of the following conditions can be satisfied:

$$0 < \Delta\theta_{gF\_P1} \times f/(\nu_{d\_P1} \times f\_{P1}) < 0.001 \quad (8)$$

$$|f/f3| < 6.5 \quad (9)$$

$$-10.0 < f/f2 | < -0.2 \quad (10)$$

$$|f/f4| < 4.0 \quad (11)$$

$$-5.5 < f/f1 < -0.05 \quad (12)$$

$$1.5 < N_N < 2.5 \quad (13)$$

The Abbe number and the refractive index of the material of each lens are those with respect to the d-line. When $N_{d\_P1}$, $N_{g\_P1}$, $N_{C\_P1}$ and $N_{F\_P1}$ are the refractive indices of the material of the positive lens P1 for the d-line, the g-line, the C-line, and the F-line, respectively, the Abbe number $\nu_{d\_P1}$, the partial dispersion ratio $\theta_{gF\_P1}$, and the partial-dispersion-ratio difference (anomalous partial dispersion ratio) $\Delta\theta_{gF\_P1}$ of the material of the positive lens P1 are calculated as follows:

$$\nu d_{\_P1} = (N_{d\_P1} - 1)/(N_{F\_P1} - N_{C\_P1})$$

$$\theta_{gF\_P1} - (N_{g\_P1} - N_{F\_P1})/(N_{F\_P1} - N_{C\_P1})$$

$$\Delta\theta_{gF\_P1} = \theta_{gF\_P1} - (-1.61783 \times 10^{-3} \times \nu_{d\_P1} + 0.64146)$$

Conditional Expression (8) relates to the chromatic-aberration correcting performance of the positive lens P1 in the rear attachment lens LA. If the value of Conditional Expression (8) is greater than the upper limit thereof, the chromatic-aberration correcting performance of the positive lens P1 is too high and the chromatic aberration of magnification is excessively corrected. If the value of Conditional Expression (8) is smaller than the lower limit thereof, the direction of the chromatic-aberration correcting performance of the positive lens P1 is reversed. In such a case, the chromatic aberration of magnification will be increased. The numerical range of Conditional Expression (8) can also be set as follows:

$$0.000005 < \Delta\theta_{gF\_P1} \times f/(v_{d\_P1} \times f\_P1) < 0.000900 \quad (8a)$$

Conditional Expression (9) relates to the power of the third unit RL3 in the rear attachment lens LA. If the value of Conditional Expression (9) is greater than the upper limit thereof, the power of the third unit RL3 is too high and it becomes difficult to maintain a good balance between the chromatic aberration of magnification and the field curvature. The numerical range of Conditional Expression (9) can also be set as follows:

$$|f/f3| < 6.0 \quad (9a)$$

Conditional Expression (10) relates to the power of the second unit RL2 in the rear attachment lens LA. If the value of Conditional Expression (10) is greater than the upper limit thereof, the power of the second unit RL2 is too high and the coma aberration is excessively corrected in a direction from an intermediate image height to a higher image height. As a result, the aberration will remain. If the value of Conditional Expression (10) is smaller than the lower limit thereof, the power of the second unit RL2 is too low and the coma aberration cannot be sufficiently corrected. As a result, the aberration will remain. The numerical range of Conditional Expression (10) can also be set as follows:

$$-9.0 < f/|f2| < -0.3 \quad (10a)$$

Conditional Expression (11) relates to the power of the fourth unit RL4 in the rear attachment lens LA. If the value of Conditional Expression (11) is greater than the upper limit thereof, the power of the fourth unit RL4 is too high and it becomes difficult to maintain a good balance between the chromatic aberration of magnification and the field curvature. The numerical range of Conditional Expression (11) can also be set as follows:

$$|f/f4| < 3.0 \quad (11a)$$

Conditional Expression (12) relates to the power of the first unit RL1 in the rear attachment lens LA. If the value of Conditional Expression (12) is greater than the upper limit thereof or is smaller than the lower limit thereof, it becomes difficult to maintain a good balance between the axial chromatic aberration and the chromatic aberration of magnification. As a result, it becomes difficult to reliably correct the color aberrations. The numerical range of Conditional Expression (12) can also be set as follows:

$$-5.00 < f/f1 < -0.07 \quad (12a)$$

Conditional Expression (13) relates to the refractive index of the material of the negative lens included in the rear attachment lens LA. If the value of Conditional Expression (13) is greater than the upper limit thereof or is smaller than the lower limit thereof, it becomes difficult to maintain a good balance between the chromatic aberration of magnification and the field curvature. The numerical range of Conditional Expression (13) can also be set as follows:

$$1.55 < N_N < 2.5 \quad (13a)$$

According to each embodiment, when the constituent elements are specified as described above, the field curvature and the chromatic aberrations can be corrected over the entire image plane and an imaging optical system having a high optical performance can be provided.

The characteristics of the lens structure of each embodiment will now be described. Lenses corresponding to the above-described lenses are denoted by the same reference numerals as those used in the above description. In the rear attachment lens LA according to the fourth embodiment illustrated in FIG. 11A, the first unit RL1 includes a negative lens and a positive lens in order from the object side to the image side. The second unit RL2 includes a cemented lens including a negative lens, a positive lens, and a negative lens. The third unit RL3 includes a cemented lens including a positive lens and a negative lens. The fourth unit RL4 includes a positive lens and a negative lens.

In the fourth embodiment, the negative lens in the third unit RL3 (the second negative lens from the image side in the entire system (the same in the following description)) and the negative lens in the fourth unit RL4 (the negative lens closest to the image side) correspond to the negative lens N1. In addition, the positive lens in the third unit RL3 (the second positive lens from the image side) and the positive lens in the fourth unit RL4 (the positive lens closest to the image side) correspond to the positive lens P1.

In the rear attachment lens LA according to the fifth embodiment illustrated in FIG. 12A, the first unit RL1 includes a negative lens and a cemented lens including a positive lens and a negative lens in order from the object side to the image side. The second unit RL2 includes a cemented lens including a negative lens and a positive lens. The third unit RL3 includes a negative lens and a cemented lens including a positive lens and a negative lens. The fourth unit RL4 includes a cemented lens including a negative lens and a positive lens, and a negative lens. In the fifth embodiment, the negative lens in the third unit RL3 (the third negative lens from the image side) and the negative lens in the fourth unit RL4 (the negative lens closest to the image side) correspond to the negative lens N1. In addition, the positive lens in the third unit RL3 (the second positive lens from the image side) and the positive lens in the fourth unit RL4 (the positive lens closest to the image side) correspond to the positive lens P1.

In the rear attachment lens LA according to the sixth embodiment illustrated in FIG. 13A, the first unit RL1 includes a negative lens and a positive lens in order from the object side to the image side. The second unit RL2 includes a cemented lens including a positive lens, a negative lens, and a positive lens. The third unit RL3 includes a negative lens and a cemented lens including a positive lens and a negative lens. The fourth unit RL4 includes a positive lens and a negative lens. In the sixth embodiment, both of the two negative lenses in the third unit RL3 (the second and third negative lenses from the image side) correspond to the negative lens N1. In addition, the positive lens in the third unit RL3 (the second positive lens from the image side) corresponds to the positive lens P1.

In the rear attachment lens LA according to the seventh embodiment illustrated in FIG. 14A, the first unit RL1 includes a cemented lens including a negative lens and a positive lens in order from the object side to the image side. The second unit RL2 includes a cemented lens including a negative lens, a positive lens, and a negative lens. The third unit RL3 includes a positive lens and a negative lens. The fourth unit RL4 includes a positive lens and a negative lens. In the seventh embodiment, the negative lens in the third unit RL3 (the second negative lens from the image side) corresponds to the negative lens N1. In addition, the positive lens in the fourth unit RL4 (the positive lens closest to the image side) corresponds to the positive lens P1.

In the rear attachment lens LA according to the eighth embodiment illustrated in FIG. 15A, the first unit RL1 includes a negative lens and a positive lens in order from the object side to the image side. The second unit RL2 includes a negative lens and a cemented lens including a positive lens and a negative lens. The third unit RL3 includes a cemented lens including a positive lens and a negative lens. The fourth unit RL4 includes a positive lens and a negative lens. In the eighth embodiment, the negative lens in the third unit RL3 (the second negative lens from the image side) corresponds to the negative lens N1. In addition, the positive lens in the fourth unit RL4 (the positive lens closest to the image side) corresponds to the positive lens P1.

In the rear attachment lens LA according to the ninth embodiment illustrated in FIG. 16A, the first unit RL1 includes a cemented lens including a negative lens and a positive lens in order from the object side to the image side. The second unit RL2 includes a cemented lens including a negative lens, a positive lens, and a negative lens. The third unit RL3 includes a cemented lens including a positive lens and a negative lens. The fourth unit RL4 includes a cemented lens including a negative lens and a positive lens. In the ninth embodiment, the negative lens in the fourth unit RL4 (the negative lens closest to the image side) corresponds to the negative lens N1. In addition, the positive lens in the third unit RL3 (the second positive lens from the image side) and the positive lens in the fourth unit RL4 (the positive lens closest to the image side) correspond to the positive lens P1.

In the rear attachment lens LA according to the tenth embodiment illustrated in FIG. 17A, the first unit RL1 includes a cemented lens including a negative lens and a positive lens in order from the object side to the image side. The second unit RL2 includes a cemented lens including a negative lens, a positive lens, and a negative lens. The third unit RL3 includes a positive lens. The fourth unit RL4 includes a cemented lens including a negative lens and a positive lens. In the tenth embodiment, the negative lens in the fourth unit RL4 (the negative lens closest to the image side) corresponds to the negative lens N1. In addition, the positive lens in the third unit RL3 (the second positive lens from the image side) corresponds to the positive lens P1.

In the rear attachment lens LA according to the eleventh embodiment illustrated in FIG. 18A, the first unit RL1 includes a cemented lens including a negative lens and a positive lens in order from the object side to the image side. The second unit RL2 includes a cemented lens including a negative lens and a positive lens. The third unit RL3 includes a cemented lens including a negative lens and a positive lens. The fourth unit RL4 includes a cemented lens including a negative lens and a positive lens. In the eleventh embodiment, the negative lens in the fourth unit RL4 (the negative lens closest to the image side) corresponds to the negative lens N1. In addition, the positive lens in the fourth unit RL4 (the positive lens closest to the image side) corresponds to the positive lens P1.

In the rear attachment lens LA according to the twelfth embodiment illustrated in FIG. 19A, the first unit RL1 includes a cemented lens including a negative lens and a positive lens in order from the object side to the image side. The second unit RL2 includes a cemented lens including a negative lens and a positive lens. The third unit RL3 includes a positive lens. The fourth unit RL4 includes a cemented lens including a negative lens and a positive lens. In the twelfth embodiment, the negative lens in the fourth unit RL4 (the negative lens closest to the image side) corresponds to the negative lens N1. In addition, the positive lens in the third unit RL3 (the second positive lens from the image side) corresponds to the positive lens P1.

In the rear attachment lens LA according to the thirteenth embodiment illustrated in FIG. 20A, the first unit RL1 includes a negative lens and a positive lens in order from the object side to the image side. The second unit RL2 includes a cemented lens including a negative lens, a positive lens, and a negative lens. The third unit RL3 includes a cemented lens including a positive lens and a negative lens, and a diffractive optical portion D is provided between the cemented surfaces. The fourth unit RL4 includes a positive lens and a negative lens. In the thirteenth embodiment, the negative lens in the third unit RL3 (the second negative lens from the image side) and the negative lens in the fourth unit RL4 (the negative lens closest to the image side) correspond to the negative lens N1. In addition, the positive lens in the third unit RL3 (the second positive lens from the image side) and the positive lens in the fourth unit RL4 (the positive lens closest to the image side) correspond to the positive lens P1.

In the thirteenth embodiment, the diffractive optical portion (diffractive optical surface) D includes one or more diffraction gratings provided on a substrate (a flat plate or a lens). In addition, the diffractive optical element DOE is an element in which the diffractive optical portion, which includes one or more diffraction gratings, is provided on a substrate (a flat plate or a lens). The portion denoted by D in the cemented lens illustrated in the sectional view of FIG. 20A corresponds to the diffractive optical portion.

A refractive power (power is the reciprocal of focal length) $\phi_D$ of the diffractive optical portion D can be calculated as follows. That is, when m is the order of diffraction, $\lambda_0$ is the reference wavelength (d line), H is the distance from the optical axis H, and $\phi(H)$ is the phase, the shape of the diffraction gratings in the diffractive optical portion D can be expressed as follows:

$$\phi(H) = (2\pi \cdot m/\lambda_0) \cdot (C_2 \cdot H^2 + C_4 + \ldots + C_{2i} * H^{2i}) \quad \text{(a)}$$

The refractive power $\phi_D$ can be calculated as $\phi_D = -2 \cdot C_2$ using the phase coefficient $C_2$ of the second-order term. Therefore, the focal length $f_D$ of the diffractive optical portion D can be calculated as follows:

$$f_D = -1/(2 \cdot C_2)$$

The structure of the diffractive optical element DOE used in the rear attachment lens LA according to the thirteenth embodiment will now be described. The diffractive optical portion D included in the diffractive optical element DOE disposed in the rear attachment lens includes diffraction gratings that are symmetrical about the optical axis.

Figure 21A:
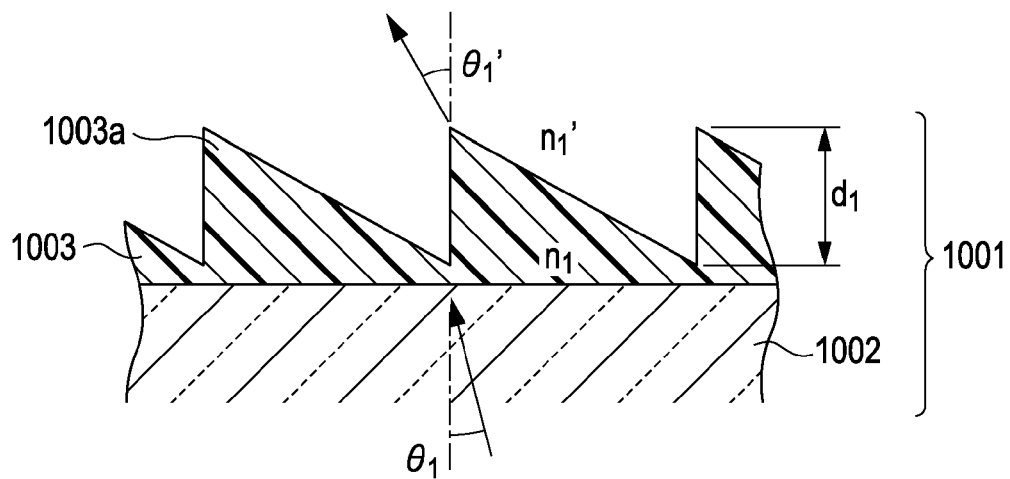
FIGS. 21A and 21B are diagrams illustrating a diffractive optical element.
Figure 21B:
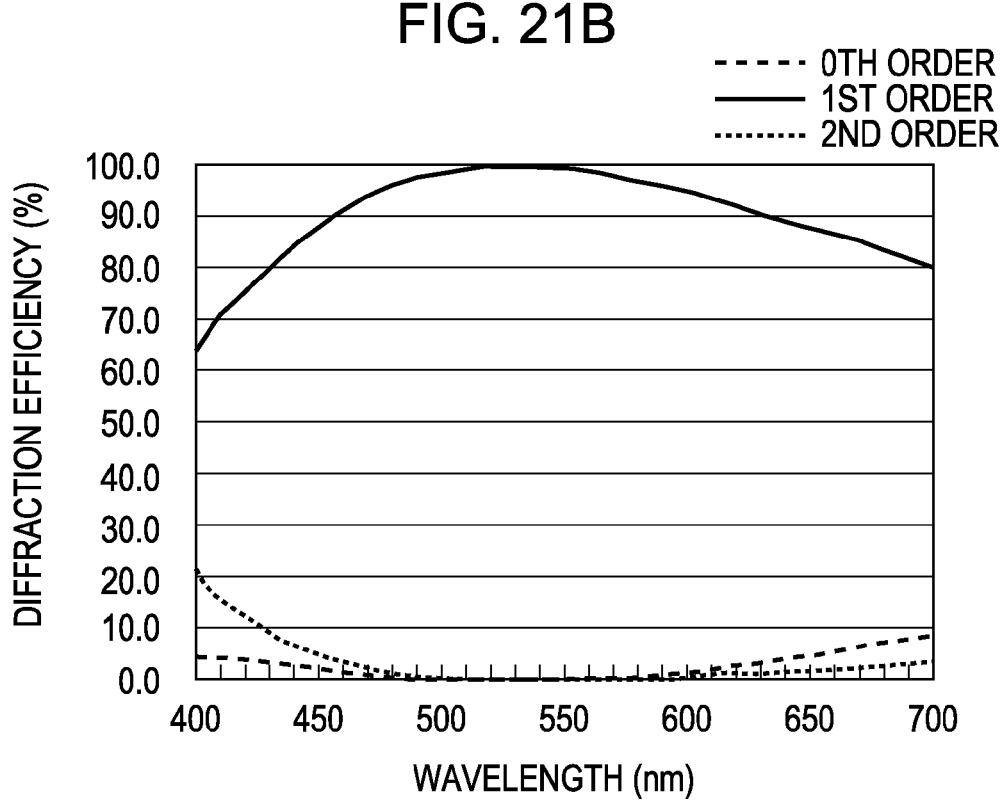

FIG. 21A is an enlarged sectional view of a part of a diffractive optical portion of a diffractive optical element 1001. In FIG. 21A, a single-layer diffraction grating (diffractive optical portion) 1003 is provided on a substrate (transparent substrate) 1002. FIG. 21B is a diagram illustrating the characteristics of diffraction efficiency of the diffractive optical element 1001. In FIG. 21B, the horizontal axis shows the wavelength and the vertical axis shows the diffraction efficiency. The diffraction efficiency is the ratio of the amount of diffracted light to the overall transmitted light. Light reflected at the boundary surfaces of a grating portion 1003a is not considered here to facilitate the explanation.

Ultraviolet curing resin (refractive index $n_d$=1.513, Abbe number $v_d$=51.0) is used as the optical material of the diffraction grating 1003. A grating thickness $d_1$ of the grating portion 1003a is set to 1.03 µm. The diffraction efficiency for the +1st order diffracted light with a wavelength of 530 nm is at a maximum. In other words, the design order is the +1st order and the design wavelength is 530 nm. In FIG. 21B, the diffraction efficiency for the +1st order diffracted light is shown by the solid line. FIG. 21B also shows the diffraction efficiency for orders around the design order (that is, the 0th and +2nd orders, which are ±1 order relative to the +1st order). As is clear from FIG. 21B, the diffraction efficiency for the design order is at a maximum at a wavelength around the design wavelength, and is gradually reduced as the difference from the design wavelength increases. The reduction in the diffraction efficiency for the design order generates the diffracted light of the other orders (unnecessary light), which leads to an occurrence of flare. In the case where the diffractive optical element is provided at a plurality of positions in the optical system, the reduction in the diffraction efficiency at wavelengths other than the design wavelength leads to a reduction in the transmittance.

Figure 22A:
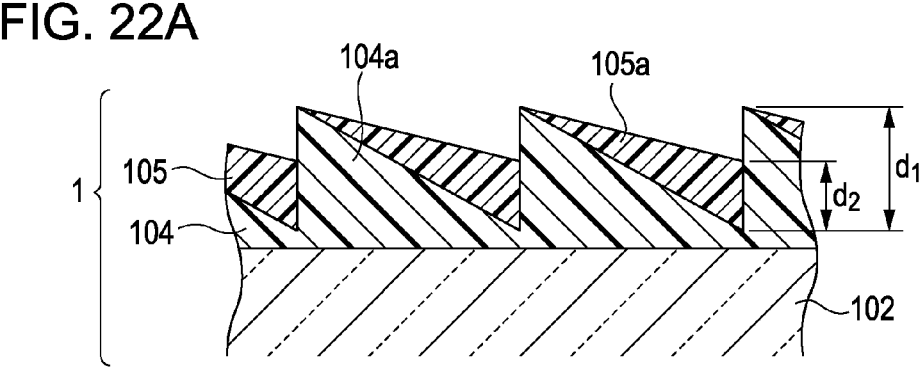
FIGS. 22A to 22C are diagrams illustrating a diffractive optical element.
Figure 22B:
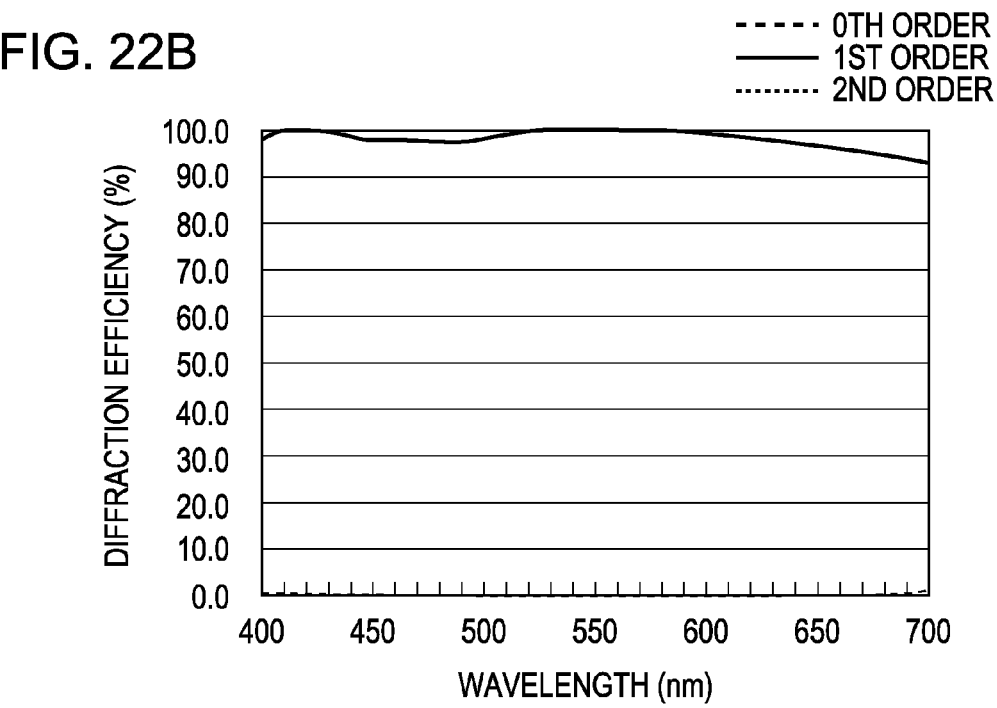

Next, a diffractive optical element having a multilayer structure including a plurality of diffraction gratings made of different materials will be described. FIG. 22A is an enlarged sectional view illustrating a part of a diffractive optical element 1 having a multilayer structure, and FIG. 22B is a diagram illustrating the wavelength dependency of the diffraction efficiency of the diffractive optical element 1 shown in FIG. 22A for the +1st order diffracted light. In the diffractive optical element 1 illustrated in FIG. 22A, a first diffraction grating 104 made of an ultraviolet curing resin (refractive index $n_d$=1.499 and Abbe number $v_d$=54) is formed on a substrate 102. In addition, a second grating 105 (refractive index $n_d$=1.598 and Abbe number $v_d$=28) is formed on the first diffraction grating 104. In the combination of the above-mentioned materials, the grating thickness $d_1$ of a grating portion 104a of the first diffraction grating 104 is set to $d_1$=13.8 µm, and the grating thickness $d_2$ of a grating portion 105a of the second diffraction grating 105 is set to $d_2$=10.5 µm. As is clear from FIG. 22B, when the diffractive optical element 1 including the diffraction gratings 104 and 105 formed in the multilayer structure is used, a high diffraction efficiency, such as 95% or more, is obtained for the design-order diffracted light over the entire wavelength range to be used (visible range in this example).

Figure 22C:
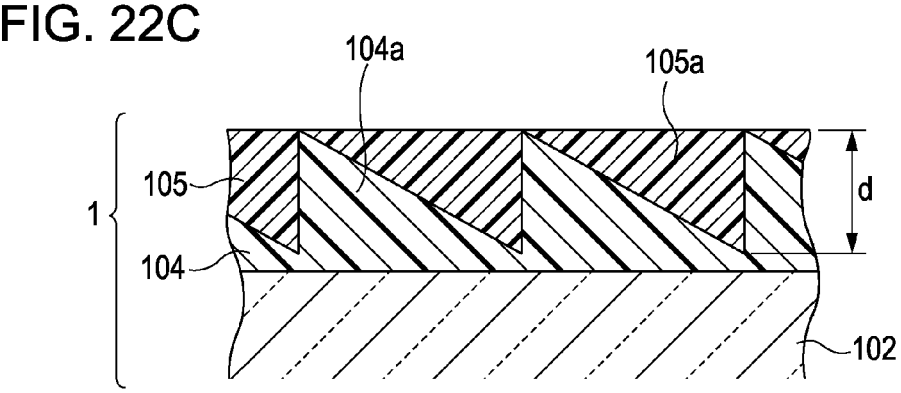

In the diffractive optical element 1 having the multilayer structure, as shown in FIG. 22C, the two layers 104 and 105 may have the same grating thickness d depending on the materials thereof. In such a case, an air layer may be provided between the two diffraction-grating layers. In addition, in the case where the first, second, or fourth unit includes a single lens and a cemented lens, the cemented lens can be formed such that only the positive or negative lenses are included therein as long as one or more positive lens and one or more negative lens are included in the unit.

Next, the main lens and fourth to thirteenth numerical examples corresponding to the fourth to thirteenth embodiments of the present invention will be described. In each numerical example, i shows the number of each surface counted from the object side, $r_i$ shows the radius of curvature of the $i^{th}$ surface from the object side, $d_i$ shows the distance between the $i^{th}$ surface and the $(i+1)^{th}$ surface from the object side, and $nd_i$ and $vd_i$ show the refractive index and the Abbe number, respectively, of the $i^{th}$ optical component. In addition, θgF and ΔθgF are the partial dispersion ratio and the partial-dispersion-ratio difference, respectively, of the optical component. N1 denotes the negative lens, and P1 denotes the positive lens.

When $N_g$, $N_F$, and $N_c$ are the refractive indices of the optical component for the g-line, the F-line, and the C-line, respectively, the partial dispersion ratio is calculated as follows:

$$\theta gF = (N_g - N_F)/(N_F - N_C)$$

In addition, the partial-dispersion-ratio difference is calculated as follows:

$$\Delta\theta gF = \theta gF - (-1.61783 \times 10^{-3} \times vd + 0.64146)$$

In addition, f, Fno, and 2ω show the focal length, the F-number, and the field angle (degree) of the entire system when an object at infinity is in focus. Table 2 provided below shows the relationship between the above-described conditional expressions and the corresponding values in each numerical example. In the fourth to thirteenth numerical examples, the air distance along the optical axis between the last surface (surface closest to the image side) in the main lens system LM and the first R1 surface (surface closest to the object side) in the rear attachment lens LA is 20.56 mm.

Numerical Examples

Main Lens System f=299.99 mm Fno=2.99 2ω=8.26 degrees
Surface No. (i) ri di ndi vdi Effective Diameter θgF $\Delta\theta_{gF}$.

| | | | | | | | |
|---|---|---|---|---|---|---|---|
| 1 | 149.921 | 17.00 | 1.49700 | 81.5 | 103.45 | 0.5386 | 0.02916 |
| 2 | −287.346 | 0.15 | | | 102.70 | | |
| 3 | 107.686 | 12.00 | 1.43387 | 95.1 | 93.56 | 0.5373 | 0.04975 |
| 4 | 948.608 | 4.36 | | | 92.17 | | |
| 5 | −337.599 | 4.50 | 1.77250 | 49.6 | 92.08 | 0.5523 | −0.00885 |
| 6 | 151.227 | 14.92 | | | 86.70 | | |
| 7 | 82.152 | 15.00 | 1.49700 | 81.5 | 82.44 | 0.5386 | 0.02916 |
| 8 | 9334.428 | 0.15 | | | 80.48 | | |
| 9 | 52.124 | 5.00 | 1.58144 | 40.8 | 69.95 | 0.5774 | 0.00189 |
| 10 | 43.474 | 34.00 | | | 63.53 | | |
| 11 | 214.749 | 3.99 | 1.84666 | 23.8 | 49.49 | 0.6203 | 0.01734 |
| 12 | −590.486 | 0.58 | | | 48.60 | | |
| 13 | −509.687 | 2.20 | 1.88300 | 40.8 | 48.12 | 0.5669 | −0.00856 |
| 14 | 70.924 | 22.54 | | | 45.28 | | |
| 15 (Stop) | ∞ | 7.64 | | | 40.64 | | |
| 16 | 139.913 | 1.80 | 1.84666 | 23.8 | 38.44 | 0.6203 | 0.01734 |
| 17 | 40.306 | 8.70 | | | 37.14 | | |

-continued

| | | | | | | | |
|---|---|---|---|---|---|---|---|
| 18 | −250.105 | 1.00 | | | 36.28 | | |
| 19 | 63.188 | 5.00 | 1.84666 | 23.8 | 33.98 | 0.6203 | 0.01734 |
| 20 | −180.442 | 1.70 | 1.75500 | 52.3 | 32.90 | 0.5482 | −0.00865 |
| 21 | 35.743 | 5.52 | | | 29.88 | | |
| 22 | −93.126 | 1.65 | | | 30.02 | | |
| 23 | 83.876 | 2.50 | | | 30.99 | | |
| 24 | 106.897 | 4.70 | 1.72916 | 54.7 | 32.76 | 0.5442 | −0.00880 |
| 25 | −211.862 | 2.64 | | | 33.64 | | |
| 26 | 54.058 | 6.00 | 1.48749 | 70.2 | 36.38 | 0.5303 | 0.00244 |
| 27 | 259.048 | 10.00 | | | 36.46 | | |
| 28 | ∞ | 2.00 | 1.51633 | 64.1 | 37.29 | 0.5342 | −0.00353 |
| 29 | ∞ | | | | 37.29 | | |

$\Delta\theta gF = \theta gF - (-1.61783 \times 10^{-3} \times vd + 0.64146)$

Fourth Numerical Example f=−124.47 mm Magnification=1.95

Surface No. (i) ri di ndi νdi Effective Diameter θgF Δθ$_{gF}$.

| | | | | | | | | |
|---|---|---|---|---|---|---|---|---|
| 1 | 45.838 | 1.60 | 1.88300 | 40.8 | 28.00 | 0.5669 | −0.00856 | |
| 2 | 23.277 | 1.80 | | | 26.50 | | | |
| 3 | 35.275 | 7.21 | 1.60342 | 38.0 | 27.50 | 0.5835 | 0.00355 | |
| 4 | −47.454 | 2.61 | | | 27.00 | | | |
| 5 | −56.981 | 1.20 | 1.77250 | 49.6 | 23.00 | 0.5523 | −0.00885 | |
| 6 | 44.889 | 8.20 | 1.69895 | 30.1 | 24.50 | 0.6030 | 0.01030 | |
| 7 | −19.036 | 1.20 | 1.88300 | 40.8 | 24.50 | 0.5669 | −0.00856 | |
| 8 | 58.668 | 4.77 | | | 27.50 | | | |
| 9 | 57.612 | 5.00 | 1.61340 | 44.3 | 31.00 | 0.5628 | −0.00709 | P1 |
| 10 | −120.184 | 2.00 | 1.84666 | 23.8 | 31.00 | 0.6203 | 0.01734 | N1 |
| 11 | 111.953 | 5.21 | | | 31.00 | | | |
| 12 | −155.434 | 6.09 | 1.61340 | 44.3 | 30.50 | 0.5628 | −0.00709 | P1 |
| 13 | −25.349 | 0.20 | | | 32.00 | | | |
| 14 | −87.970 | 1.55 | 1.84666 | 23.8 | 34.50 | 0.6203 | 0.01734 | N1 |
| 15 | −457.285 | | | | 36.00 | | | |

$\Delta\theta gF = \theta gF - (-1.61783 \times 10^{-3} \times vd + 0.64146)$

Fifth Numerical Example f=−110.37 mm Magnification=1.98

Surface No. (i) ri di ndi νdi Effective Diameter θgF Δθ$_{gF}$.

| | | | | | | | | |
|---|---|---|---|---|---|---|---|---|
| 1 | 74.075 | 1.60 | 1.88300 | 40.8 | 21.07 | 0.5669 | −0.00856 | |
| 2 | 25.274 | 2.62 | | | 20.68 | | | |
| 3 | 34.423 | 5.20 | 1.62588 | 35.7 | 22.06 | 0.5889 | 0.00521 | |
| 4 | −66.863 | 1.50 | 1.71300 | 53.9 | 22.27 | 0.5453 | −0.00902 | |
| 5 | −99.511 | 7.29 | | | 22.45 | | | |
| 6 | −1362.683 | 1.20 | 1.72916 | 54.7 | 22.51 | 0.5442 | −0.00880 | |
| 7 | 19.314 | 7.00 | 1.64769 | 33.8 | 22.57 | 0.5945 | 0.00770 | |
| 8 | −30.435 | 0.52 | | | 22.67 | | | |
| 9 | −32.000 | 1.20 | 1.88300 | 40.8 | 22.39 | 0.5669 | −0.00856 | |
| 10 | 49.412 | 2.62 | | | 23.06 | | | |
| 11 | 40.183 | 4.60 | 1.61340 | 44.3 | 25.70 | 0.5628 | −0.00709 | P1 |
| 12 | −52.456 | 2.00 | 1.94595 | 18.0 | 25.85 | 0.6544 | 0.04201 | N1 |
| 13 | −626.881 | 4.16 | | | 26.64 | | | |
| 14 | −43.713 | 1.50 | 1.83481 | 42.7 | 27.48 | 0.5645 | −0.00786 | |
| 15 | 74.821 | 8.46 | 1.65412 | 39.7 | 30.22 | 0.5740 | −0.00322 | P1 |
| 16 | −24.999 | 0.95 | | | 31.16 | | | |
| 17 | −71.680 | 1.55 | 1.84666 | 23.8 | 31.57 | 0.6203 | 0.01734 | N1 |
| 18 | −104.939 | | | | 32.10 | | | |

$\Delta\theta gF = \theta gF - (-1.61783 \times 10^{-3} \times vd + 0.64146)$

Sixth Numerical Example f=−94.83 mm Magnification=1.98

Surface No. (i) ri di ndi νdi Effective Diameter θgF Δθ$_{gF}$

| | | | | | | | | |
|---|---|---|---|---|---|---|---|---|
| 1 | 87.692 | 1.50 | 1.88300 | 40.8 | 21.25 | 0.5669 | −0.00856 | |
| 2 | 25.847 | 1.15 | | | 21.02 | | | |
| 3 | 35.435 | 4.50 | 1.59270 | 35.3 | 21.27 | 0.5932 | 0.00886 | |
| 4 | −76.222 | 2.75 | | | 21.35 | | | |
| 5 | 4295.090 | 2.80 | 1.84666 | 23.8 | 21.17 | 0.6203 | 0.01734 | |
| 6 | −158.452 | 1.50 | 1.88300 | 40.8 | 20.95 | 0.5669 | −0.00856 | |
| 7 | 19.452 | 5.15 | 1.72825 | 28.5 | 20.64 | 0.6077 | 0.01224 | |
| 8 | 254.190 | 5.00 | | | 20.77 | | | |
| 9 | −48.885 | 1.70 | 1.84666 | 23.8 | 21.90 | 0.6203 | 0.01734 | N1 |
| 10 | −80.793 | 4.46 | | | 24.40 | | | |
| 11 | 89.139 | 6.26 | 1.65412 | 39.7 | 26.80 | 0.5740 | −0.00322 | P1 |
| 12 | −30.677 | 1.50 | 1.84666 | 23.8 | 27.30 | 0.6203 | 0.01734 | N1 |
| 13 | 5687.213 | 1.90 | | | 28.77 | | | |
| 14 | −123.647 | 5.68 | 1.69895 | 30.1 | 29.45 | 0.6030 | 0.01030 | |
| 15 | −28.615 | 0.15 | | | 30.23 | | | |
| 16 | −118.232 | 1.80 | 1.88300 | 40.8 | 30.03 | 0.5669 | −0.00856 | |
| 17 | 119.193 | | | | 30.01 | | | |

$\Delta\theta gF = \theta gF - (-1.61783 \times 10^{-3} \times vd + 0.64146)$

Seventh Numerical Example f=−92.31 mm Magnification=2.00

Surface No. (i) ri di ndi νdi Effective Diameter θgF Δθ$_{gF}$

| | | | | | | | | |
|---|---|---|---|---|---|---|---|---|
| 1 | 113.281 | 1.20 | 1.83481 | 42.7 | 22.63 | 0.5645 | −0.00786 | |
| 2 | 20.092 | 7.80 | 1.60342 | 38.0 | 22.23 | 0.5835 | 0.00355 | |
| 3 | −61.246 | 4.83 | | | 22.48 | | | |
| 4 | −108.597 | 1.20 | 1.78800 | 47.4 | 21.91 | 0.5562 | −0.00858 | |
| 5 | 17.169 | 11.20 | 1.65412 | 39.7 | 22.08 | 0.5740 | −0.00322 | |
| 6 | −20.317 | 1.20 | 1.77250 | 49.6 | 22.73 | 0.5523 | −0.00885 | |
| 7 | 68.558 | 1.03 | | | 24.16 | | | |
| 8 | 45.271 | 4.40 | 1.69895 | 30.1 | 25.59 | 0.6030 | 0.01030 | |
| 9 | −171.695 | 1.74 | | | 25.94 | | | |
| 10 | −42.269 | 1.20 | 1.92286 | 18.9 | 25.97 | 0.6495 | 0.03858 | N1 |
| 11 | 1788.303 | 3.00 | | | 27.29 | | | |
| 12 | −256.490 | 6.42 | 1.65412 | 39.7 | 29.39 | 0.5740 | −0.00322 | P1 |
| 13 | −25.133 | 0.16 | | | 30.32 | | | |
| 14 | −72.143 | 1.50 | 1.77250 | 49.6 | 30.10 | 0.5523 | −0.00885 | |
| 15 | −489.016 | | | | 30.53 | | | |

$\Delta\theta gF = \theta gF - (-1.61783 \times 10^{-3} \times vd + 0.64146)$

Eighth Numerical Example f=−98.82 mm Magnification=2.03

Surface No. (i) ri di ndi vdi Effective Diameter θgF Δθ$_{gF}$

| | | | | | | | |
|---|---|---|---|---|---|---|---|
| 1 | 56.341 | 1.60 | 1.77250 | 49.6 | 28.00 | 0.5523 | −0.00885 |
| 2 | 26.300 | 2.39 | | | 26.50 | | |
| 3 | 59.137 | 4.91 | 1.62004 | 36.3 | 27.50 | 0.5883 | 0.00551 |
| 4 | −53.658 | 3.15 | | | 27.00 | | |
| 5 | −66.605 | 1.20 | 1.81600 | 46.6 | 23.00 | 0.5571 | −0.00888 |
| 6 | 69.186 | 2.24 | | | 24.50 | | |
| 7 | 36.880 | 8.20 | 1.59270 | 35.3 | 24.50 | 0.5932 | 0.00886 |
| 8 | −23.182 | 1.20 | 1.81600 | 46.6 | 24.50 | 0.5571 | −0.00888 |
| 9 | 73.242 | 3.26 | | | 27.50 | | |
| 10 | 85.639 | 5.00 | 1.48749 | 70.2 | 31.00 | 0.5303 | 0.00244 |
| 11 | −905.768 | 2.00 | 2.34161 | 23.5 | 31.00 | 0.7906 | 0.18715 N1 |
| 12 | 307.862 | 5.30 | | | 31.00 | | |
| 13 | −133.122 | 6.09 | 1.51742 | 52.4 | 30.50 | 0.5562 | −0.00042 P1 |
| 14 | −26.459 | 0.20 | | | 32.00 | | |
| 15 | −86.749 | 1.55 | 1.80610 | 33.3 | 34.50 | 0.5881 | 0.00048 |
| 16 | −503.198 | | | | 36.00 | | |

$\Delta\theta gF = \theta gF - (-1.61783 \times 10^{-3} \times vd + 0.64146)$

Ninth Numerical Example f=−111.16 mm Magnification=2.00

Surface No. (i) ri di ndi vdi Effective Diameter θgF Δθ$_{gF}$

| | | | | | | | |
|---|---|---|---|---|---|---|---|
| 1 | 227.230 | 1.40 | 1.80400 | 46.6 | 21.67 | 0.5574 | −0.00874 |
| 2 | 22.390 | 9.00 | 1.65412 | 39.7 | 21.51 | 0.5740 | −0.00322 |
| 3 | −64.196 | 4.71 | | | 21.80 | | |
| 4 | −135.099 | 1.40 | 1.77250 | 49.6 | 21.08 | 0.5523 | −0.00885 |
| 5 | 17.415 | 10.32 | 1.65412 | 39.7 | 21.03 | 0.5740 | −0.00322 |
| 6 | −29.652 | 1.20 | 1.88300 | 40.8 | 21.51 | 0.5669 | −0.00856 |
| 7 | 59.366 | 1.05 | | | 22.28 | | |
| 8 | 37.888 | 9.97 | 1.61340 | 44.3 | 23.70 | 0.5628 | −0.00709 P1 |
| 9 | −22.701 | 1.40 | 1.80610 | 33.3 | 24.42 | 0.5881 | 0.00048 |
| 10 | −302.164 | 4.67 | | | 25.70 | | |
| 11 | −32.442 | 1.70 | 1.59282 | 68.6 | 26.60 | 0.5446 | 0.01429 N1 |
| 12 | 61.808 | 11.21 | 1.51633 | 64.1 | 30.47 | 0.5342 | −0.00353 P1 |
| 13 | −24.998 | | | | 32.63 | | |

$\Delta\theta gF = \theta gF - (-1.61783 \times 10^{-3} \times vd + 0.64146)$

Tenth Numerical Example f=−147.13 mm Magnification=2.01

Surface No. (i) ri di ndi vdi Effective Diameter θgF Δθ$_{gF}$

| | | | | | | | |
|---|---|---|---|---|---|---|---|
| 1 | −334.058 | 1.40 | 1.80400 | 46.6 | 22.14 | 0.5574 | −0.00874 |
| 2 | 32.868 | 4.99 | 1.65412 | 39.7 | 22.23 | 0.5740 | −0.00322 |
| 3 | −62.284 | 11.20 | | | 22.41 | | |
| 4 | −80.189 | 1.40 | 1.77250 | 49.6 | 21.39 | 0.5523 | −0.00885 |
| 5 | 17.226 | 10.70 | 1.65412 | 39.7 | 21.79 | 0.5740 | −0.00322 |
| 6 | −19.514 | 1.20 | 1.88300 | 40.8 | 22.43 | 0.5669 | −0.00856 |
| 7 | 89.915 | 1.12 | | | 24.29 | | |
| 8 | 50.510 | 4.63 | 1.65412 | 39.7 | 26.31 | 0.5740 | −0.00322 P1 |
| 9 | −165.836 | 8.48 | | | 27.01 | | |
| 10 | −42.433 | 1.70 | 1.84666 | 23.8 | 29.46 | 0.6203 | 0.01734 N1 |
| 11 | 78.983 | 11.62 | 1.67270 | 32.1 | 32.76 | 0.5990 | 0.00953 |
| 12 | −28.979 | | | | 35.35 | | |

$\Delta\theta gF = \theta gF - (-1.61783 \times 10^{-3} \times vd + 0.64146)$

Eleventh Numerical Example f=−164.23 mm Magnification=1.99

Surface No. (i) ri di ndi vdi Effective Diameter θgF Δθ$_{gF}$.

| | | | | | | | |
|---|---|---|---|---|---|---|---|
| 1 | −447.150 | 1.40 | 1.80400 | 46.6 | 21.05 | 0.5574 | −0.00874 |
| 2 | 21.727 | 4.96 | 1.65412 | 39.7 | 21.18 | 0.5740 | −0.00322 |
| 3 | −59.037 | 11.04 | | | 21.34 | | |
| 4 | −52.994 | 1.40 | 1.77250 | 49.6 | 21.19 | 0.5523 | −0.00885 |
| 5 | 33.866 | 9.00 | 1.65412 | 39.7 | 21.92 | 0.5740 | −0.00322 |
| 6 | −24.854 | 1.50 | | | 22.94 | | |
| 7 | −23.556 | 1.20 | 1.80610 | 33.3 | 22.51 | 0.5881 | 0.00048 |
| 8 | 32.813 | 6.57 | 1.69895 | 30.1 | 24.56 | 0.6030 | 0.01030 |
| 9 | −117.562 | 11.97 | | | 25.93 | | |
| 10 | −42.972 | 1.70 | 1.84666 | 23.8 | 31.06 | 0.6203 | 0.01734 N1 |
| 11 | −107.865 | 7.93 | 1.65412 | 39.7 | 33.18 | 0.5740 | −0.00322 P1 |
| 12 | −28.173 | | | | 35.22 | | |

$\Delta\theta gF = \theta gF - (-1.61783 \times 10^{-3} \times vd + 0.64146)$

Twelfth Numerical Example f=−251.89 mm Magnification=1.80

Surface No. (i) ri di ndi vdi Effective Diameter θgF Δθ$_{gF}$

| | | | | | | | |
|---|---|---|---|---|---|---|---|
| 1 | 162.141 | 1.40 | 1.79952 | 42.2 | 21.65 | 0.5674 | −0.00578 |
| 2 | 16.392 | 7.15 | 1.65412 | 39.7 | 21.49 | 0.5740 | −0.00322 |
| 3 | −34.800 | 3.10 | | | 21.66 | | |
| 4 | −30.800 | 1.40 | 1.77250 | 49.6 | 20.97 | 0.5523 | −0.00885 |
| 5 | 22.251 | 8.31 | 1.59551 | 39.2 | 22.12 | 0.5797 | 0.00172 |
| 6 | −124.994 | 12.85 | | | 23.80 | | |
| 7 | −30.461 | 6.00 | 1.61340 | 44.3 | 28.24 | 0.5628 | −0.00709 P1 |
| 8 | −21.593 | 1.55 | | | 30.38 | | |
| 9 | −31.121 | 1.70 | 1.80518 | 25.4 | 30.24 | 0.6166 | 0.01624 N1 |
| 10 | 65.610 | 10.51 | 1.69895 | 30.1 | 33.85 | 0.6030 | 0.01030 |
| 11 | −35.913 | | | | 35.72 | | |

$\Delta\theta gF = \theta gF - (-1.61783 \times 10^{-3} \times vd + 0.64146)$

Thirteenth Numerical Example f=−100.36 mm Magnification=2.00
Surface No. (i) ri di ndi vdi Effective Diameter θgF Δθ$_{gF}$

| | | | | | | | |
|---|---|---|---|---|---|---|---|
| 1 | 84.753 | 1.60 | 1.79952 | 42.2 | 24.12 | 0.5674 | −0.00578 |
| 2 | 24.264 | 0.52 | | | 23.53 | | |
| 3 | 28.169 | 5.50 | 1.65412 | 39.7 | 23.58 | 0.5740 | −0.00322 |
| 4 | −71.204 | 2.10 | | | 23.59 | | |
| 5 | −324.314 | 1.20 | 1.77250 | 49.6 | 22.98 | 0.5523 | −0.00885 |
| 6 | 16.475 | 10.70 | 1.62004 | 36.3 | 22.46 | 0.5883 | 0.00551 |
| 7 | −22.559 | 1.20 | 1.88300 | 40.8 | 22.71 | 0.5669 | −0.00856 |
| 8 | 83.922 | 5.75 | | | 23.87 | | |
| 9 | 54.821 | 4.81 | 1.65412 | 39.7 | 28.88 | 0.5740 | −0.00322 P1 |
| 10 (Diffractive) | −130.000 | 2.00 | 1.84666 | 23.9 | 29.24 | 0.6217 | 0.01890 N1 |
| 11 | 130.000 | 5.04 | | | 29.95 | | |
| 12 | −52.511 | 5.20 | 1.65412 | 39.7 | 31.00 | 0.5740 | −0.00322 P1 |
| 13 | −24.446 | 0.30 | | | 31.94 | | |
| 14 | −54.233 | 1.55 | 1.84666 | 23.9 | 31.64 | 0.6217 | 0.01890 N1 |
| 15 | −110.598 | | | | 32.29 | | |

10$^{th}$ Surface (Diffractive Surface)
C2=1.50597×10$^{-4}$ C4=−3.34020×10$^{-7}$ C6=1.46058×10$^{-10}$ $\Delta\theta gF = \theta gF - (-1.61783 \times 10^{-3} \times vd + 0.64146)$

TABLE 2

| | 4th Example | 5$^{th}$ Example | 6th Example | 7th Example | 8th Example | 9th Example | 10th Example | 11th Example | 12th Example | 13th Example |
|---|---|---|---|---|---|---|---|---|---|---|
| Conditional Expression (7) | 0.00133 0.00070 | 0.00425 0.00029 | 0.00046 0.00192 | 0.00421 | 0.00461 | 0.00065 | 0.00331 | 0.00140 | 0.00619 | 0.00106 0.00062 |
| Conditional Expression (8) | 0.000310 0.000411 | 0.000467 0.000302 | 0.000216 | 0.000178 | 0.000013 | 0.000721 0.000170 | 0.000200 | 0.000237 | 0.000419 | 0.00134 0.00125 |
| Conditional Expression (9) | 0.19 | 3.78 | 0.54 | 0.13 | 0.05 | 1.22 | 2.46 | 5.03 | 2.62 | 0.40 |
| Conditional Expression (10) | −5.25 | −1.87 | −1.04 | −3.16 | −2.97 | −4.14 | −6.00 | −1.82 | −6.93 | −3.59 |
| Conditional Expression (11) | 1.59 | 0.41 | 0.40 | 1.34 | 0.81 | 0.50 | 0.74 | 1.27 | 1.08 | 0.71 |
| Conditional Expression (12) | −1.530 | −0.294 | −0.124 | −0.546 | −0.735 | −0.800 | −0.554 | −0.440 | −3.813 | −0.932 |
| Conditional Expression (13) | 1.88300 1.77250 1.88300 1.84666 1.84666 | 1.88300 1.71300 1.72916 1.88300 1.94595 1.83481 1.84666 | 1.88300 1.88300 1.84666 1.84666 1.88300 | 1.83481 1.78800 1.77250 1.92286 1.77250 | 1.77250 1.81600 1.81600 2.34161 1.80610 | 1.80400 1.77250 1.88300 1.80610 1.59282 | 1.80400 1.77250 1.88300 1.84666 | 1.80400 1.77250 1.80610 1.84666 | 1.79952 1.77250 1.80518 | 1.79952 1.77250 1.88300 1.84666 1.84666 |

In Table 2, the upper and lower rows for Conditional Expression (7) in the columns of the fourth, fifth, and thirteenth embodiments respectively show the values of the negative lens N1 in the third unit RL3 and the negative lens N1 in the fourth unit RL4. In addition, the upper and lower rows for Conditional Expression (7) in the column of the sixth embodiment respectively show the values of the first and second negative lenses N1 in the third unit RL3 counted from the object side. In addition, the upper and lower rows for Conditional Expression (8) in the columns of the fourth, fifth, ninth, and thirteenth embodiments respectively show the values of the positive lens P1 in the third unit RL3 and the positive lens P1 in the fourth unit RL4. In addition, the rows for the Conditional Expression (13) in the column of each embodiment show, in order from the top row to the bottom row, the refractive indices of materials of the negative lenses counted from the object side to the image side.

Next, a single-lens reflex camera (image pickup apparatus) including an imaging optical system in which the rear attachment lens according to any one of the embodiments of the present invention is attached to the main lens system at the image side thereof will be described with reference to FIG. 23.

Figure 23:
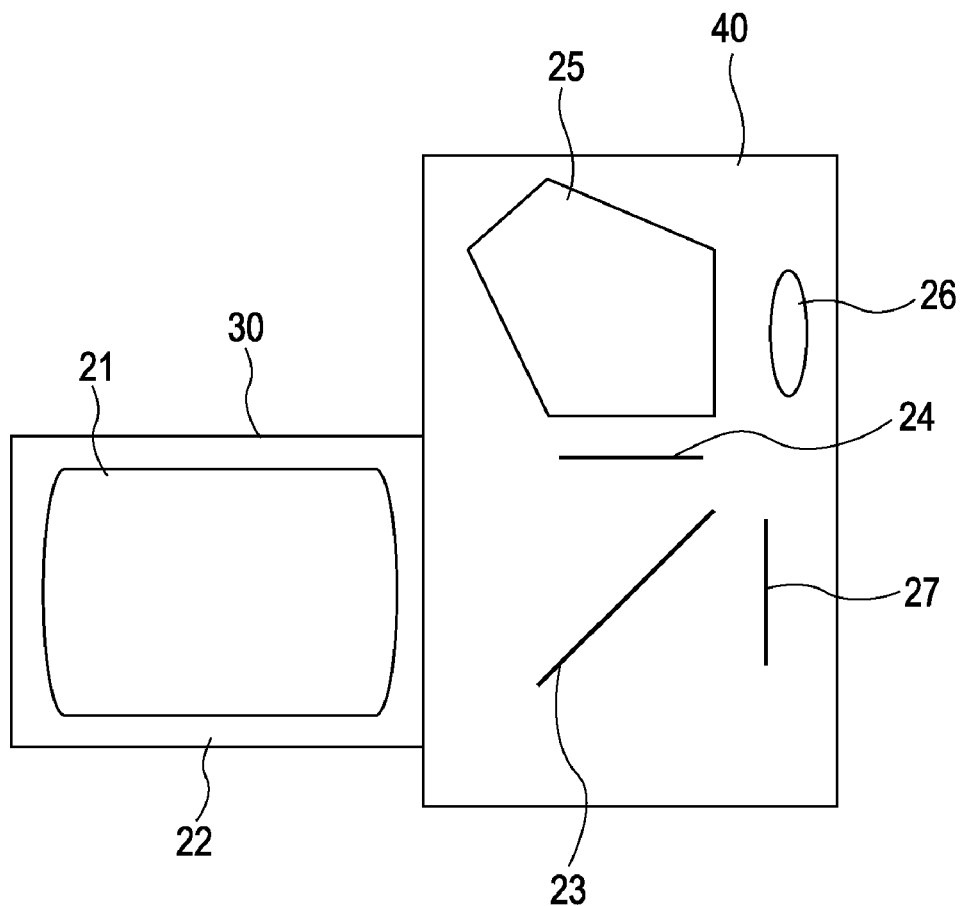
FIG. 23 is a schematic diagram illustrating the main part of an optical apparatus according to an embodiment of a present invention.

In FIG. 23, an imaging lens 30 includes an imaging optical system 21 according to any one of the fourth to thirteenth embodiments. The imaging optical system 21 is held by a barrel 22, which functions as a holding member. A camera body 40 includes a quick return mirror 23 which reflects light rays from the imaging lens 30 upward and a focusing screen 24 disposed at an image-forming position of the imaging lens 30. The camera body 40 also includes a penta-roof prism 25 which converts an inverse image formed on the focusing screen 24 into an erect image and an ocular lens 26 with which the erect image can be magnified. A solid-state image pickup element (photoelectric conversion element), such as a CCD sensor and a CMOS sensor, or a silver-halide film that serves as a light-receiving unit (recording unit) is disposed on a photosensitive surface 27. In a shooting operation, the quick return mirror 23 is moved away from an optical path and an image is formed on the photosensitive surface 27 by the imaging lens 30.

Although embodiments of the present invention have been described above, the present invention is, of course, not limited to the embodiments, and various modifications are possible within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-232225 filed Oct. 6, 2009 and No. 2009-281430 filed Dec. 11, 2009, which are hereby incorporated by reference herein in their entirety.

What is claimed is:

1. A rear attachment lens detachably attached to a main lens system at an image side of the main lens system to lengthen a focal length from a focal length of the main lens system itself, the rear attachment lens comprising:
a negative lens disposed such that, when L is a distance between a lens surface closest to an object side and a lens surface closest to an image side in the rear attachment lens, the negative lens is within an area in which a distance from the lens surface closest to the object side in the rear attachment lens is in the range of 0.5 L to 1.0 L,
wherein, when vdn1 is an Abbe number of a material of the negative lens with respect to the d-line and θgFn1 is a partial dispersion ratio of the material of the negative lens with respect to the g-line and the F-line, the following conditions are satisfied:

10<vdn1<23

0.020<θgFn1−0.6438+0.001682*vdn1<0.100.

2. The rear attachment lens according to claim 1, further comprising:
a first positive lens disposed within an area in which a distance from the lens surface closest to the object side in the rear attachment lens is in the range of 0 to 0.5 L, and
wherein, when Ndp1 and vdp1 are a refractive index and an Abbe number, respectively, of a material of the first positive lens with respect to the d-line and θgFp1 is a partial dispersion ratio of the material of the first positive lens with respect to the g-line and the F-line, the following conditions are satisfied:

1.90<Ndp1+0.0125vdp1<2.24

0.001<θgFp1−0.6438+0.001682*vdp1<0.020.

3. The rear attachment lens according to claim 1, further comprising:
a second positive lens disposed within an area in which a distance from the lens surface closest to the object side in the rear attachment lens is in the range of 0.5 L to 1.0 L, and
wherein, when Ndp2 and vdp2 are a refractive index and an Abbe number, respectively, of a material of the second positive lens with respect to the d-line and θgFp2 is a partial dispersion ratio of the material of the second positive lens with respect to the g-line and the F-line, the following conditions are satisfied:

1.90<Ndp2+0.0125vdp2<2.24

−0.010<θgFp2−0.6438+0.001682*vdp2<0.003.

4. An imaging optical system, comprising:
a main lens system; and
the rear attachment lens according to claim 1, the rear attachment lens being detachably attached to the main lens system at the image side of the main lens system.

5. An image pickup apparatus, comprising:
the imaging optical system according to claim 4; and
a light receiving unit that receives an image formed by the imaging optical system.

6. A rear attachment lens detachably attached to a main lens system at an image side of the main lens system to lengthen a focal length from a focal length of the main lens system itself, the rear attachment lens comprising:
a first lens unit having a positive refractive power and including either two lenses including a positive lens and a negative lens or a set of a single lens and a cemented lens arranged in order from an object side to the image side, the set of the single lens and the cemented lens including a positive lens and a negative lens;
a second lens unit positioned on the image side of the first lens unit and including either a cemented lens including a positive lens and a negative lens or a set of a single lens and a cemented lens arranged in order from the object side to the image side, the set of the single lens and the cemented lens including a positive lens and a negative lens;
a third lens unit positioned on the image side of the second lens unit and including a positive lens;
a fourth lens unit positioned on the image side of the third lens unit and including either two lenses including a positive lens and a negative lens or a set of a cemented lens and a single lens arranged in order from an object side to the image side, the set of the cemented lens and the single lens including a positive lens and a negative lens,
wherein, when the third lens unit includes at least one negative lens, the at least one negative lens in the third lens unit or at least one negative lens included in the fourth lens unit serves as a first negative lens, and
wherein, when $v_{d\_N1}$ and $\Delta\theta_{gF\_N1}$ are an Abbe number and a partial-dispersion-ratio difference, respectively, of a material of the first negative lens, $f\_{N1}$ is a focal length of the first negative lens, and f is a focal length of the rear attachment lens, the following condition is satisfied:

0.00015<Δθ$_{gF\_N1}$*f/(ν$_{d\_N1}$*f$\_{N1}$)<0.00620.

7. The rear attachment lens according to claim 6, wherein at least one positive lens included in the third lens unit or at least one positive lens included in the fourth lens unit serves as a first positive lens, and when $v_{d\_P1}$ and $\Delta\theta_{gF\_N1}$ are an Abbe number and a partial-ispersion-ratio difference, respectively, of a material of the first positive lens and $f\_{P1}$ is a focal length of the first positive lens, the following condition is satisfied:

0<Δθ$_{gF\_N1}$*f/(ν$_{d\_P1}$*f$\_{P1}$)<0.001.

8. The rear attachment lens according to claim 6, wherein when f3 is a focal length of the third lens unit, the following condition is satisfied:

|f/f3|<6.5.

9. The rear attachment lens according to claim 6, wherein when f2 is a focal length of the second lens unit, the following condition is satisfied:

−10.0<f/|f2|<−0.2.

10. The rear attachment lens according to claim 6, wherein when f4 is a focal length of the fourth lens unit, the following condition is satisfied:

|f/f4|<4.0.

11. The rear attachment lens according to claim 6, wherein when f1 is a focal length of the first lens unit, the following condition is satisfied:

−5.5<f/f1<−0.05.

12. The rear attachment lens according to claim 6, wherein when $N_N$ is a refractive index of a material of a negative lens included in the rear attachment lens, the following condition is satisfied:

$$1.5 < N_N < 2.5.$$

13. The rear attachment lens according to claim 6, further comprising:
    at least one diffractive optical element.
14. An imaging optical system, comprising:
    a main lens system; and
    the rear attachment lens according to claim 6, the rear attachment lens being detachably attached to the main lens system at the image side of the main lens system.
15. An image pickup apparatus, comprising:
    the imaging optical system according to claim 14; and
    a solid-state image pickup element that receives an image formed by the imaging optical system.
16. A rear attachment lens configured to be removably attached to a main lens system, the rear attachment lens comprising:
    a first lens unit having a lens surface closest to an object side;
    a second lens unit having a lens surface closest to an image side; and
    a negative lens unit disposed between the first lens unit and the second lens unit along an optical axis thereof,
    wherein the negative lens unit is disposed within an area in which a distance from the negative lens unit to the lens surface closest to the object side is in a range of 0.5 L to 1.0 L, where L is a distance between the lens surface closest to the object side and the lens surface closest to the image side, and
    wherein, $$10 < \text{vdn}1 < 23, \text{ and}$$

$$0.020 < \theta gFn1 - 0.6438 + 0.001682 * vdn1 < 0.100,$$

where vdn1 is an Abbe number of a material of the negative lens unit with respect to the d-line and θgFn1 is a partial dispersion ratio of the material of the negative lens unit with respect to the g-line and the F-line.

* * * * *